United States Patent
Cho

(10) Patent No.: US 8,791,944 B2
(45) Date of Patent: Jul. 29, 2014

(54) MOBILE TERMINAL AND CONTROLLING METHOD THEREOF

(75) Inventor: Seonhwi Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 13/073,828

(22) Filed: Mar. 28, 2011

(65) Prior Publication Data

US 2012/0007854 A1    Jan. 12, 2012

(30) Foreign Application Priority Data

Jul. 12, 2010 (KR) .......................... 10-2010-0066808

(51) Int. Cl.
*G06T 15/00* (2011.01)
(52) U.S. Cl.
USPC .......................................... 345/419; 345/173
(58) Field of Classification Search
USPC .................................................. 345/419, 173
See application file for complete search history.

(56) References Cited

U.S. PATENT DOCUMENTS

| | | | |
|---|---|---|---|
| 2008/0104027 A1* | 5/2008 | Imler et al. .................... | 707/3 |
| 2008/0158191 A1 | 7/2008 | Yang et al. | |
| 2008/0180404 A1 | 7/2008 | Han et al. | |
| 2009/0096753 A1* | 4/2009 | Lim .............................. | 345/173 |
| 2010/0053111 A1 | 3/2010 | Karlsson | |
| 2010/0053151 A1* | 3/2010 | Marti et al. .................... | 345/419 |
| 2010/0306650 A1* | 12/2010 | Oh et al. ........................ | 715/702 |

FOREIGN PATENT DOCUMENTS

| | | |
|---|---|---|
| EP | 2196881 | 6/2010 |
| WO | 02/089058 | 11/2002 |

* cited by examiner

*Primary Examiner* — Maurice L McDowell, Jr.
*Assistant Examiner* — Kyle Zhai
(74) *Attorney, Agent, or Firm* — Lee, Hong, Degerman, Kang & Waimey

(57) ABSTRACT

The present invention relates to a mobile terminal including a touchscreen configured to display content on a screen and a controller controlling operations related to the content. The touchscreen receives a touch input comprising a touch of at least one first part of the content according to a first touch scheme and receives a touch input comprising a touch of at least one second part of the content according to a second touch scheme. If the touch according to the second touch scheme is altered, the controller controls an operation of the content according to the altered touch of the second touch scheme.

18 Claims, 47 Drawing Sheets

FIG. 6
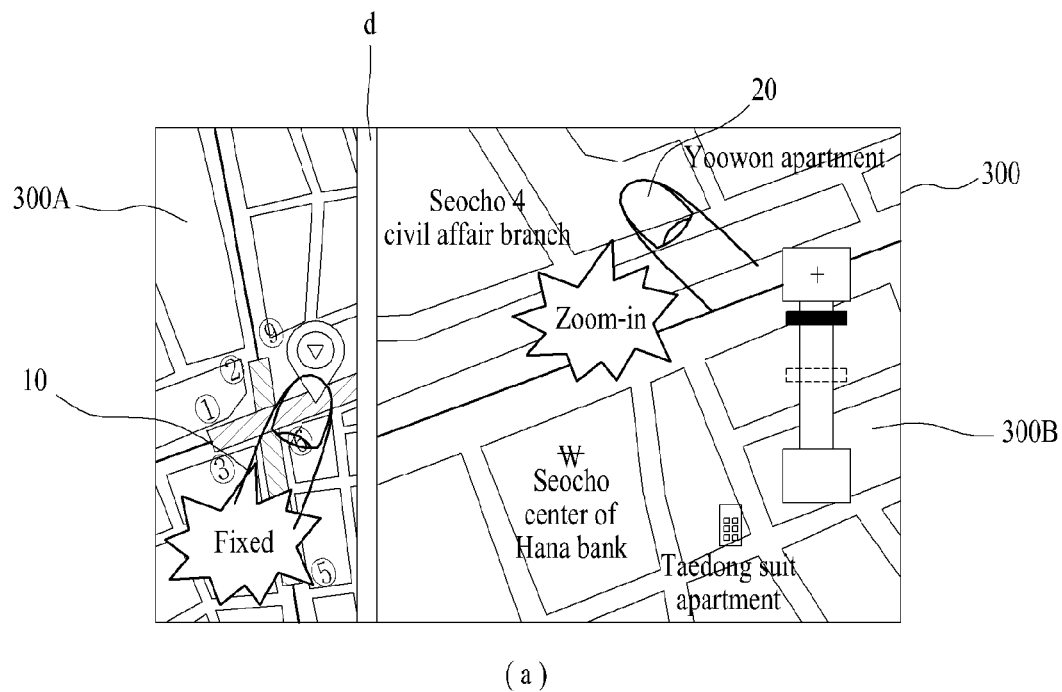
(a)
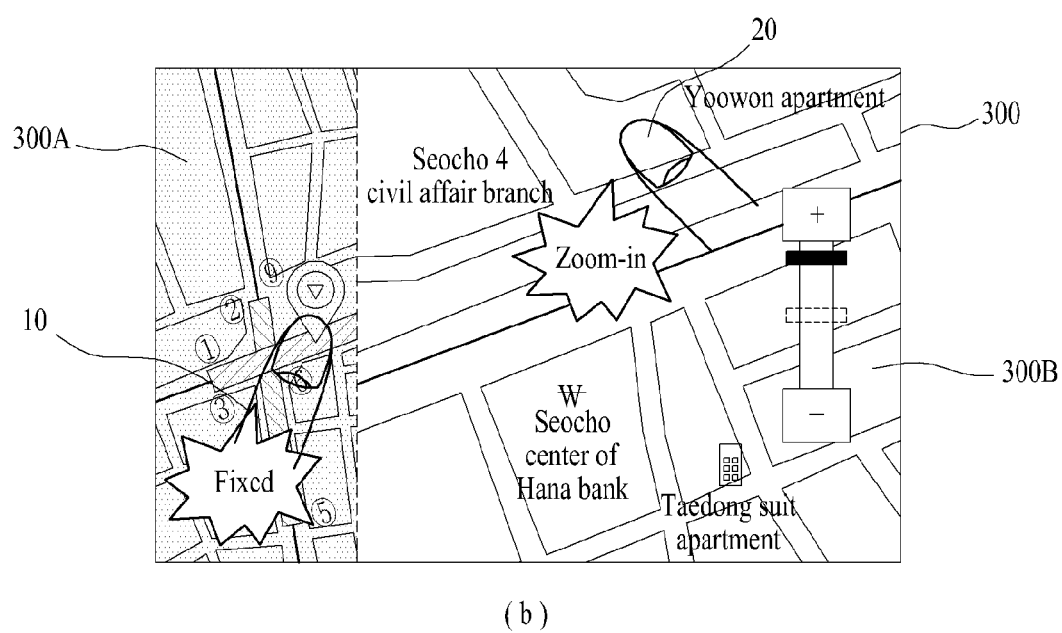
(b)

FIG. 19
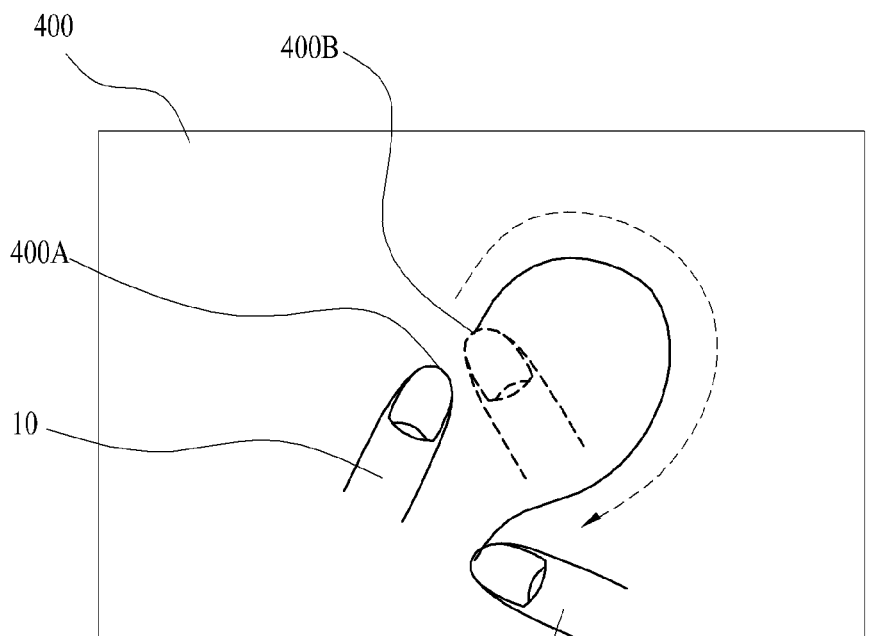
(a)
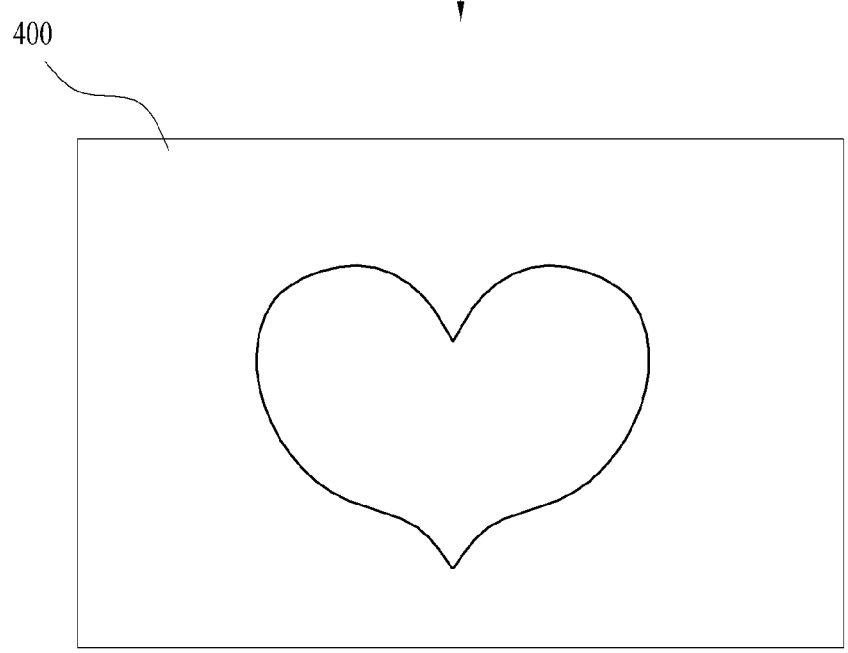
(b)

FIG. 20
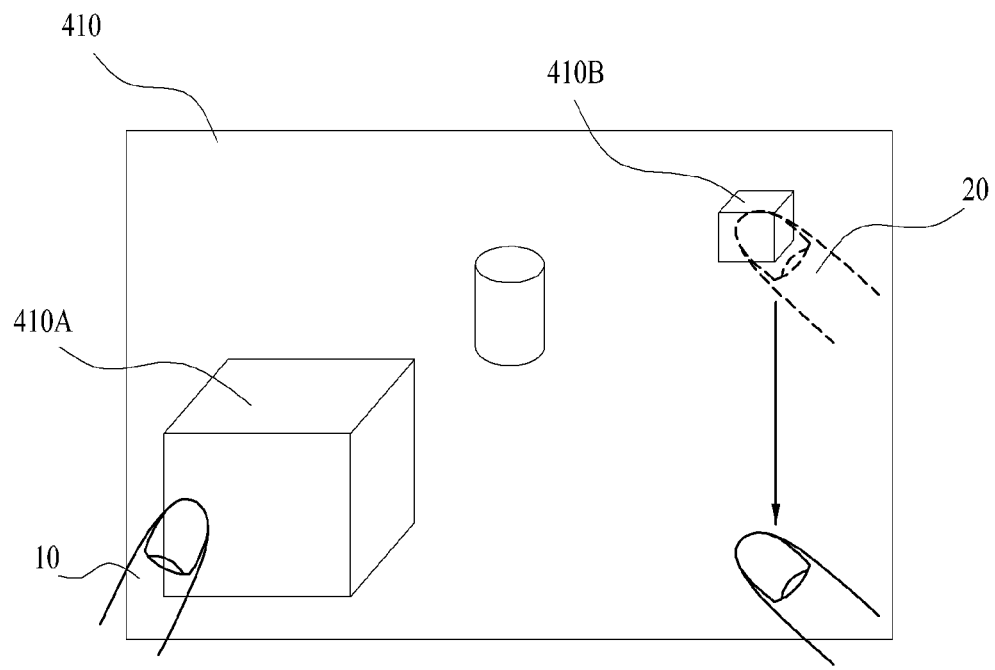
(a)
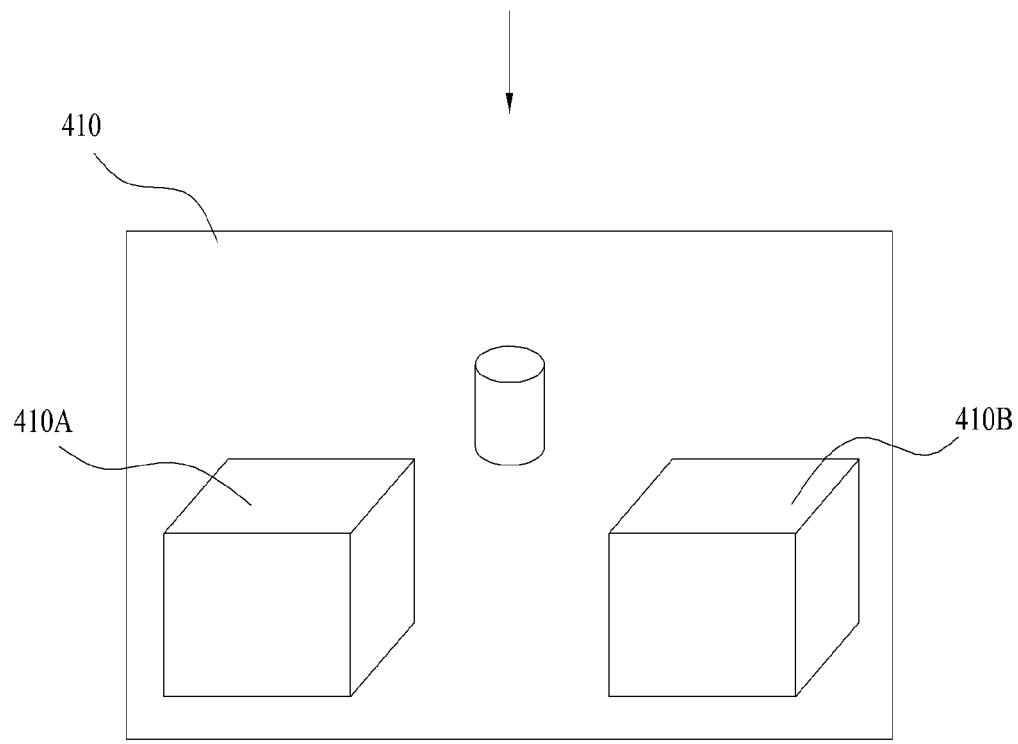
(b)

FIG. 23
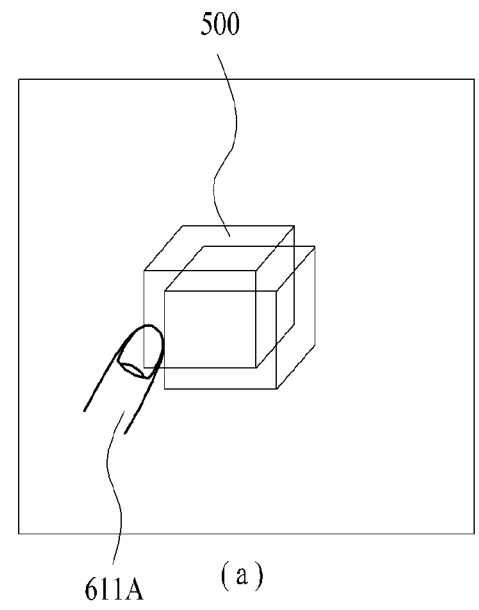
(a)
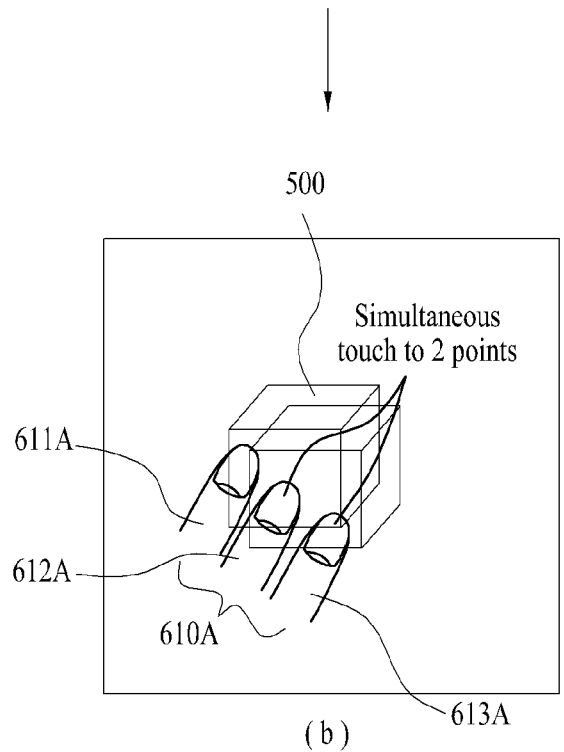
(b)

FIG. 24
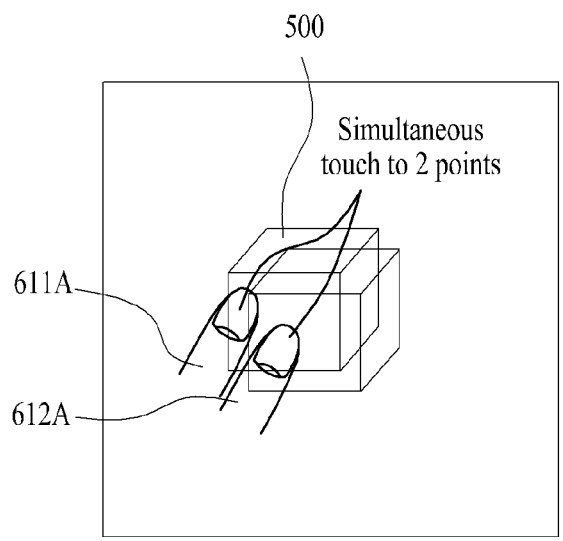
(a)
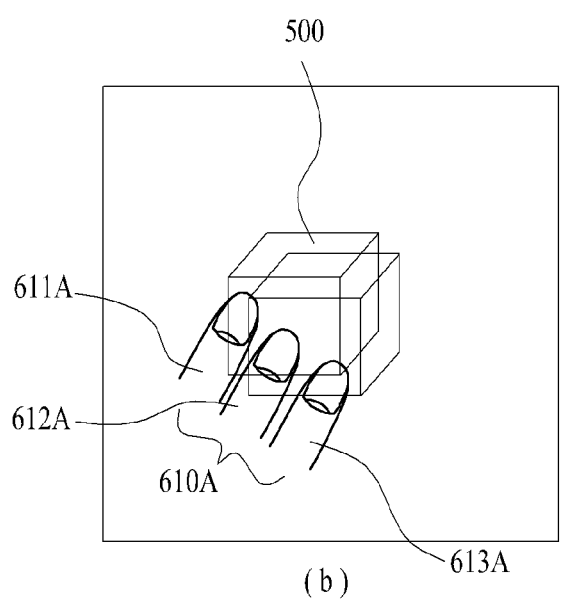
(b)

FIG. 26
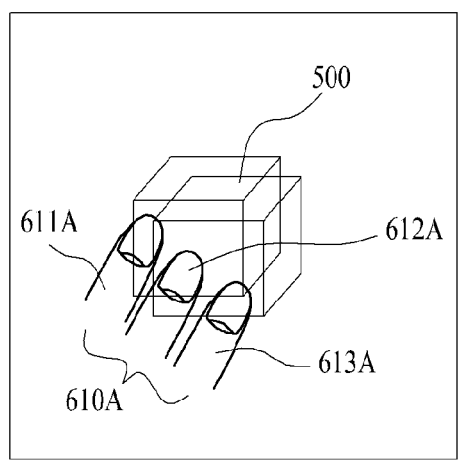
(a)
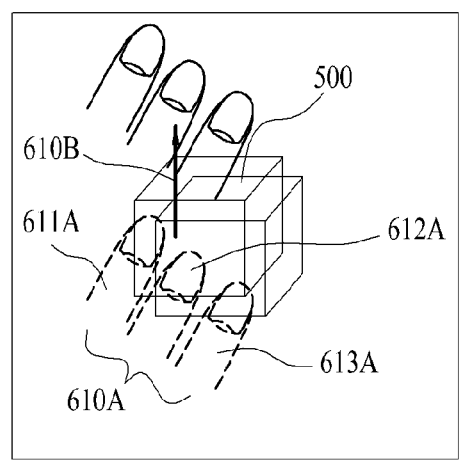
(b)
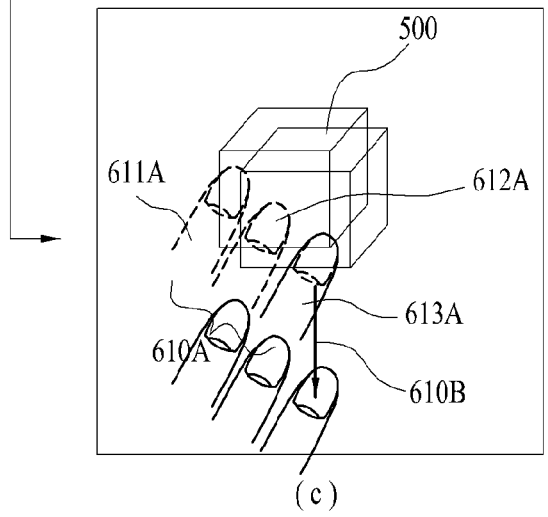
(c)

FIG. 27
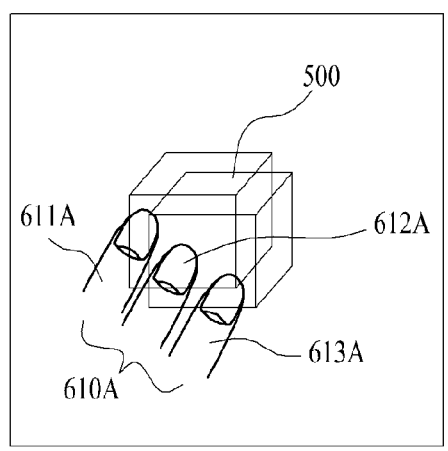
(a)
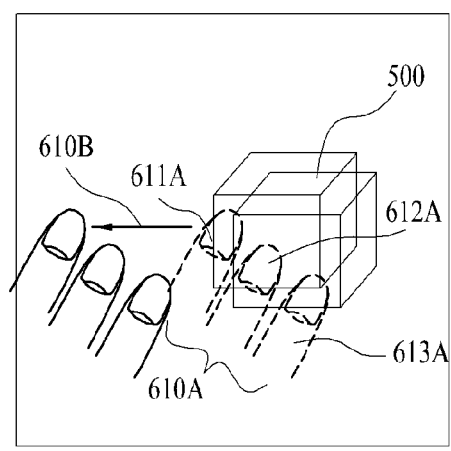
(b)
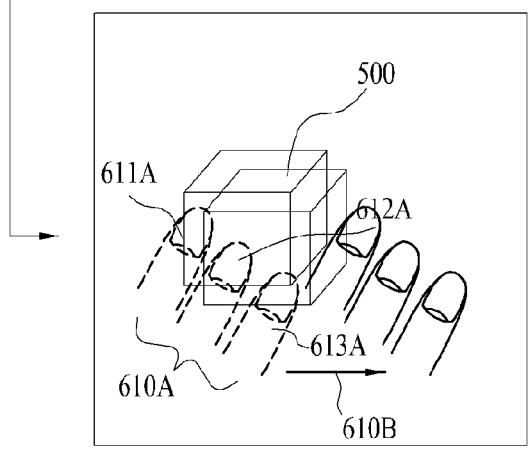
(c)

FIG. 32
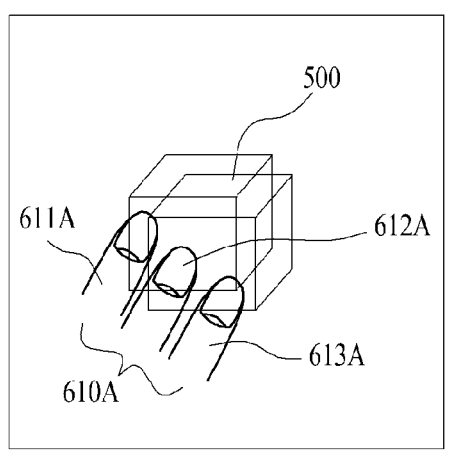
(a)
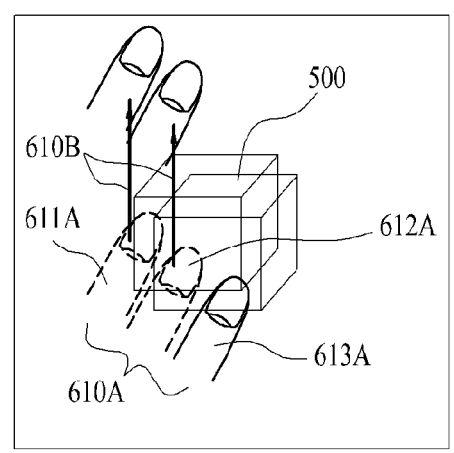
(b)
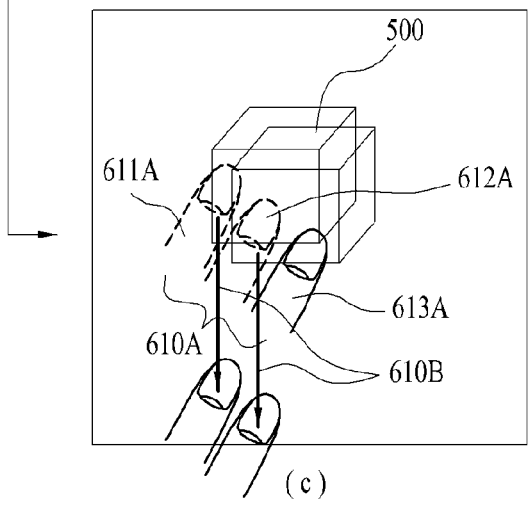
(c)

FIG. 33
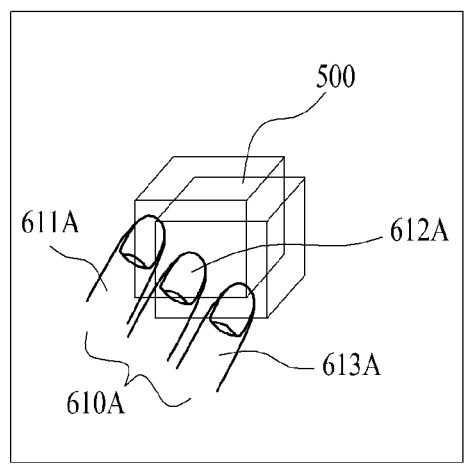
(a)
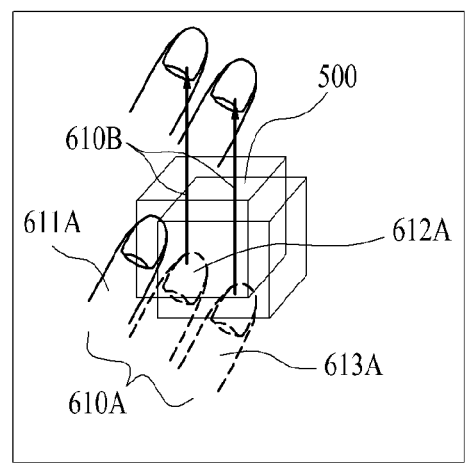
(b)
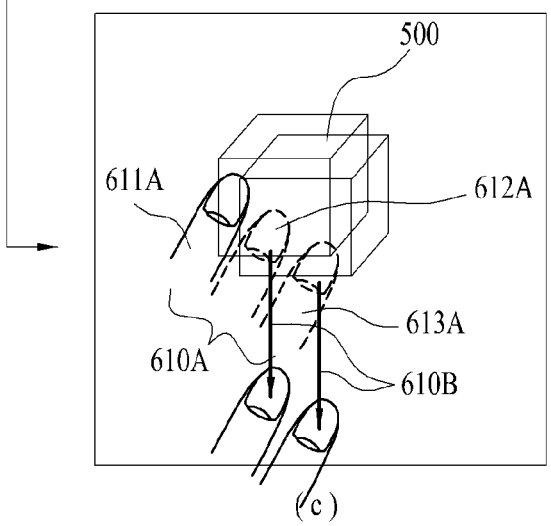
(c)

FIG. 34
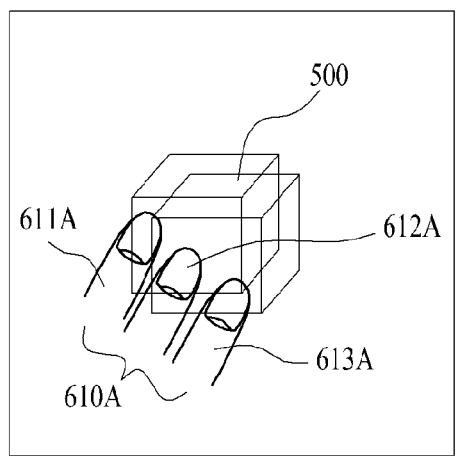
(a)
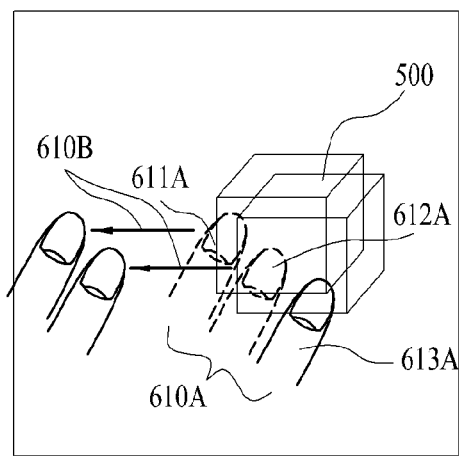
(b)
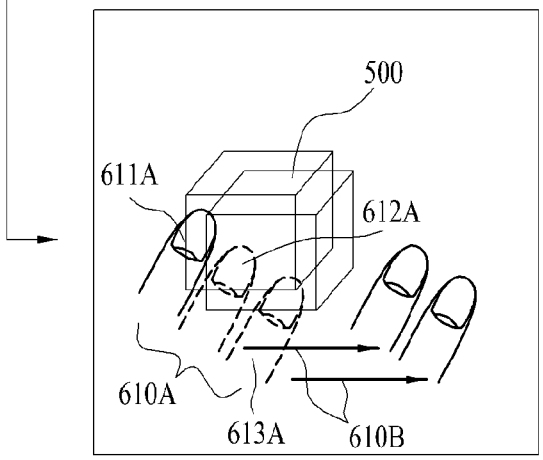
(c)

MOBILE TERMINAL AND CONTROLLING METHOD THEREOF

CROSS REFERENCE TO RELATED APPLICATIONS

Pursuant to 35 U.S.C. §119(a), this application claims the benefit of earlier filing date and right of priority to Korean Application No. 10-2010-0066808, filed on Jul. 12, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof for furthering a user's convenience.

2. Discussion of the Related Art

A mobile terminal is a device which may be configured to perform various functions. Examples of such functions include data and voice communications, capturing images and video via a camera, recording audio, playing music files, outputting music via a speaker system, and displaying images and video on a display. Some terminals include additional functionality for playing games, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to whether the terminals are mobile. The mobile terminals can be further classified into handheld terminals and vehicle-mounted terminals according to whether the mobile terminals can be carried by a user's hand.

Ongoing efforts exist to support and increase the functionality of the mobile terminal. Such efforts include software and hardware improvements, as well as changes and improvements to the structural components which form the mobile terminal.

These efforts include attempts to improve a mobile terminal implemented as a multimedia device via hardware and/or software to accomplish complicated functions. For instance, attempts have been made to improve a user interface environment for facilitating a user to search for, or select, a specific function.

Moreover, it is realized that a mobile terminal has become a personal hand-held item to express a user's personality. As such, demands for various features including a double-faced liquid crystal display (LCD), a full-scale touchscreen, and the like, are increasing.

However, because a mobile terminal must consider aspects of mobility, portability and the like, allocating space on the mobile terminal for user interface implementations, such as a display, a keypad and the like, have been limited. For example, although a full-scale touchscreen has been applied to a mobile terminal, a size of the touchscreen has still been limited.

Therefore, in order for a mobile terminal to simultaneously perform both input and output functions via a full-scale touchscreen, it is necessary to control operations of the mobile terminal in various ways.

SUMMARY OF THE INVENTION

The present invention is directed to a mobile terminal and controlling method thereof that substantially obviate one or more problems due to limitations and disadvantages of the related art.

An object of the present invention is to provide a mobile terminal and controlling method thereof, by which detailed operations of content displayed on a touchscreen can be controlled using at least two multi-touches.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display content on a screen, and a controller controlling operations related to the content, wherein the touchscreen receives a touch input comprising a touch of at least one first part of the content according to a first touch scheme, wherein the touchscreen receives a touch input comprising a touch of at least one second part of the content according to a second touch scheme, and wherein if the touch according to the second touch scheme is altered, the controller controls an operation of the content according to the altered touch of the second touch scheme.

In one aspect of the invention, the touch input according to the first touch scheme is performed by maintaining a touch on the at least one first part, and the touch input according to the second touch scheme is performed by moving a touch on the at least one second part in a certain direction while maintaining the touch on the at least one second part.

In another aspect of the invention, the content comprises an object having a three-dimensional (3D) shape, and wherein the controller changes a shape of the 3D object according to the altered touch of the second touch scheme. Moreover, the controller fixes a position of the at least one first part of the 3D object and changes the shape of the 3D object by altering the at least one second part of the 3D object with respect to the fixed at least one first part according to the altered touch of the second touch scheme. Alternatively, the controller changes the shape of the 3D object by changing at least one of a stereoscopic effect, a depth effect or a size of the 3D object according to the altered touch of the second touch scheme. The controller may also rotate the 3D object according to the altered touch of the second touch scheme by pivoting the at least one second part of the 3D object with respect to the at least one first part of the 3D object.

In a further aspect of the invention, while the at least one first part of the 3D object is touched, the touchscreen receives a touch input comprising a touch of a portion of the screen not including the content according to a third touch scheme, and wherein if the touch according to the third touch scheme is altered, the controller further controls the operation of the content according to correspond to the altered touch of the third touch scheme.

In another aspect of the invention, after at least two parts of the content are touched, while the at least two parts remain touched and if a touch to the at least two parts is altered, the controller further controls the operation of the content according to the altered touch.

In another aspect of the invention, the content comprises a map including at least two regions and information on objects included in each of the at least two regions, and wherein the controller controls a display operation of the map according to the altered touch of the second touch scheme. The at least one first part of the content comprises a first target object in a first region of the map, wherein the at least one second part of the content comprises a second region of the map, and wherein the controller searches the second region for information regarding target objects associated with the first target object and displays the searched information regarding the target objects.

In another aspect of the invention, the at least one first part and the at least one second part of the content correspond to a first region and a second region of the map, respectively, and wherein the controller fixes a display position of the first region and zooms in or zooms out on the second region according to the altered touch of the second touch scheme. The controller displays the fixed first region overlaid on the zoomed-in or zoomed-out second region.

In another aspect of the invention, the at least one first part and the at least one second part of the content correspond to a first region and a second region of the map, respectively, and wherein the controller fixes a display position of the first region and shifts a display position of the second region according to the altered touch of the second touch scheme. While the second region is displayed at the shifted display position, if the altered touch of the second scheme is released, the controller displays the second region in its initial state. The controller may shift the display position of the second region by pivoting the second region with respect to the fixed first region. Alternatively, while the second region is touched according to the second touch scheme, if the touch according to the second scheme is dragged in a specific direction, the controller shifts the display position of the second region corresponding to the drag direction.

In a further aspect of the invention, the content comprises a three-dimensional (3D) image including 3D objects having differing 3D depth levels and wherein the controller controls a display operation of the 3D image according to the altered touch of the second touch scheme. The at least one first part and the at least one second part of the content correspond to a first 3D object and a second 3D object of the 3D image, respectively, and wherein the controller fixes a display position of the first 3D object and changes a depth level of the second 3D object into the same depth level of the first 3D object.

In a further aspect of the invention, a method of controlling a mobile terminal includes displaying content on a screen of a touchscreen, receiving a touch input on the touchscreen comprising a touch of at least one first part of the displayed content according to a first touch scheme, and receiving a touch input on the touchscreen comprising a touch of at least one second part of the displayed content according to a second touch scheme, wherein if the touch according to the second touch scheme is altered, controlling an operation of the content according to the altered touch of the second touch scheme.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures.

FIGS. 4 to 20 illustrate methods for controlling a content operation using a two-point multi-touch according to embodiments of the present invention.

FIGS. 22 to 25 illustrate screen configurations for a touch method for changing a shape of a 3D object according to an embodiment of the present invention.

FIGS. 26 to 34 illustrate screen configurations for a touch method for changing a shape of a 3D object according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to various types of terminals. Examples of such terminals include mobile as well as stationary terminals, such as mobile phones, user equipments (UEs), smart phones, digital televisions (DTVs), computers, digital broadcast terminals, personal digital assistants (PDAs), portable multimedia players (PMPs) and navigators.

However, by way of non-limiting example only, further description will be with regard to a mobile terminal 100. It should be noted that such teachings may apply equally to other types of terminals.

Figure 1:
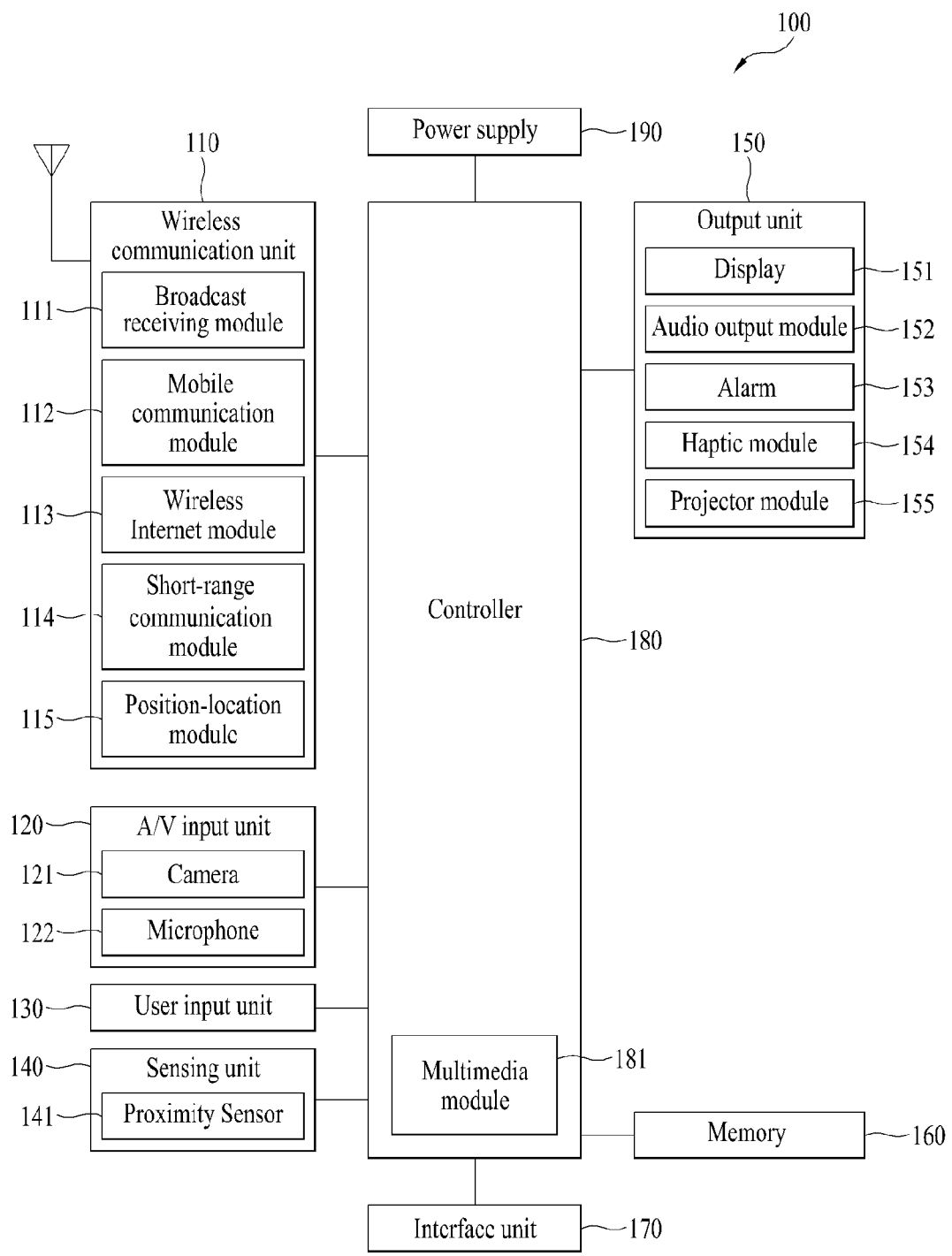
FIG. 1 is a block diagram of a mobile terminal according to an embodiment of the present invention.

FIG. 1 is a block diagram of a mobile terminal 100 in accordance with an embodiment of the present invention.

Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

The wireless communication unit 110 includes one or more components which permits wireless communication between the mobile terminal 100 and a wireless communication system or network within which the mobile terminal 100 is located. For example, the wireless communication unit 110 may include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information, or a server which is provided with a previously generated broadcast signal and/or broadcast associated information and transmits the provided signal or information to a terminal. The broadcast signal may be implemented as a television (TV) broadcast signal, a radio broadcast signal, or a data broadcast signal, among others. If desired, the broadcast signal may further include a broadcast signal combined with a TV or radio broadcast signal.

At least two broadcast receiving modules 111 may be provided to the mobile terminal 100 to simultaneously receive at least two broadcast channels, or to facilitate broadcast channel switching.

The broadcast associated information includes information associated with a broadcast channel, a broadcast program, a broadcast service provider, etc. The broadcast associated information may be provided via a mobile communication network. In accordance with the present invention, the broadcast associated information may be received by the mobile communication module 112.

The broadcast associated information may be implemented in various forms. For example, broadcast associated information may include an electronic program guide (EPG) of a digital multimedia broadcasting (DMB) system and/or an electronic service guide (ESG) of a digital video broadcast-handheld (DVB-H) system.

The broadcast receiving module 111 may be configured to receive broadcast signals transmitted from various types of broadcast systems. By nonlimiting example, such broadcasting systems include a digital multimedia broadcasting-terrestrial (DMB-T) system, a digital multimedia broadcasting-satellite (DMB-S) system, a digital video broadcast-handheld (DVB-H) system, a DVB-CBMS system, a OMA-BCAST system, the data broadcasting system known as media forward link only (MediaFLO®) and an integrated services digital broadcast-terrestrial (ISDB-T) system. Optionally, the broadcast receiving module 111 may be configured to be suitable for other broadcasting systems in addition to the above-mentioned digital broadcasting systems.

The broadcast signal and/or broadcast associated information received by the broadcast receiving module 111 may be stored in a suitable device, such as a memory 160. The mobile communication module 112 transmits/receives wireless signals to/from one or more network entities (e.g., base station, external terminal, server, etc.). Such wireless signals may represent audio, video, and data according to text/multimedia message transmissions/receptions, among others.

The wireless Internet module 113 supports Internet access for the mobile terminal 100. This module may be internally or externally coupled to the mobile terminal 100. In accordance with the present invention, the wireless Internet module 113 may support wireless Internet technologies such as WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. In accordance with the present invention, the short-range communication module 114 may support technologies such as radio frequency identification (RFID), infrared data association (IrDA), ultra-wideband (UWB), as well as the networking technologies commonly referred to as Bluetooth® and ZigBee®, to name a few.

The position-location module 115 identifies or otherwise obtains the location of the mobile terminal 100. The position-location module 115 may include a global positioning system (GPS) module.

Referring to FIG. 1, the audio/video (A/V) input unit 120 is configured to provide audio or video signals input to the mobile terminal 100. As shown, the A/V input unit 120 includes a camera 121 and a microphone 122.

The camera 121 may include digital zoom capability and processes image frames of still pictures or video obtained by an image sensor in a video call mode or a photographing mode. The processed image frames may be displayed on the display 151.

The image frames processed by the camera 121 may be stored in the memory 160 or may be externally transmitted via the wireless communication unit 110. Optionally, at least two cameras 121 may be provided to the mobile terminal 100 according to a usage environment.

The microphone 122 receives an external audio signal while the mobile terminal 100 is in a particular mode, such as a phone call mode, a recording mode or a voice recognition mode. The received external audio signal is processed and converted into electronic audio data. While in a phone call mode, the processed audio data is transformed into a format transmittable to a mobile communication base station via the mobile communication module 112. The microphone 122 may include assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance touchpad), a jog wheel, a jog switch, etc.

The sensing unit 140 provides sensing signals for controlling operations of the mobile terminal 100 using status measurements of various aspects of the mobile terminal. For example, the sensing unit 140 may detect an open/closed status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, and orientation or acceleration/deceleration of the mobile terminal 100.

In accordance with one example of the present invention, if the mobile terminal 100 is configured as a slide-type mobile terminal, the sensing unit 140 may sense whether a sliding portion of the mobile terminal is open or closed. In accordance with other examples of the present invention, the sensing unit 140 may sense the presence or absence of power provided by the power supply 190, or the presence or absence of a coupling or other connection between the interface unit 170 and an external device. The sensing unit 140 may include a proximity sensor 141.

The output unit 150 may generate outputs related to a user's senses of sight, hearing, touch and the like. The output unit 150 includes the display 151, an audio output module 152, an alarm 153, a haptic module 154, a projector module 155 and the like.

The display 151 may be implemented to visually display (output) information associated with the mobile terminal 100. For example, if the mobile terminal is operating in a phone call mode, the display will generally provide a user interface (UI) or graphical user interface (GUI) which includes information associated with placing, conducting, and terminating a phone call. In another example, if the mobile terminal 100 is in a video call mode or a photographing mode, the display 151 may additionally or alternatively display images associated with the video call mode or photographing mode on the UI or GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of the above-mentioned displays.

The above-mentioned displays may be implemented as a transparent or optically transmissive type display, which may be referred to as a transparent display. An example of a transparent display is a transparent OLED (TOLED) or the like. According to an embodiment, a rear portion of the display 151 may also be implemented as an optically transmissive type display. As such, a user of the mobile terminal 100 is able to see an object located behind a terminal body through the area occupied by the display 151.

At least two displays 151 may be provided on the mobile terminal 100 in accordance with an embodiment of the present invention. For example, a plurality of displays can be arranged on a single face of the mobile terminal 100, wherein the plurality of displays may be spaced apart from each other, or built in one body. Alternatively, the plurality of displays may be arranged on different faces of the mobile terminal 100.

In accordance with the present invention, the display 151 and a sensor for detecting a touch action (hereinafter called a 'touch sensor') may configure a mutual layer structure, hereinafter called a 'touchscreen'. Accordingly, the display 151 may be used as an input device as well as an output device. In this case, the touch sensor may be configured as a touch film, a touch sheet, a touchpad or the like.

The touch sensor may be configured to convert a pressure applied to a specific portion of the display 151, or a variation of a capacitance generated from a specific portion of the display 151, into an electric input signal. Moreover, the touch sensor may be configured to detect a pressure of a touch as well as a touched position or a size of a touch.

If a touch input is made to the touch sensor, a signal (or signals) corresponding to the touch is transferred to a touch controller. The touch controller processes the signal and transfers the processed signal to the controller 180. Therefore, the controller 180 knows whether a prescribed portion of the display 151 is touched.

Referring to FIG. 1, a proximity sensor 141 may be provided to an internal area of the mobile terminal 100 enclosed by the touchscreen or around the touchscreen. The proximity sensor 141 detects a presence or non-presence of an object approaching a prescribed detecting surface or an object existing around the proximity sensor by sensing an electromagnetic field strength or infrared ray without sensing a mechanical contact. Hence, because the proximity sensor 141 operates without mechanical contact, the lifespan of the proximity sensor 141 may be longer than that of a contact type sensor, and may also have a wider range of utility than that of the contact type sensor.

Examples of the proximity sensor include a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touchscreen includes the electrostatic capacity proximity sensor, then the touchscreen is configured to detect the proximity of a pointer by detecting a variation of an electric field according to the proximity of the pointer. Accordingly, the touchscreen (touch sensor) may be considered as the proximity sensor.

In the description below, for clarity, the action of a pointer approaching the touchscreen without actually contacting the touchscreen, but still recognized as being located on the touchscreen will be referred to as a 'proximity touch'. Moreover, the action of the pointer actually touching the touchscreen will be referred to as a 'contact touch'. A position on the touchscreen 'proximity-touched' by the pointer corresponds to a position of the pointer vertically opposing the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touchscreen.

The audio output module 152 functions in various modes including a call-receiving mode, a call-placing mode, a recording mode, a voice recognition mode, a broadcast reception mode, and the like, to output audio data received from the wireless communication unit 110 or stored in the memory 160. During operation, the audio output module 152 outputs audio relating to a particular function (e.g., call received, message received, etc.). According to certain embodiments, the audio output module 152 may be implemented using one or more speakers, buzzers, other audio producing devices, and combinations thereof.

The alarm unit 153 outputs a signal for announcing the occurrence of a particular event associated with the mobile terminal 100. Events may include a call received event, a message received event and a touch input received event. The alarm unit 153 may output a signal for announcing the occurrence of the event via vibration, video signal or audio signal. The video or audio signal may be outputted via the display 151 or the audio output unit 152. Hence, the display 151 or the audio output module 152 may be considered as part of the alarm unit 153.

The haptic module 154 may generate various tactile effects that can be sensed by a user. Vibration is one example of the tactile effects that may be generated by the haptic module 154. In accordance with the present invention, a strength and output pattern of the vibration generated by the haptic module 154 may be controlled. For example, different vibrations may be outputted by being synthesized together, or outputted in sequence.

Other examples of the various tactile effects generated by the haptic module 154 include an effect attributed to an arrangement of pins vertically moving against a contacted skin surface, an effect attributed to an injection/suction power of air moving though an injection/suction hole, an effect attributed to a skimming motion over a skin surface, an effect attributed to contact with an electrode, an effect attributed to an electrostatic force, an effect attributed to a representation of a hot/cold sense using an endothermic or exothermic device, and the like.

The haptic module 154 may be implemented to enable a user to sense the tactile effect through a muscle sense of the user's finger, arm or the like, as well as to transfer the tactile effect through direct contact with the user. In accordance with certain embodiments, at least two haptic modules 154 may be provided on the mobile terminal 100 according to a corresponding configuration type of the mobile terminal 100.

The projector module 155 functions to project images using the mobile terminal 100. The projector module 155 may display an image, which is identical to or at least partially different from an image displayed on the display 151, on an external screen or wall according to a control signal of the controller 180.

The projector module 155 may include a light source generating light (e.g., laser) for projecting an image externally, an image producing means for producing an image to output externally using the light generated from the light source, and a lens for enlarging the externally outputted image at a predetermined focal distance. The projector module 155 may further include a device for adjusting a direction of the projected image by mechanically moving the lens or the entire module.

The projector module 155 may be classified as a cathode ray tube (CRT) module, a liquid crystal display (LCD) module, a digital light processing (DLP) module, or the like, according to a display means type. Regarding the DLP module, it is noted that the DLP module operates by enabling light generated from the light source to be reflected on a digital micro-mirror device (DMD) chip, which may be advantageous for downsizing the projector module 151.

In accordance with one embodiment, the projector module 155 is provided in a length direction of a lateral, front or backside direction of the mobile terminal 100. However, it is understood that the projector module 155 may be provided to any portion of the mobile terminal 100 according to necessity.

The memory unit 160 may store various types of data to support processing, control, and storage requirements of the mobile terminal 100. Examples of such data include program instructions for applications operating on the mobile terminal 100, contact data, phonebook data, messages, audio, still pictures, moving pictures, etc. Furthemore, a recent use history or a cumulative use frequency of each data (e.g., use frequency of each phonebook data, each message data or each multimedia data) can be stored in the memory unit 160. Moreover, data for various vibration patterns and/or sound outputted in case of a touch input to the touchscreen may be stored in the memory unit 160.

The memory unit 160 may be implemented using any type or combination of suitable volatile and non-volatile memory or storage devices including a hard disk, a random access memory (RAM), a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.), or other similar memory or data storage device. The mobile terminal 100 is also able to operate in association with web storage for performing a storage function of the memory unit 160 on the Internet.

The interface unit 170 communicably and electronically couples the mobile terminal 100 with external devices. The interface unit 170 may receive data from the external devices and transfer the data to elements of the mobile terminal 100. The interface unit 170 may also be supplied with power and transfer the power to elements of the mobile terminal 100. The interface unit 170 may also enable data within the mobile terminal 100 to be transferred to the external devices. The interface unit 170 may be configured as a wired/wireless headset port, an external charger port, a wired/wireless data port, a memory card port, a port for coupling to a device having an identity module, audio input/output ports, video input/output ports, an earphone port, and/or the like.

The identity module may be a chip for storing various types of information for authenticating a use authority of the mobile terminal 100, and may include a user identity module (UIM), a subscriber identity module (SIM), a universal subscriber identity module (USIM), and/or the like. A device having the identity module (hereinafter called 'identity device') may be manufactured as a smart card. Therefore, the identity device is connectable to the mobile terminal 100 via a corresponding port.

When the mobile terminal 110 is connected to an external cradle, the interface unit 170 acts as a passage for supplying the mobile terminal 100 with power from the cradle, or a passage for delivering various command signals inputted from the cradle by a user to the mobile terminal 100. Each of the various command signals inputted from the cradle, or the supplied power, may operate as a signal enabling the mobile terminal 100 to recognize that it is correctly loaded in the cradle.

The controller 180 controls the overall operations of the mobile terminal 100. For example, the controller 180 performs control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 may perform a pattern recognition process for recognizing a writing input and/or a picture drawing input performed on the touchscreen as characters or images, respectively.

The power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory unit 160, and executed by a controller or processor, such as the controller 180.

Figure 2A:
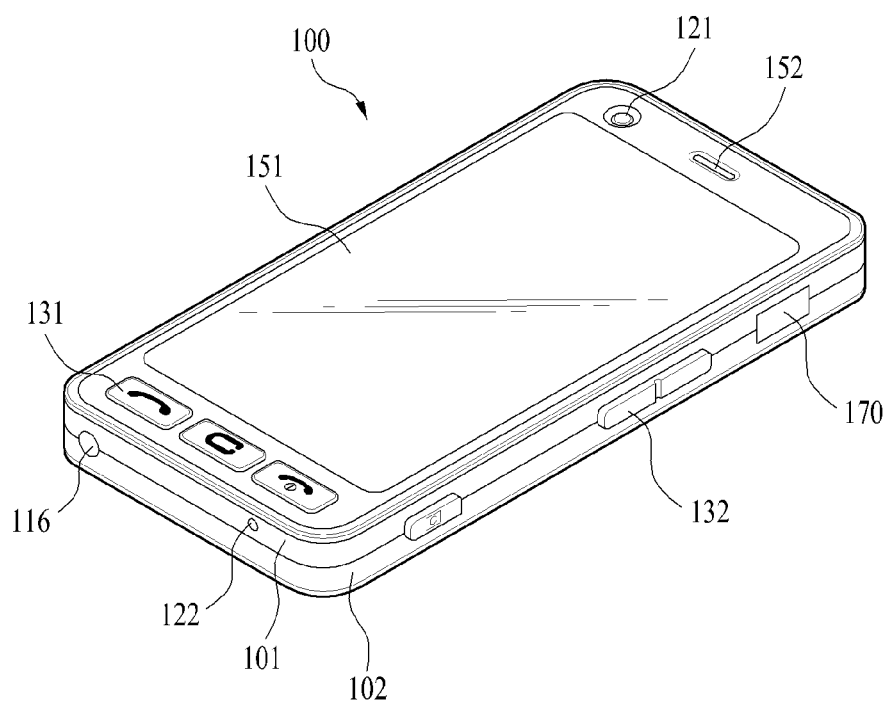
FIG. 2A is a front perspective view of a mobile terminal according to an embodiment of the present invention.

FIG. 2A is a front perspective view of a mobile terminal according to one embodiment of the present invention. The mobile terminal 100 shown in the drawing comprises a bar-type terminal body. However, the mobile terminal 100 of the present invention may be implemented in a variety of different configurations. Examples of such configurations include a folder-type, a slide-type, a rotational-type, a swing-type and combinations thereof. For clarity, further disclosure will primarily relate to the bar-type mobile terminal 100. However such teachings apply equally to the other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. At least one middle case may also be further provided between the front and rear cases 101 and 102. The cases 101 and 102 may be formed by an injection molding process using synthetic resin, or formed of a metal substance such as stainless steel (STS), titanium (Ti), or the like, for example.

A display 151, an audio output unit 152, a camera 121, a first user input unit 131, a second user input unit 132, a microphone 122, an interface unit 170 and the like may be provided on the terminal body, and more particularly, to the front case 101.

The display 151 occupies most of a front surface of the front case 101. The audio output unit 152 and the camera 121 are provided on an area adjacent to an end portion of the display 151, while the first user input unit 131 and the microphone 122 are provided on another area adjacent to another end portion of the display 151. The second user input unit 132 and the interface unit 170 may be provided on lateral sides of the front and rear cases 101 and 102.

The input unit 130 shown in FIG. 1 may comprise the first input unit 131 and the second input unit 132 shown in FIG. 2A, which are manipulated to receive a command for controlling an operation of the terminal 100. The input units 131 and 132 may be referred to as manipulating units as they are manipulated by the user during operation. The input units 131 and 132 may comprise any mechanism that enables a user to perform a manipulation action in a tactile manner.

Content inputted by the first or second input units 131 or 132 may be diversely set. For example, a command such as a start command, and end command, a scroll command, and the like, may be inputted through the first input unit 131. Moreover, a command for adjusting a sound volume outputted from the audio output unit 152, a command for switching to a touch recognition mode of the display 151, or the like, may be inputted through the second input unit 132.

Figure 2B:
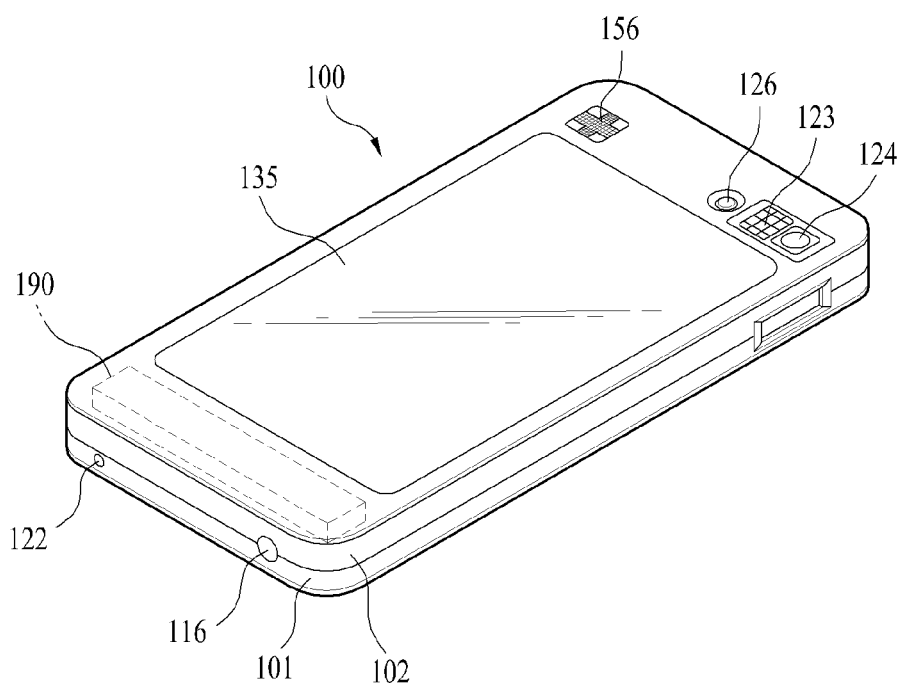
FIG. 2B is a rear perspective view of a mobile terminal according to an embodiment of the present invention.

FIG. 2B is a perspective view of a backside of the terminal shown in FIG. 2A. Referring to FIG. 2B, a rear camera 126 may be additionally provided to a backside of the terminal body, and more particularly, to the rear case 102. The rear camera 126 has a photographing direction substantially opposite to that of the camera 121 shown in FIG. 2A. The rear camera 126 may have a pixel resolution different from that of the camera 121.

In accordance with some embodiments, the camera 121 may have a lower pixel resolution sufficient to capture and efficiently transmit a picture of a user's face for a video call, while the rear camera 126 may have a higher pixel resolution sufficient for capturing a high-quality image of a general subject for photography. Each of the camera 121 and the rear camera 126 may be installed on the terminal body in a rotatable or pop-up configuration.

A flash 123 and a mirror 124 are additionally provided adjacent to the rear camera 126. The flash 123 may project light toward a subject if the subject is photographed using the camera 126. If a user attempts to take a picture of the user (i.e., a self-photo) using the camera 126, then the minor 124 enables the user to view the user's face reflected by the mirror 124.

An additional audio output unit 156 may also be provided on the backside of the terminal body. The additional audio output unit 156 may facilitate a stereo function when used together with the audio output unit 152 shown in FIG. 2A. The additional audio output unit 156 may also facilitate a speakerphone mode.

A broadcast signal receiving antenna may be additionally provided on a lateral side of the terminal body. The antenna may be an antenna for communication or the like. The antenna may form part of the broadcast receiving module 111 shown in FIG. 1, and may be retractably provided on the terminal body.

A power supply 190 for supplying power to the terminal 100 is provided on the terminal body. The power supply unit 190 may be built within the terminal body. Alternatively, the power supply 190 may be detachably connected to the terminal body.

A touchpad 135 for detecting a touch may be additionally provided on the rear case 102. The touchpad 135 may be configured to be light transmissive similar to the display 151. If the display 151 is configured to output visual information from both of its faces, then it may recognize visual information input via the touchpad 135 as well. The information outputted from both faces of the display 151 may be controlled by the touchpad 135. Alternatively, a display may further be provided on the touchpad 135 so that the rear case 102 also includes a touchscreen.

The touchpad 135 is activated by interconnecting with the display 151 of the front case 101. The touchpad 135 may be provided at the rear of the display 151 in parallel. The touchpad 135 may have a size equal to or smaller than that of the display 151.

In the following description, a method for controlling an operation of content displayed on the display/touchscreen 151 using at least two multi-touches according to embodiments of the present invention is described in detail with reference to FIGS. 3 to 47.

The content may include various types of data according to the present invention. In particular, the content may include a two-dimensional (2D) or three-dimensional (3D) map containing various regions and information related to each region, a 3D object, a 3D image containing at least two 3D objects, a 2D or 3D electronic book (e-book) constructed with a plurality of pages, a menu list constructed with at least two menus, and the like.

Moreover, the content may include data provided to the mobile terminal 100, 2D/3D contact information, an incoming/outgoing message, a music file, a video file, schedule information, a document file, a game file, a webpage address file, and the like. The content may also include a menu icon.

An embodiment of the present invention relates to a controlling process. In particular, after a two-point multi-touch is input to content on a screen, if the inputted multi-touch changes, an operation of the content is controlled to correspond to the change in the multi-touch.

Figure 3:
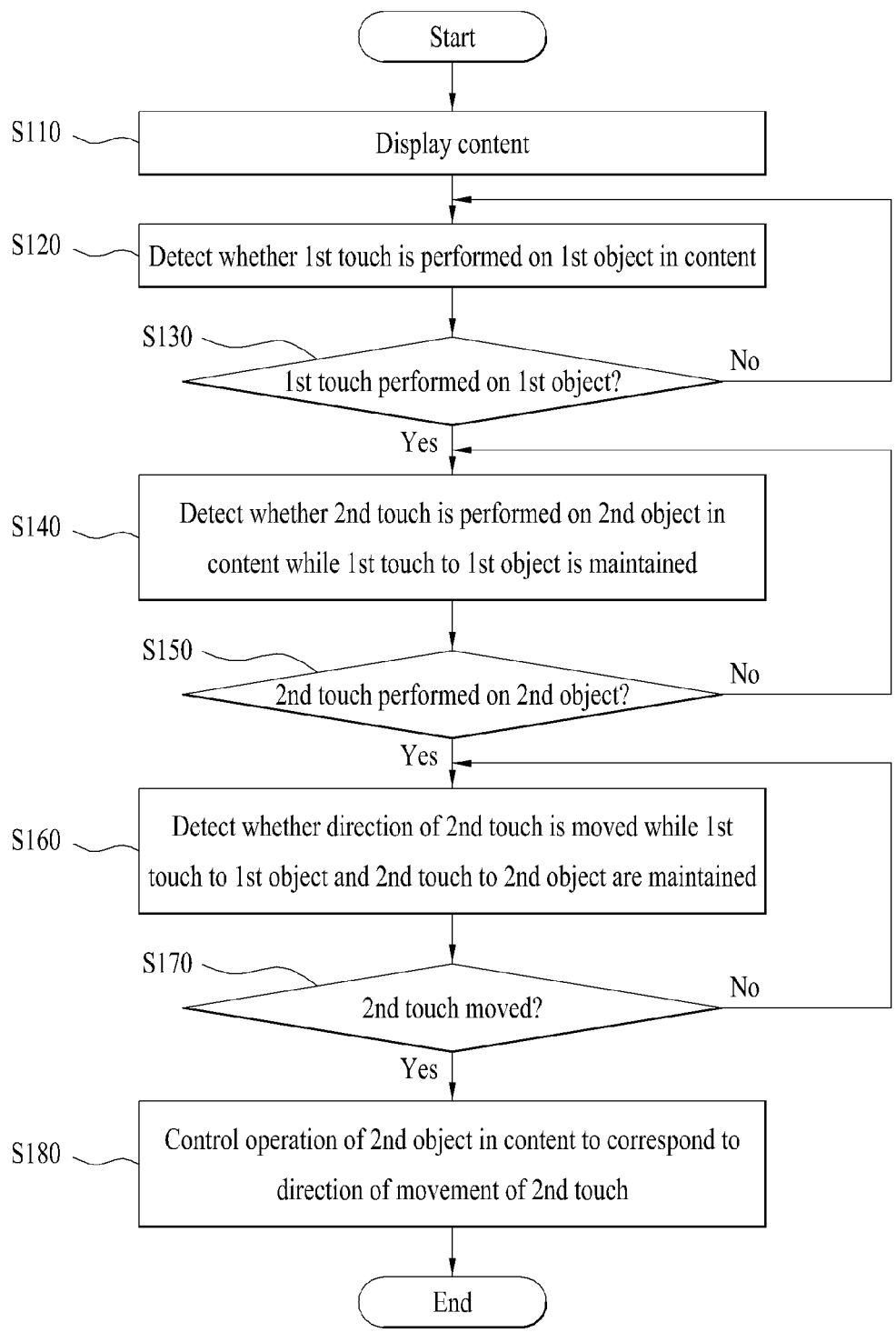
FIG. 3 is a flowchart of a method for controlling a content operation using a two-point multi-touch according to an embodiment of the present invention.

In the following description, an embodiment of the present invention is explained in detail with reference to FIGS. 3 to 20. FIG. 3 is a flowchart of a method for controlling an operation of content using a two-point multi-touch according to an embodiment of the present invention. FIGS. 4 to 20 illustrate a method for controlling an operation of content using a two-point multi-touch according to embodiments of the present invention.

Referring to FIG. 3, if a user selects a specific content via the input unit 130 or the touchscreen 151, the controller 180 of the mobile terminal 100 executes and displays the selected content [S110]. An operational control process executed by the controller 180 according to a content type will be explained below with reference to FIGS. 4 to 20 of the present invention.

As shown in FIG. 3, if the content is displayed on the touchscreen 151, the controller 180 detects whether a first object in the content is touched according to a first touch scheme via the touchscreen 151 [S120]. The first touch scheme may include a scheme wherein a touch on the first object being touched is maintained. In particular, the first touch scheme may correspond to a state where the first object is continuously contacted.

Moreover, according to the first touch scheme in an embodiment of the present invention, while the touch to the first object is maintained, no movement of the touch along the screen occurs and a touch direction remains intact. In particular, after a user touches the first object according to the first touch scheme, a position of the touch on the screen does not change. In one embodiment, the first touch scheme may have at least two touch points.

Referring to FIG. 3, if the first object is touched according to the first touch scheme [S130], the controller 180 detects whether a second object of the content is touched according to a second touch scheme while the first object is touched according to the first touch scheme [S140].

The second touch scheme may include a scheme wherein a touch on the second object being touched is maintained. In particular, the second touch scheme may correspond to a state where the second object is continuously contacted.

The second touch scheme of the present invention may differ from the first touch scheme in that the touch according to the second touch scheme moves along the screen in a certain direction while the touch to the second object is maintained [S160]. In particular, the user may touch the second object and move the touch in a certain direction. In one embodiment, the second touch scheme may have at least two touch points. While the second object is touched according to the second touch scheme, if the touch of the second touch scheme is moved in a certain direction [S170], the controller 180 controls an operation of the second object in the content to correspond to the direction of movement of the touch according to the second scheme [S180].

A process for the controller 180 to control an operation per content type according to the first or second touch scheme is explained in detail with reference to FIGS. 4 to 20. FIGS. 4 to 12 illustrate screen configurations of a method for controlling a display operation of a map displayed on a touchscreen using a two-point multi-touch.

In FIGS. 4 to 12, the content described with reference to FIG. 3 is a map 300 including a plurality of regions and information related to target objects in the regions. The first object referred to in FIG. 3 is a first region 300A of the map 300, and the second object referred to in FIG. 3 is a second region 300B of the map 300.

Figure 4:
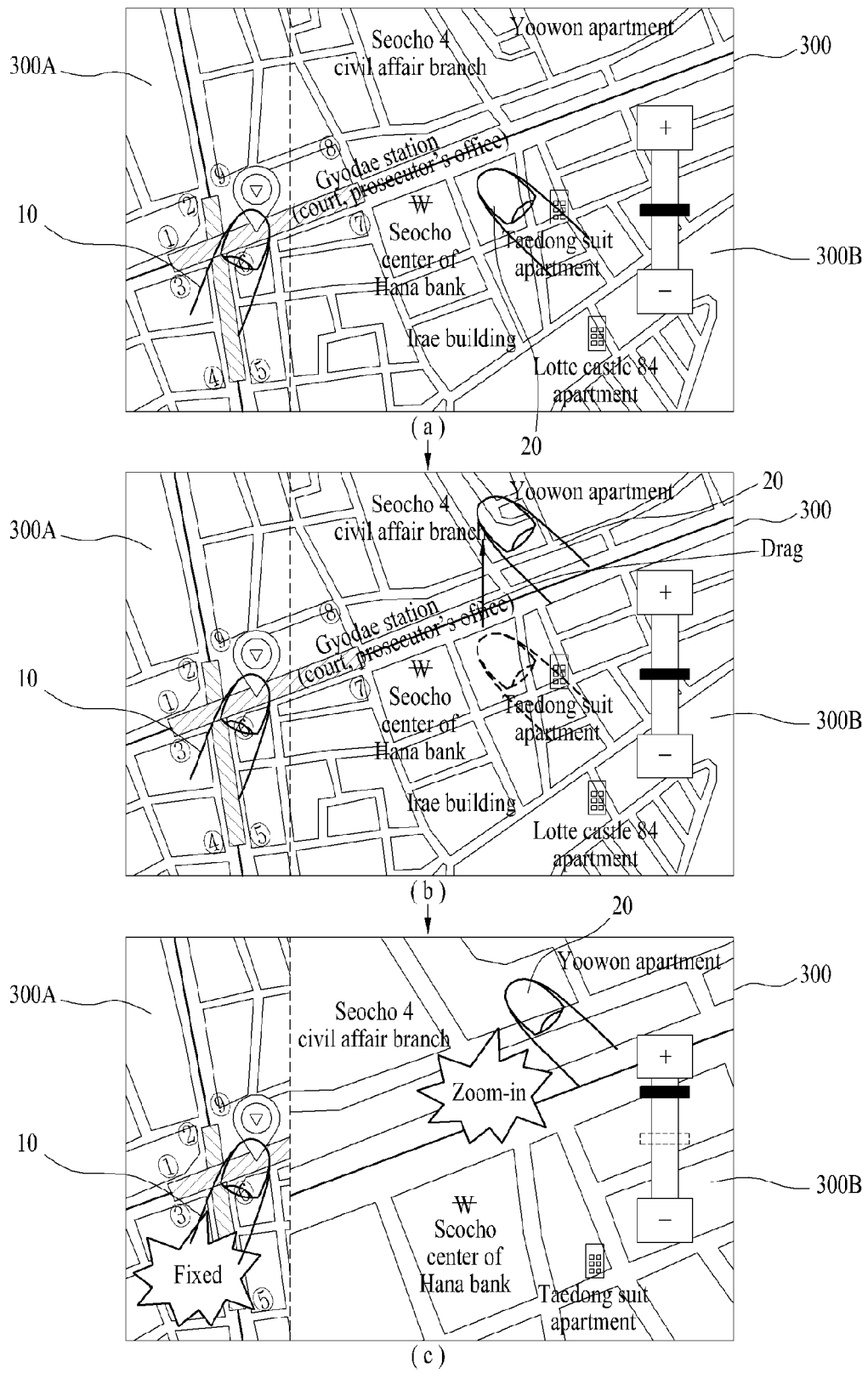

FIG. 4 shows the map 300 including the first region 300A and the second region 300B displayed on the touchscreen 151 (refer to FIG. 2A). Here, the map 300 displayed on the touchscreen 151 may represent a preset radius of a region at which the mobile terminal 100 is currently located. The controller 180 may obtain a current position of the mobile terminal via the position-location module 115, and then display the map 300 in which regions including regions in the vicinity of the obtained position of the mobile terminal 100 are contained.

Here, FIG. 4 exemplarily shows that the regions in the vicinity of the position of the mobile terminal include the first region 300A and the second region 300B. Information related to the target objects included in the first and second regions 300A and 300B can be displayed on the map 300. The information related to the target objects may include detailed positions, homepage addresses, names and phone numbers of the corresponding target objects.

Still referring to FIG. 4, a zoom-in/zoom-out bar for zooming in or zooming out on the map 300 may be displayed on the map 300. Hence, a user is able to zoom in or zoom out on a specific point on the map 300 by manipulating the zoom-in/zoom-out bar. In one embodiment of the present invention, a user may zoom in or zoom out on a specific point on the map 300 by performing a two-point multi-touch instead of zooming in/zooming out on the map 300 via the zoom-in/zoom-out bar.

In particular, while a first touch 10 is performed on the first region 300A of the map 300 (FIG. 4(a)), a second touch 20 is performed on the second region 300B (FIG. 4(b)). Subsequently, if the second touch 20 is moved in a certain direction while the second touch 20 is maintained on the second region 300B (FIG. 4(b)), the display of the first region 300A is fixed while the second region 300B is zoomed in according to the direction of movement of the second touch 20.

For example, if the second touch 20 is dragged in an upward direction (FIG. 4(b)), the second region 300B is zoomed in to correspond to a distance between an initial touch point of the second touch 20 and an end point of the drag (FIG. 4(c)). Of course, the direction of the second touch 20 for the zoom-in display of the second region 300B is not limited to the upward direction. According to implementation, the direction of the second touch 20 may be changed to one of a downward, right, left, diagonal, clockwise or counterclockwise direction, for example, and the controller 180 can zoom-in on the second region 300B to correspond to the direction of movement of the second touch 20.

Here, even if the second region 300B is zoomed in, the initial display state of the first region 300A remains intact. Thus, the controller 180 controls the first region 300A of the first touch 10 to be fixed on the map 300 and also controls the second region 300B of the second touch 20 to be zoomed in on according to the direction of movement of the second touch 20.

Figure 5:
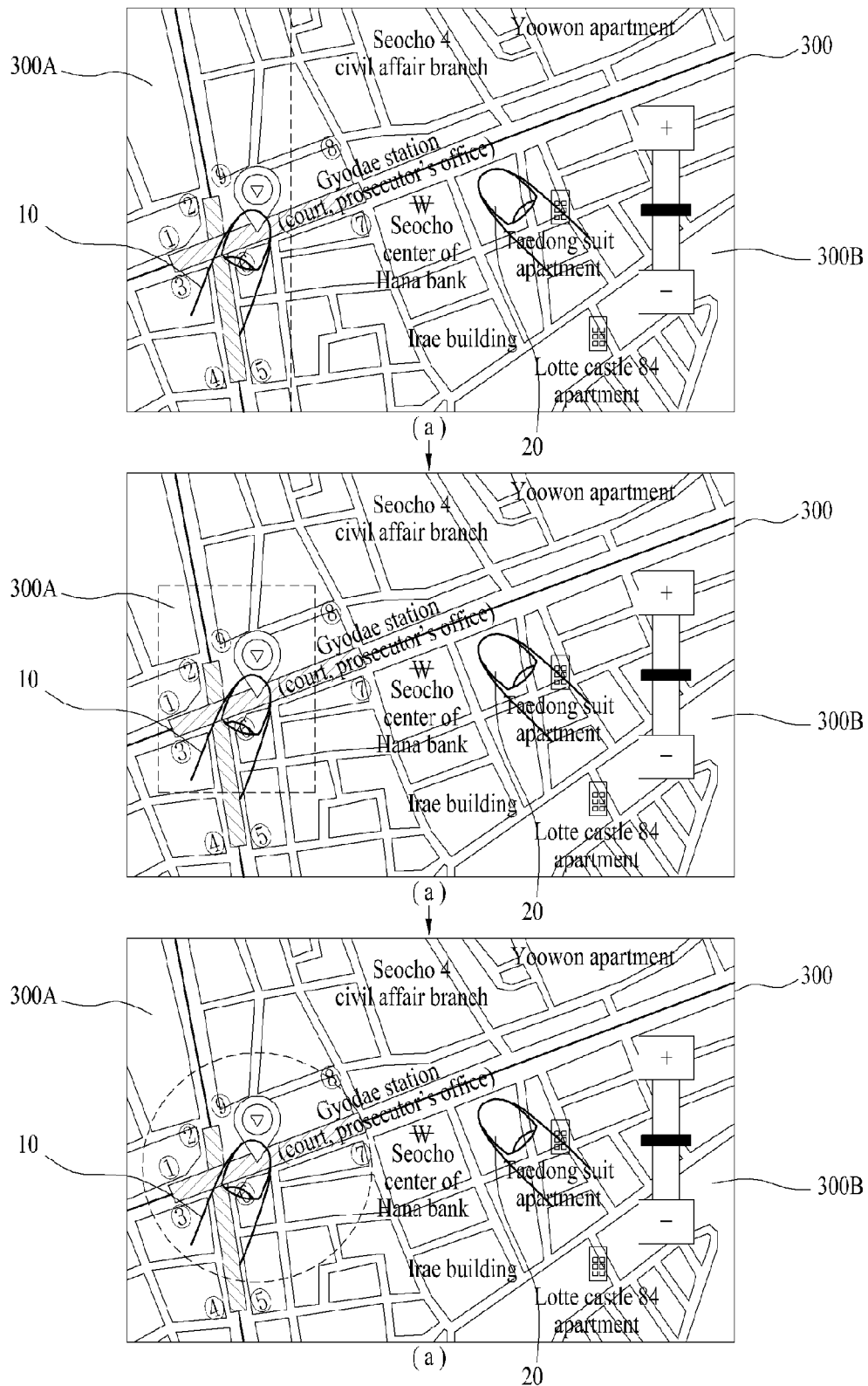
Figure 7:
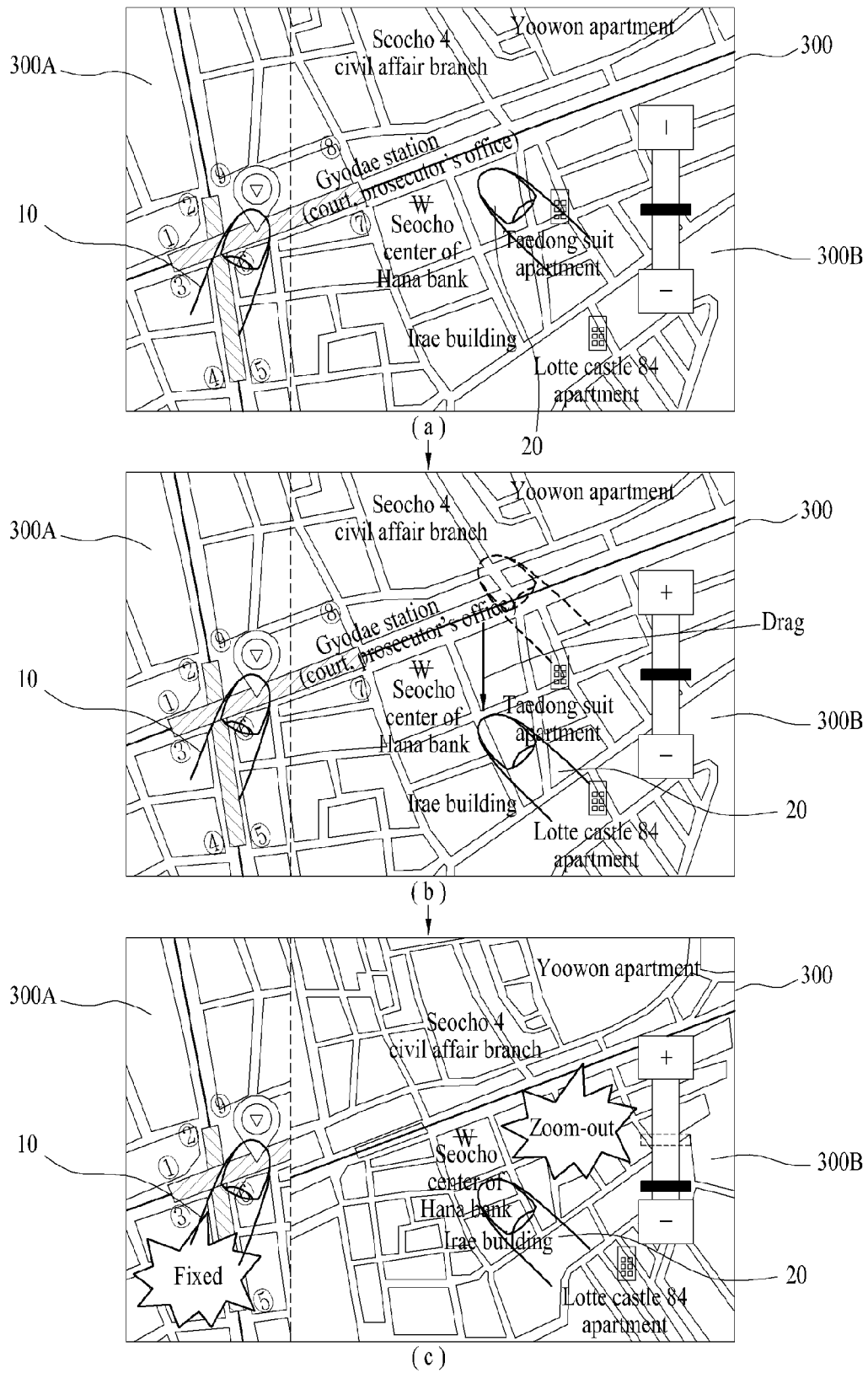

In doing so, the controller 180 may recognize the region corresponding to the first region 300A of the first touch 10 on the map 300 in various ways, as shown in FIG. 5. In particular, if the first touch 10 is performed on the first region 300A of the map 300, the controller 180 may recognize a perimeter radius or perimeter area of the touch point of the first touch 10 as the first region 300A.

Accordingly, the perimeter radius/area can be variably set by the user. In particular, if the user performs the first touch 10 on a specific point on the map 300 initially, the controller 180 may provide the user with a setting window for setting the perimeter radius/area of the point on which the first touch 10 is performed. FIGS. 5(a) to 5(c) illustrate various perimeter radiuses/areas of the point on which the first touch 10 is performed in accordance with the user's settings.

In one embodiment, when the display of the first region 300A is fixed within the map 300, if the second region 300B is zoomed in, unnatural distortion may be generated from a corresponding image. Referring to FIG. 6(a), to prevent the generation of unnatural distortion, if a first touch 10 and a second touch 20 are performed on the first region 300A and the second region 300B of the map 300, respectively, the controller 180 displays the first region 300A and the second region 300B spaced apart from each other on the map 300 by a predetermined distance d.

In particular, if the first touch 10 to the first region 300A is maintained while the first region 300A and the second region 300B are spaced apart from each other, the controller 180 fixes the display of the first region 300A on the map 300. If the second touch 20 to the second region 300B is moved in a certain direction, the controller 180 controls the display of the second region 300B to be zoomed in corresponding to the direction of movement, thereby preventing an image of the map 300 from being distorted.

Referring to FIG. 6(b), if a first touch 10 is performed on the first region 300A, the controller 180 may extract the first region 300A from the map 300. Subsequently, after a second touch 20 is performed on the second region 300B, if the second touch 20 is moved in a certain direction, the controller 180 controls the display of the second region 300B to be zoomed in corresponding to the direction of movement of the second touch 20, and also controls the display of the extracted first region 300A to be overlaid on the map 300 including the zoomed-in second region 300B. Therefore, the distortion is prevented.

Referring to FIG. 7(a), after a first touch 10 and a second touch 20 are performed on the first region 300A and the second region 300B, respectively, if the second touch 20 is dragged in a downward direction (FIG. 7(b)), for example, opposite to the direction of movement of the second touch 20 in FIG. 4, while maintaining the first touch 10 and the second touch 20, the controller 180 fixes the display of the first region 300A, and controls the display of the second region 300B to be zoomed out corresponding to the direction of movement of the second touch 20 (FIG. 7(c)).

Figure 8:
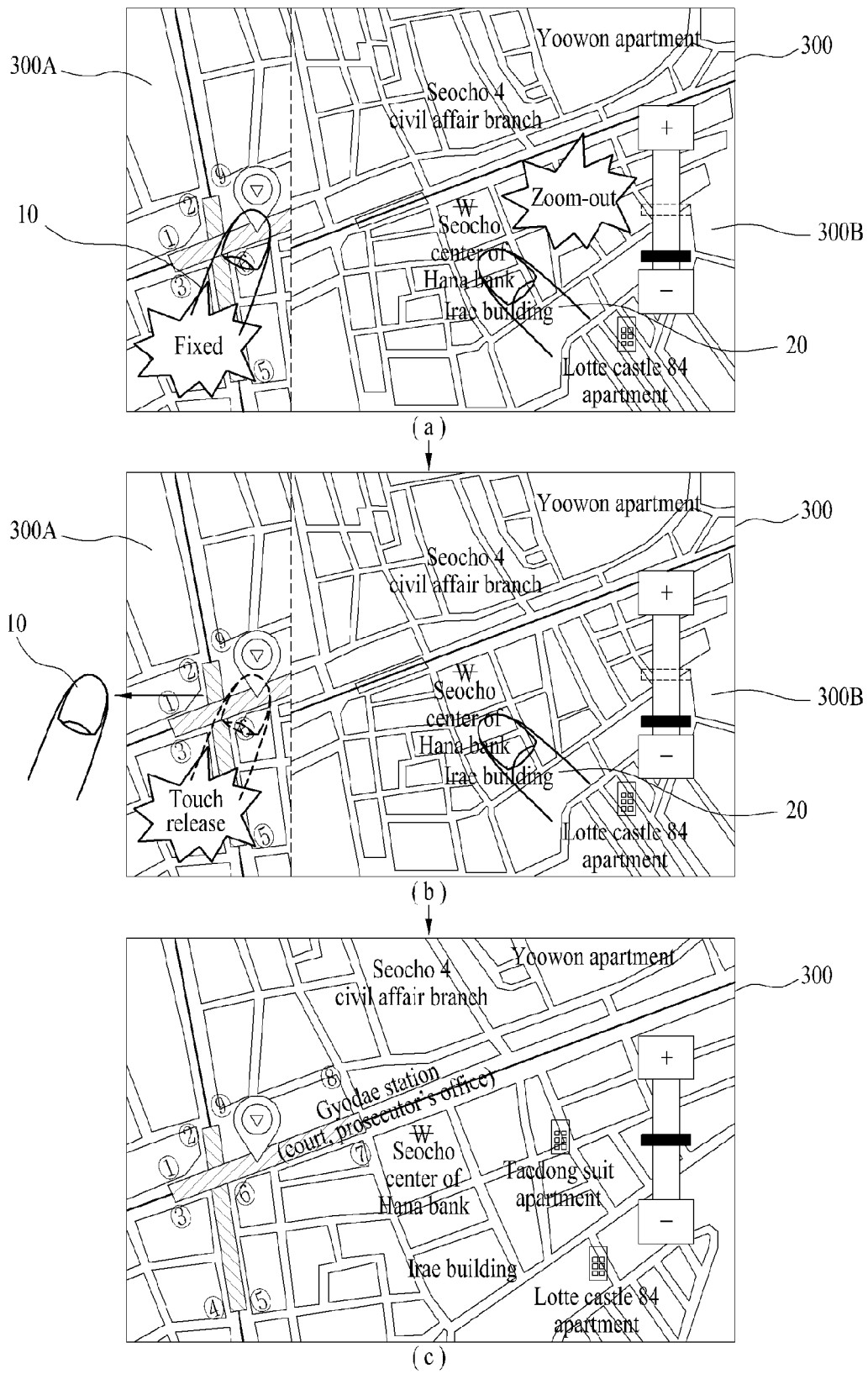
Figure 9:
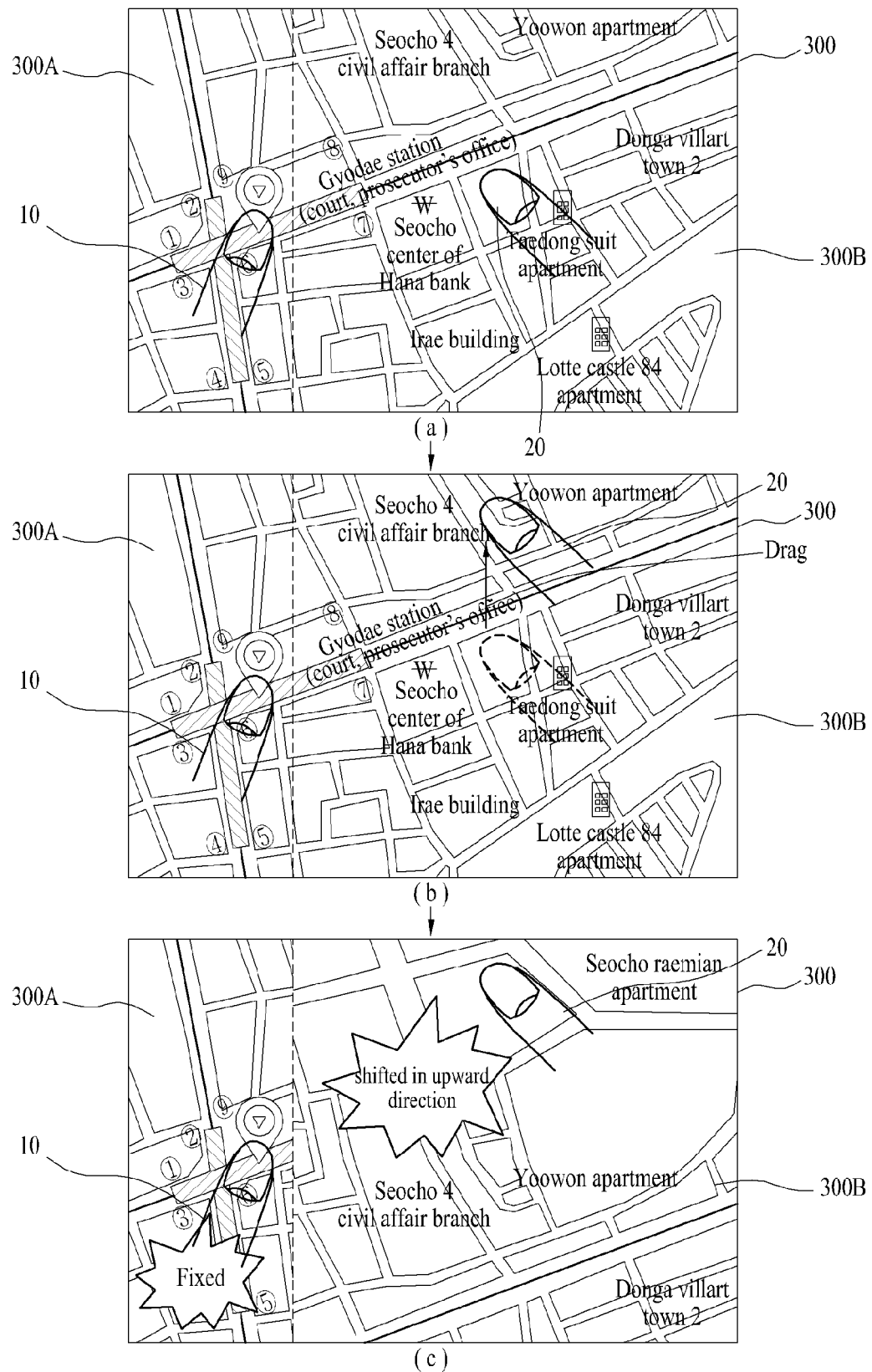
Figure 10:
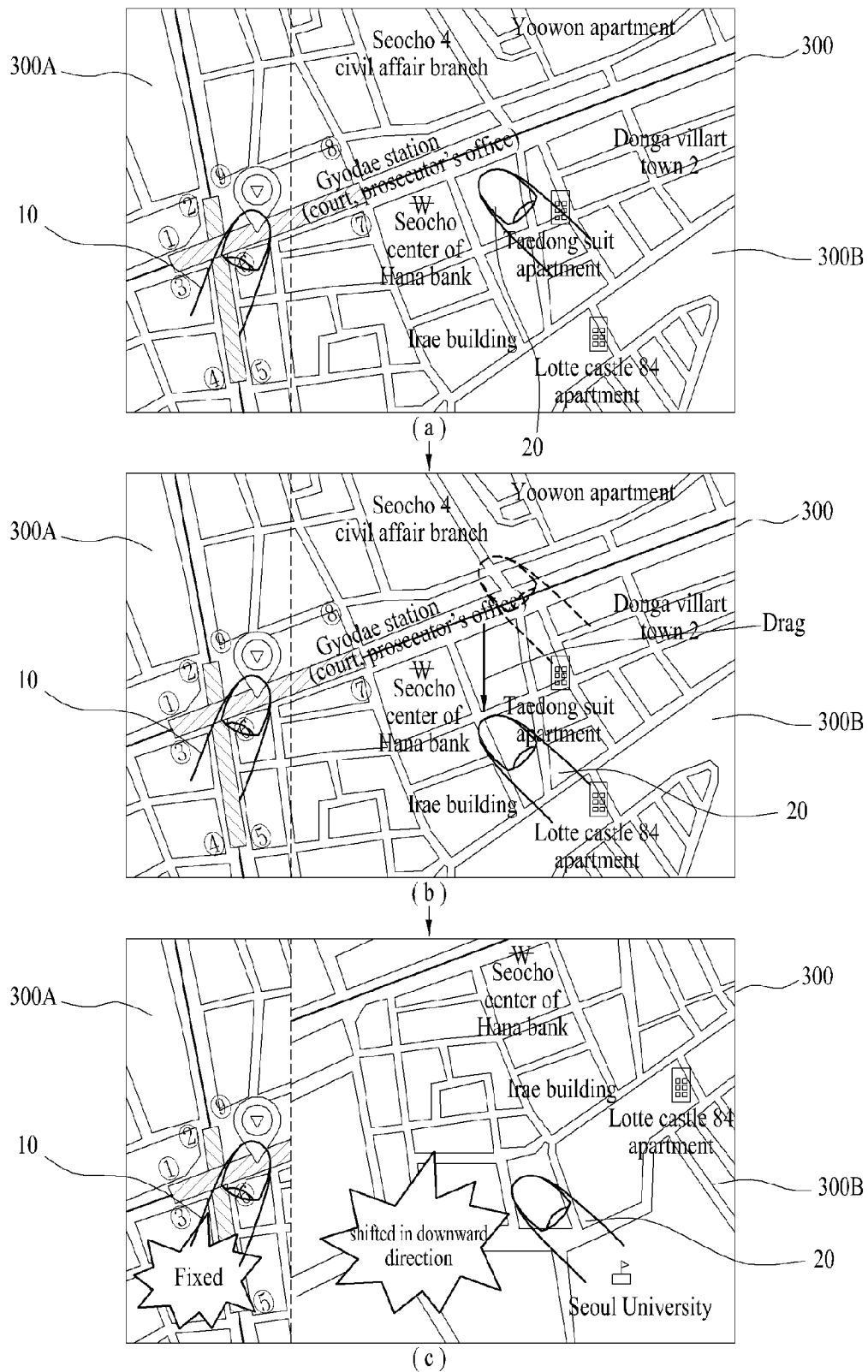

Referring to FIG. 8, when the second region 300B is zoomed in or zoomed out according to one of the methods shown in FIGS. 4 to 7, if the first touch 10 to the first region 300A is released, the controller 180 may display the second region 300B in an initial display state before the zoom-in or zoom-out. In particular, after the second region 300B is zoomed out (FIG. 8(a)), if the first touch 10 to the first region 300A is released (FIG. 8(b)), the controller 180 displays the second region 300B in its initial display state before the zoom-out (FIG. 8(c)).

Referring to FIGS. 9 to 12, the controller 180 may shift a display position of the second region 300B on the map 300, to correspond to a movement direction of the second touch 20.

Referring to FIG. 9(a), a first touch 10 is performed on a first region 300A of the map 300 and a second touch 20 is performed on a second region 300B of the map 300. If the second touch 20 is dragged in an upward direction (FIG. 9(b)), the controller 180 may control a region located near the top of the second region 300B to be shifted and displayed at a lower position on the display screen. The amount of shift may correspond to a distance between an initial touch point of the second touch 20 and an end point of the upward-direction drag (FIG. 9(c)).

If the second touch 20 is dragged in a downward direction (FIG. 10(a), FIG. 10(b)), the controller 180 may control a region located near the bottom of the second region 300B to be shifted and displayed at a higher position on the display screen. The amount of shift may correspond to a distance between an initial touch point of the second touch 20 and an end point of the downward-direction drag (FIG. 10(c)).

In particular, if the second touch 20 is performed in connection with movement, the controller 180 shifts a display position of the second region 300B on the map 300 according to the direction of movement of the second touch 20.

Figure 11:
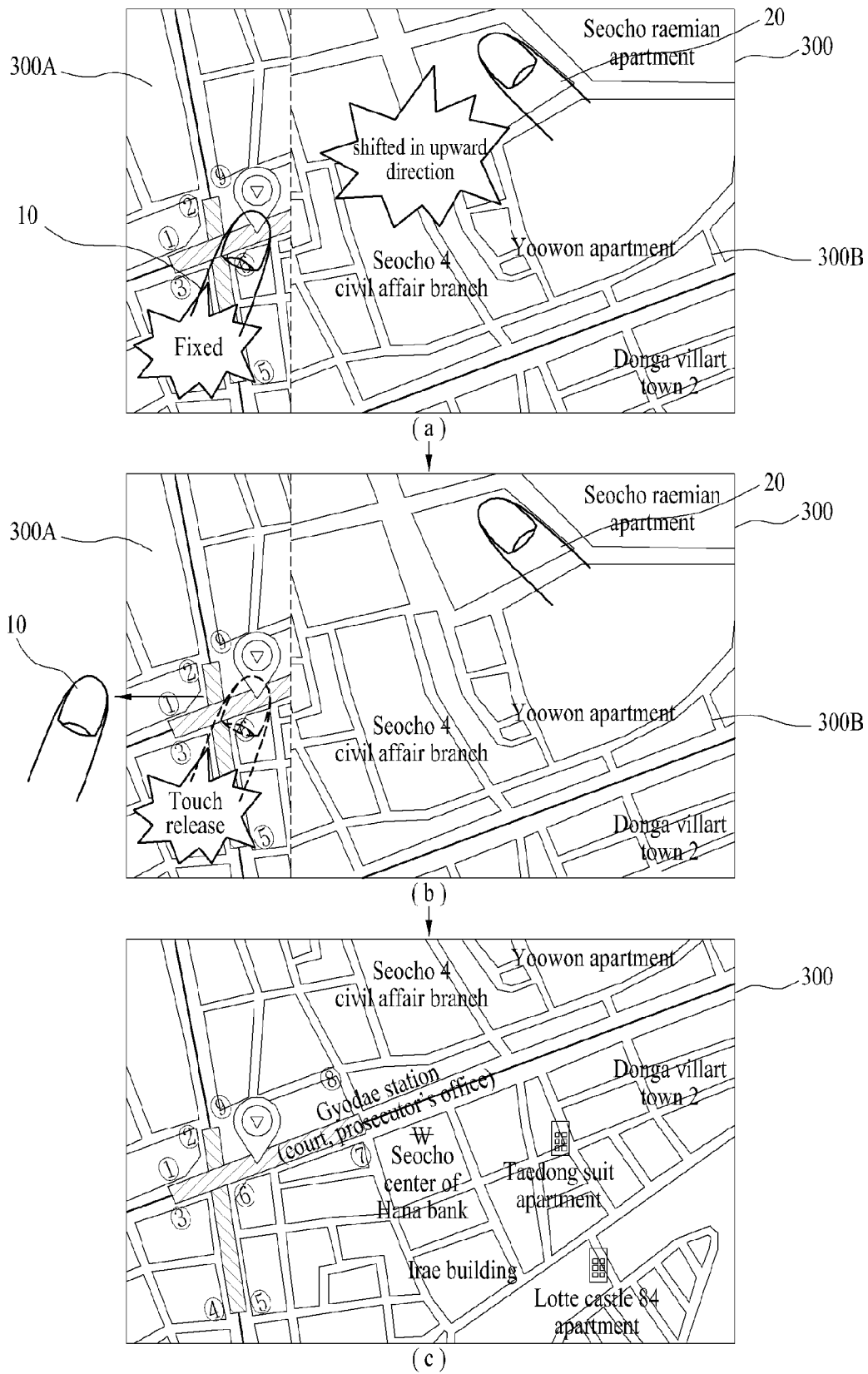

Referring to FIG. 11, after the display position of the second region 300B is shifted according to the movement direction of the second touch 20 (FIG. 11(a)), if the first touch 10 to the first region 300A is released (FIG. 11(b)), the controller 180 may again display the second region 300B in its initial state on the map 300 (FIG. 11(c)).

Figure 12:
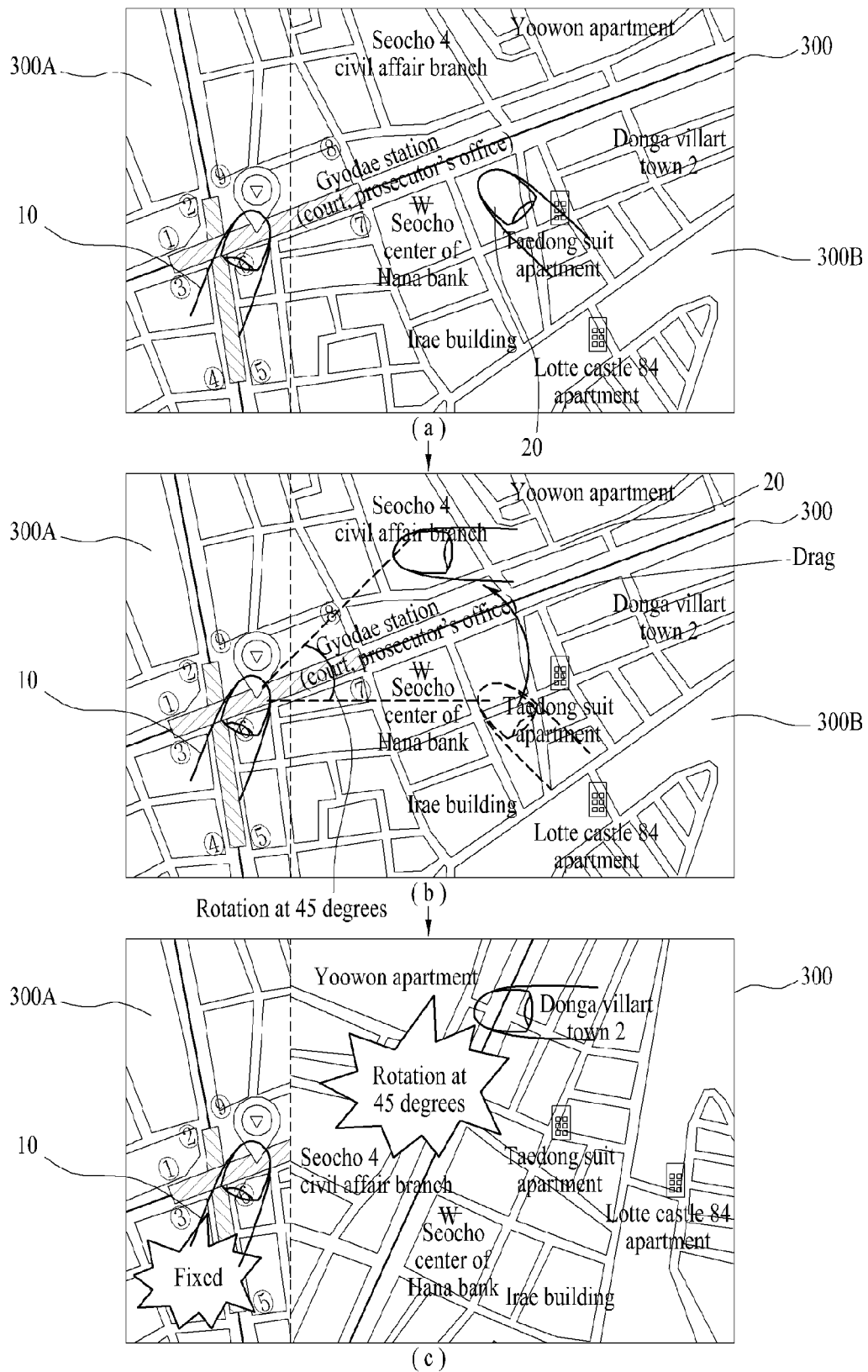

Referring to FIG. 12, while the second touch 20 to the second region 300B is maintained (FIG. 12(a), FIG. 12(b)), the second touch 20 may be moved in an angular direction with respect to a touch point of the first touch 10. Accordingly, the controller 180 may shift how the second region 300B is displayed by pivoting the second region 300B with respect to the touch point of the first touch 10 [FIG. 12(c)].

In particular, FIG. 12 exemplarily shows that an angle of the varying distance of the direction of the second touch 20 pivoting on the touch point of the first touch 10 is 45 degrees. Hence, the controller 180 controls the display of the second region 300B to rotate at an angle of 45 degrees from a currently displayed position on the map 300.

In accordance with an embodiment of the present invention, if a first touch 10 is performed on a specific target object in the first region 300A, the controller 180 searches the map 300 for all target objects associated with the specific target object of the first touch 10, controls the found target objects to be identifiably displayed, and controls information regarding the found target objects to be displayed.

If the second region 300B is touched while maintaining the first touch 10 to the specific target object in the first region 300A, the controller 180 searches the second region 300B for target objects associated with the specific target object of the first touch 10, and controls the found target objects and information regarding the found target objects to be displayed at corresponding positions in the second region 300B, respectively. While the information regarding the found target objects are displayed, if the first touch 10 is released, the controller 180 may control the information regarding the found target objects not to be displayed.

Figure 13:
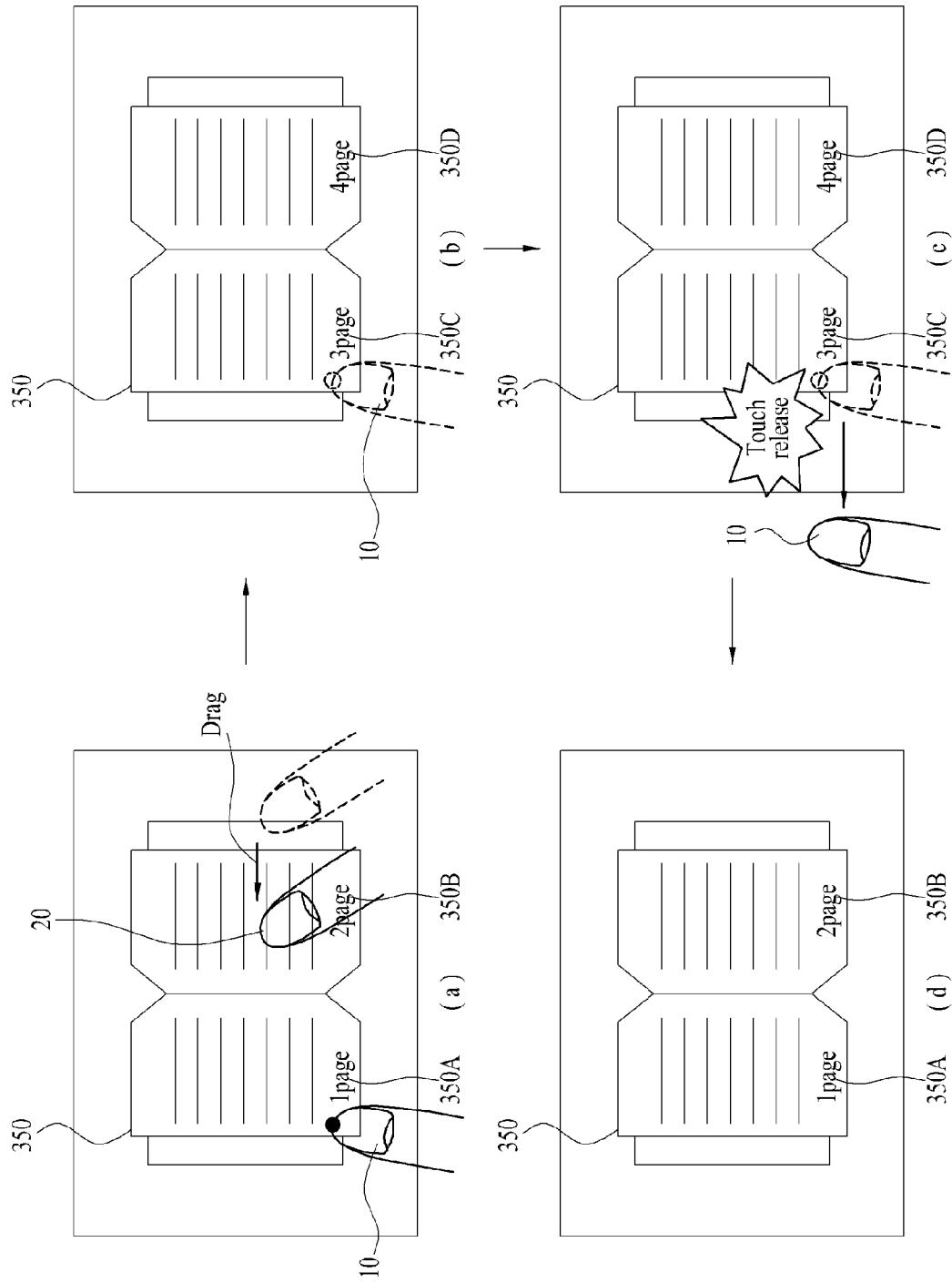
Figure 14:
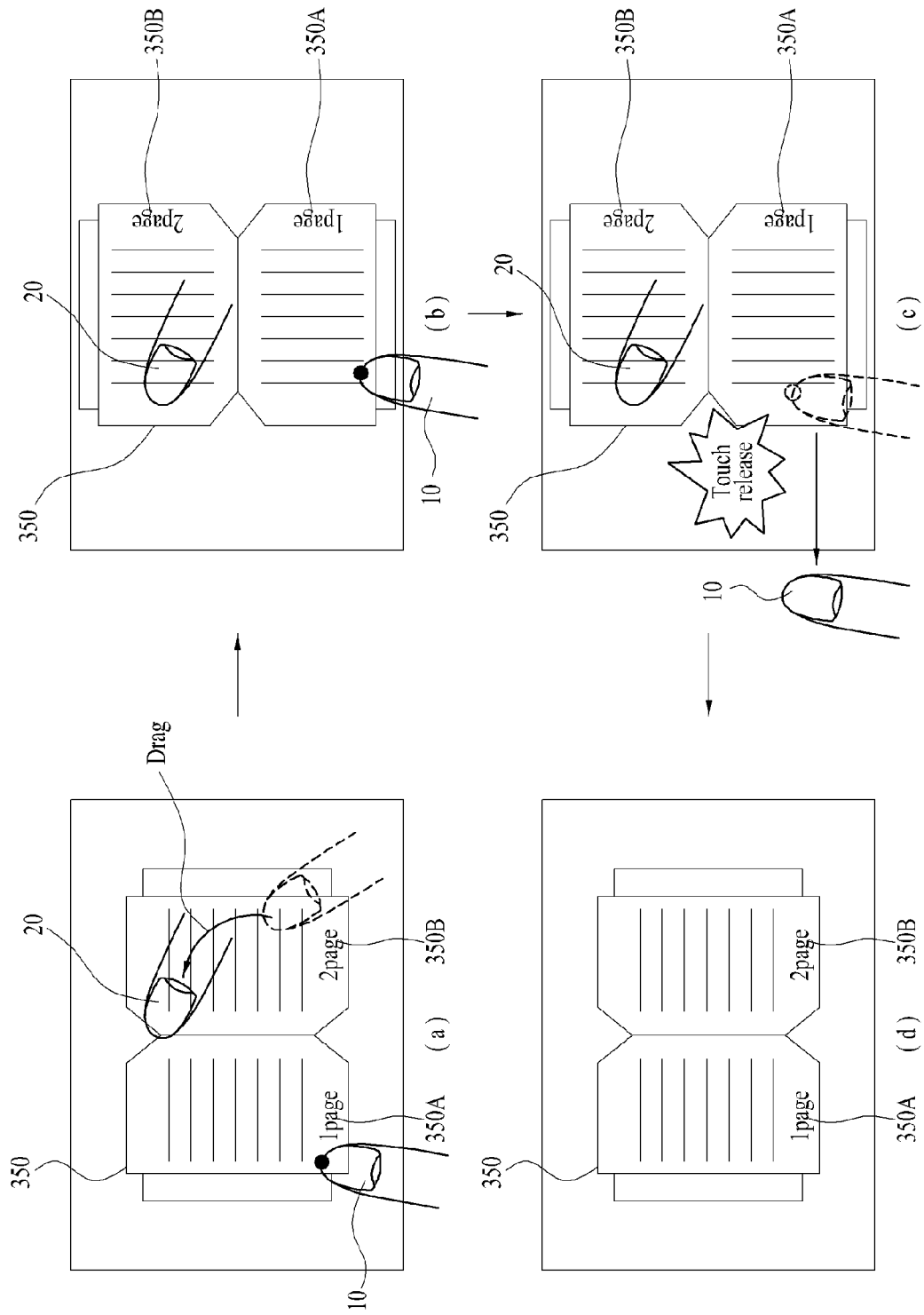

FIGS. 13 and 14 illustrate screen configurations of a method for controlling a display operation of an electronic book (e-book) displayed on a touchscreen using a two-point multi-touch in accordance with embodiments of the present invention.

Referring to FIGS. 3, 13 and 14, the content referred to in FIG. 3 is constructed with a plurality of pages and includes a page-turning e-book 350, which may be of a 2D or 3D type, as shown in FIGS. 13 and 14. The first object referred to in FIG. 3 corresponds to a first page 350A of the e-book 350, as shown in FIGS. 13 and 14. And, the second object referred to in FIG. 3 corresponds to a second page 350B of the e-book 350, as shown in FIGS. 13 and 14.

FIG. 13(a) shows that an e-book 350 includes a first page 350A and a second page 350B, which may be displayed on the touchscreen 151 of FIG. 2A. After a first touch 10 and a second touch 20 are performed on the first page 350A and the second page 350B, respectively, if the second touch 20 is moved in a certain direction, the controller 180 controls the first page 350A of the first touch 10 to be temporarily stored in the memory 160. And, the first and second pages 350A and 350B are no longer displayed to allow subsequent pages of the e-book 350, such as third and fourth pages 350C and 350D, to be displayed corresponding to the direction of movement of the second touch 20 [FIG. 13(b)]. In doing so, the first touch 10 to the first page 350A is maintained.

In particular, while the first touch 10 is maintained, after the first and second pages 350A and 350B have turned to the third and fourth pages 350C and 350D, if the first touch 10 is released [FIG. 13(c)], the third and fourth pages 350C and 350D displayed on the e-book 350 are turned back to the first and second pages 350A and 350B.

In one embodiment, when a user desires to check a content of a page next to a current page 350A in the course of reading the e-book 350, the user may bookmark a current page 350A using the first touch 10, check a content of the next page using the second touch 20, and release the first touch 10. When the user releases the first touch 10, the bookmarked page 350A is once again displayed allowing it to be read by the user.

Referring to FIG. 14, after a first touch 10 and a second touch 20 are performed on the first page 350A and the second page 350B, respectively, the second touch 20 may be moved in an angular direction [FIG. 14(a)] allowing the controller 180 to display the e-book 350 such that the e-book 350 is rotated to correspond to the direction of angular movement of the second touch 20 [FIG. 14(b)].

In particular, the controller may rotate the e-book 350 at an angle amounting to a distance of the angular movement of the second touch 20 by pivoting the e-book 350 with respect to the touch point of the first touch 10. For example, in FIG. 14(a) the distance of the angular movement of the second touch 20 is 90 degrees. Therefore, in FIG. 14(b), the e-book 350 is rotated at an angle of 90 degrees. After the e-book 350 is rotated to correspond to the direction of angular movement of the second touch 20, if the first touch 10 is released [FIG. 14(c)], the controller 180 displays the e-book 350 in its initial state prior to the rotation [FIG. 14(d)].

Figure 15:
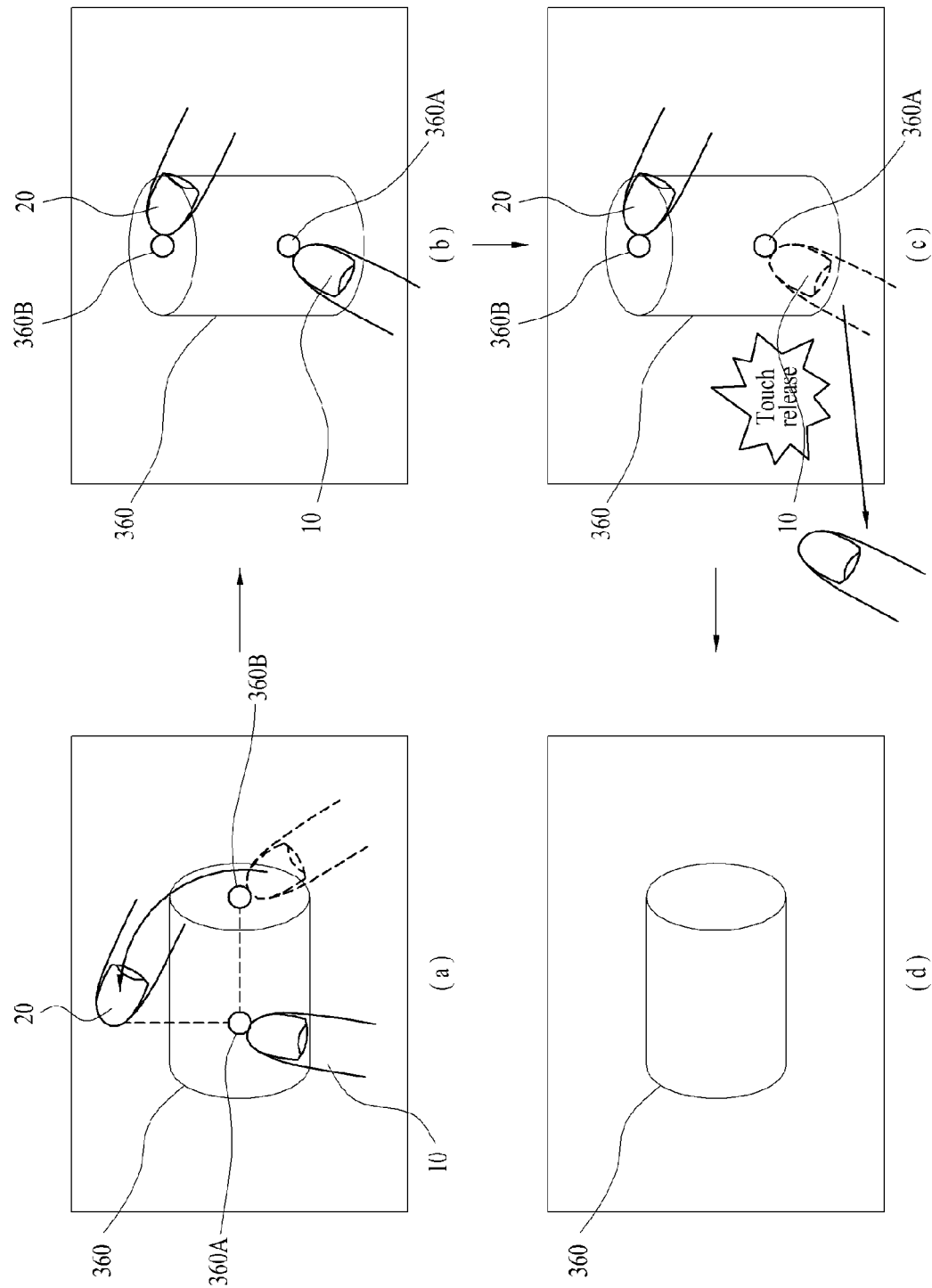
Figure 16:
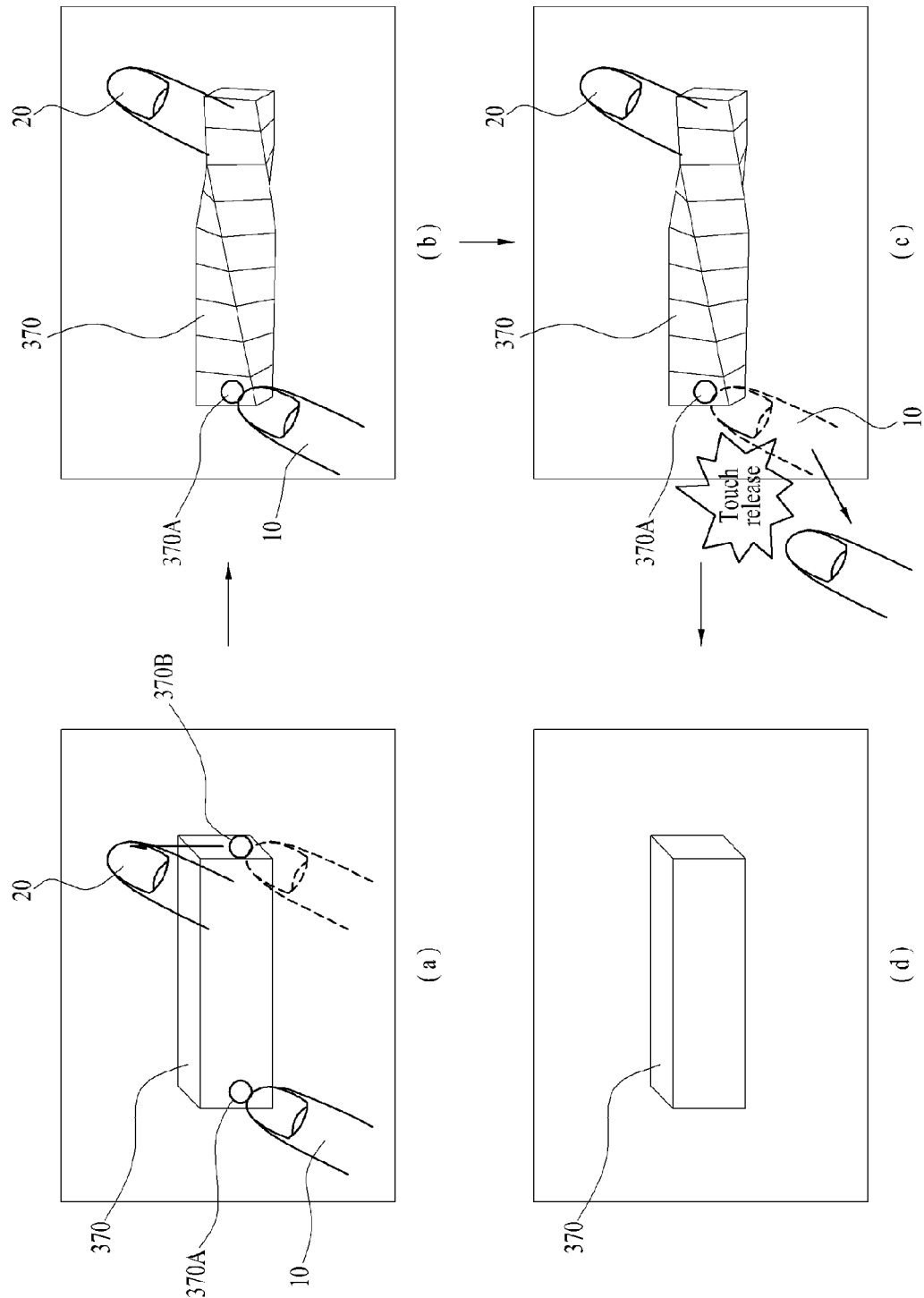
Figure 17:
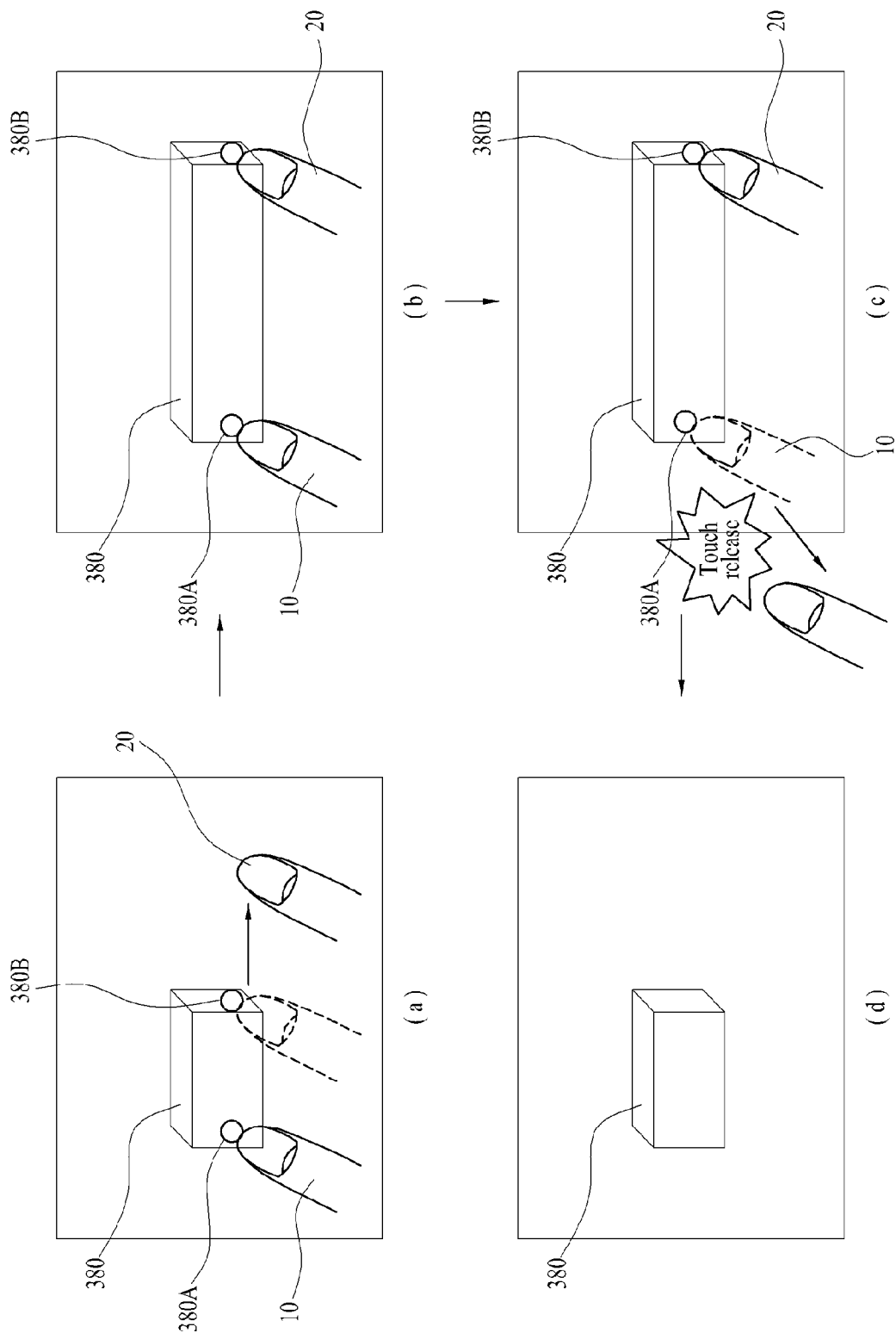

FIGS. 15 to 17 illustrate screen configurations of a method for controlling a display operation of a 3D object displayed on a touchscreen using a two-point multi-touch in accordance with embodiments of the present invention.

Referring to FIGS. 3 and 15 to 17, the content referred to in FIG. 3 is a 3D object 360, 370 or 380, as shown in FIGS. 15, 16 and 17, respectively. The first object referred to in FIG. 3 is a first part of the 3D object 360A, 370A or 380A, as shown in FIGS. 15, 16 and 17, respectively. The second object referred to in FIG. 3 is a second part of the 3D object different from the first part, as shown in FIGS. 15, 16 and 17, respectively.

Referring to FIG. 15(a), a first touch 10 is performed on a first part 360A of a 3D object 360 displayed on the touchscreen 151. While the first touch 10 is maintained, a second touch 20 is performed on a second part 360B of the 3D object 360. In this case, if the second touch 20 is moved in an angular direction, referring to FIG. 15(b), the controller 180 may display the 3D object 360 such that the 3D object 360 is rotated to correspond to the angular direction of movement of the second touch 20.

In particular, the controller rotates the 3D object 360 at an angle amounting to a distance of the angular movement of the second touch 20 by pivoting the 3D object 360 with respect to the touch point of the first touch 10. For example, FIG. 15(a) shows that the angle from the initial touch point of the second touch 20 to the moved end point is 90 degrees. Thus, in FIG. 15(b), the 3D object 360 is rotated at an angle of 90 degrees. After the 3D object 360 is rotated to correspond to the angular movement of the second touch 20, if the first touch 10 to the first part 360A is released [FIG. 15(c)], the controller 180 displays the 3D object 360 in its initial state prior to the rotation [FIG. 15(d)].

Referring to FIG. 16(a), a first touch 10 is performed on a first part 370A of a 3D object 370 displayed on the touchscreen 151. While the first touch 10 is maintained, a second touch 20 is performed on a second part 370B of the 3D object 370. In this case, if the second touch 20 is moved in a certain direction, referring to FIG. 16(b), the controller 180 controls the display of the 3D object 370 such that the 3D object 370 is twisted to correspond to the direction of movement of the second touch 20 on the second part 370B.

In particular, if the second touch 20 is dragged in an upward direction from an initially touched point of the second touch 20, the controller 180 displays the 3D object 370 in a twisted manner to correspond to a dragged distance in the direction of movement from the initially touched point. Here, if the dragged distance of the second touch 20 in the direction of movement from the initially touched point is relatively short, a twisted extent of the 3D object 370 is relatively small. On the contrary, if the dragged distance of the second touch 20 in the direction of movement from the initially touched point is relatively long, the twisted extent of the 3D object is relatively large. After the 3D object 370 is displayed by being twisted to correspond to the direction of movement of the second touch 20, if the first touch 10 to the first part 370A is released [FIG. 16(c)], the controller 180 displays the 3D object 370 in its initial state prior to being twisted [FIG. 16(d)].

Referring to FIG. 17(a), a first touch 10 is performed on a first part 380A of a 3D object 380 displayed on the touchscreen 151. While the first touch 10 is maintained, a second touch 20 is performed on a second part 380B of the 3D object 380. In this case, if the second touch 20 is moved in a certain direction, referring to FIG. 17(b), the controller 180 displays the 3D object 370 such that a length of the 3D object 380 is increased to correspond to the direction of movement of the second touch 20.

In particular, if the second touch 20 is dragged from an initially touched point of the second touch 20 to a specific end point to elongate the 3D object 380, the controller 180 displays the 3D object 380 in an elongated manner from the initially touched point to the dragged end point. After the 3D object 380 is displayed elongated to correspond to the direction of movement of the second touch 20, if the first touch 10 to the first part 380A is released [FIG. 17(c)], the controller 180 displays the 3D object 380 in its initial state prior to the elongation [FIG. 17(d)].

Figure 18:
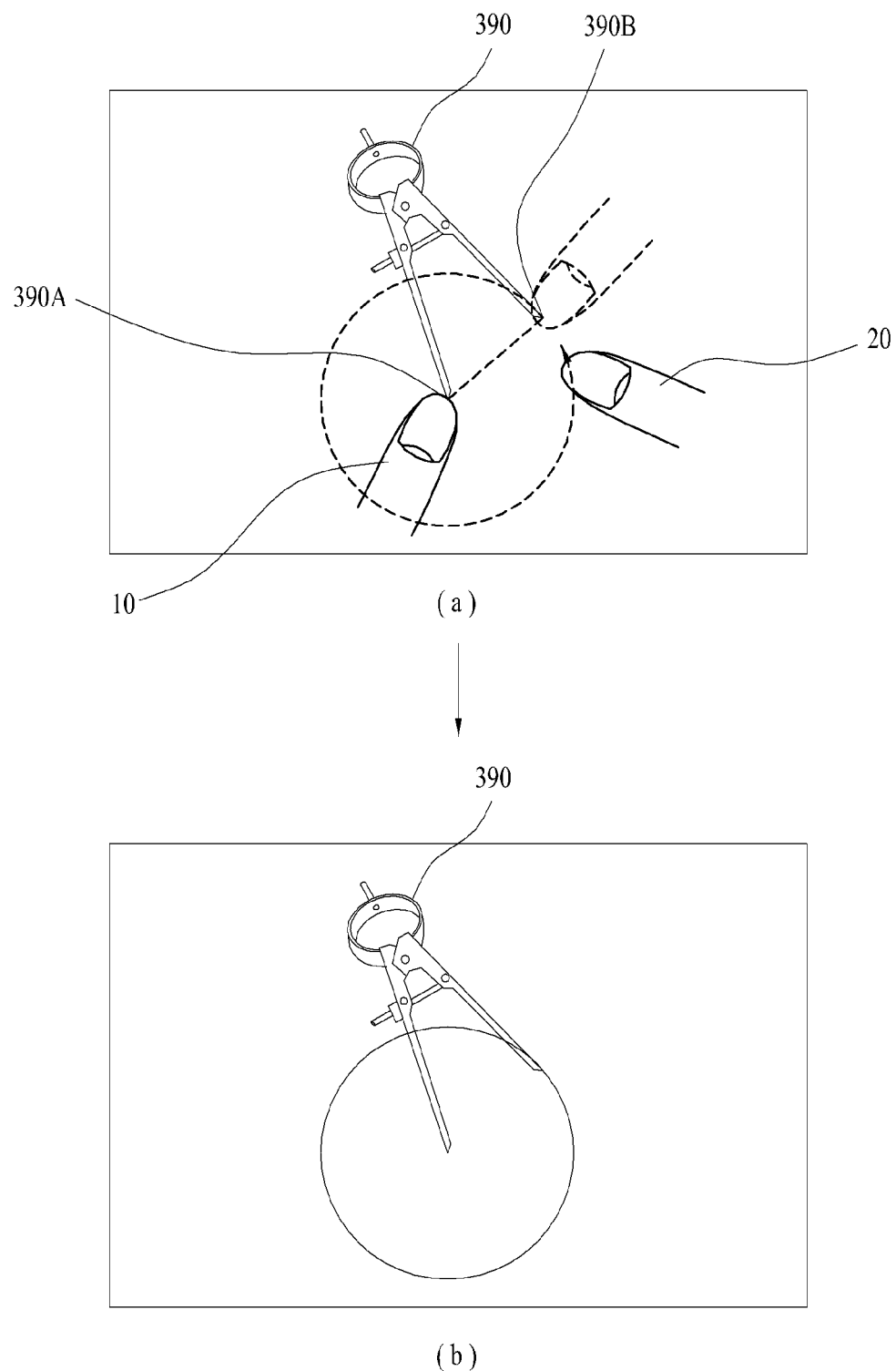

FIGS. 18 and 19 illustrate screen configurations of a method for drawing a picture on a touchscreen using a two-point multi-touch in accordance with embodiments of the present invention.

FIG. 18(a) illustrates a paint plate application driven under the control of the controller 180. In FIG. 18(a), an image of the paint plate may be displayed on the touchscreen 151 of FIG. 2A.

Referring to FIGS. 3 and 18(a), the content referred to in FIG. 3 is a 3D object 390 having a compass shape for drawing a circle shape on the paint plate image, as shown in FIG. 18(a). The first object referred to in FIG. 3 is a first part 390A of the 3D object 390, as shown in FIG. 18(a). The second object referred to in FIG. 3 is a second part 390B of the 3D object 390 different from the first part 390A, as shown in FIG. 18(a).

Referring to FIG. 18(a), a first touch 10 is performed on the first part 390A of the 3D object 390 displayed on the touchscreen 151 and a second touch 20 is performed on the second part 390B of the 3D object 390 while the first touch 10 is maintained. If the second touch 20 is moved in a certain direction, such as an angular or circular direction, referring to FIG. 18(b), the controller 180 displays a line on the paint plate image corresponding to the direction of movement of the second touch 20.

In particular, if the position of the first part 390A of the compass 390 is fixed according to the first touch 10 and the second part 390B is rotated according to the second touch 20 by pivoting with respect to the first part 390A at an angle of 360 degrees, referring to FIG. 18(b), the controller 180 displays a circle shape.

FIG. 19(a) illustrates a paint plate application driven under the control of the controller 180. In FIG. 19(a), an image of the paint plate is displayed on the touchscreen 151 of FIG. 2A.

Referring to FIGS. 3 and 19(a), the content referred to in FIG. 3 is a paint plate 400, as shown in FIG. 19(a). The first object referred to in FIG. 3 is a first part 400A of the paint plate 400, as shown in FIG. 19(a). The second object referred to in FIG. 3 is a second part 400B of the paint plate 400 different from the first part 400A, as shown in FIG. 19(a).

Referring to FIG. 19(a), after a first touch 10 and a second touch 20 are performed on the first part 400A of the paint plate 400 and the second part 400B of the paint plate 400, respectively, if the second touch 20 is moved in a certain direction, a diagram corresponding to the direction of movement of the second touch 20 is displayed on the paint plate 400. Referring to FIG. 19(b), a latter diagram having the same shape of a former diagram with reference to the first part 400A may be displayed symmetric to the former diagram.

FIG. 20 illustrates screen configurations of a method for controlling 3D depth levels of a plurality of 3D objects displayed on a touchscreen using a two-point multi-touch.

Referring to FIGS. 3 and 20, the content referred to in FIG. 3 is a 3D image 410 including a plurality of 3D objects, as shown in FIG. 20. The first object referred to in FIG. 3 is a first 3D object 410A of the 3D image 410, as shown in FIG. 20. The second object referred to in FIG. 3 is a second 3D object 410B of the 3D image 410, as shown in FIG. 20.

Each of the 3D objects included in the 3D image 410 can have a different 3D depth level. In particular, FIG. 20(a) shows that the first 3D object 410A has a lowest depth level in the 3D image 410 and the second 3D object 410B has a highest depth level in the 3D image 410. In more detail, a 3D object appearing closer within the 3D image 410 has a lower depth level while a 3D object appearing farther has a higher depth level.

Referring to FIG. 20(a), if a first touch 10 is performed on the first 3D object 410A in the 3D image 410, the controller 180 fixes a position of the first 3D object 410A on the 3D image 410. While the first 3D object 410A is fixed, a second touch 20 is performed on the second 3D object 410B. Subsequently, if the second touch 20 is moved in a certain direction, referring to FIG. 20(b), the controller 180 controls a depth level of the second 3D object 410B such that a depth level of the second 3D object 410B approaches the depth level of the first 3D object 410A of the first touch 10. In doing so, as the second touch 20 of the second 3D object 410B is dragged to a position in the vicinity of the first 3D object 410A, the depth level of the second 3D object 410B is changed to the same depth level of the first 3D object 410A.

Moreover, after a first touch 10 is performed on the first 3D object 410A, if a second touch 20 is performed on the second 3D object 410B while maintaining the first touch 10, the controller 180 is able to control the depth levels of the first and second 3D objects 410A and 410B to be switched with each other [not shown in FIG. 20].

In the above description, a process for controlling an operation of a content using a two-point multi-touch according to embodiments of the present invention is explained in detail with reference to FIGS. 3 to 20. In the following description, a process for controlling an operation of a content using a three-point multi-touch is explained in detail with reference to FIGS. 21 to 47.

According to other embodiments of the present invention, after a multi-touch of three points (triple multi-touch) is input to content on a screen, if the input triple multi-touch varies, an operation of the content is controlled to correspond to the variation of the triple multi-touch.

In the following description of the other embodiments, a method for changing a shape of a 3D object according to a variation of the triple multi-touch is explained. As with the embodiments of the present invention described above, the content type of the present invention is not limited to the 3D object only.

Figure 21:
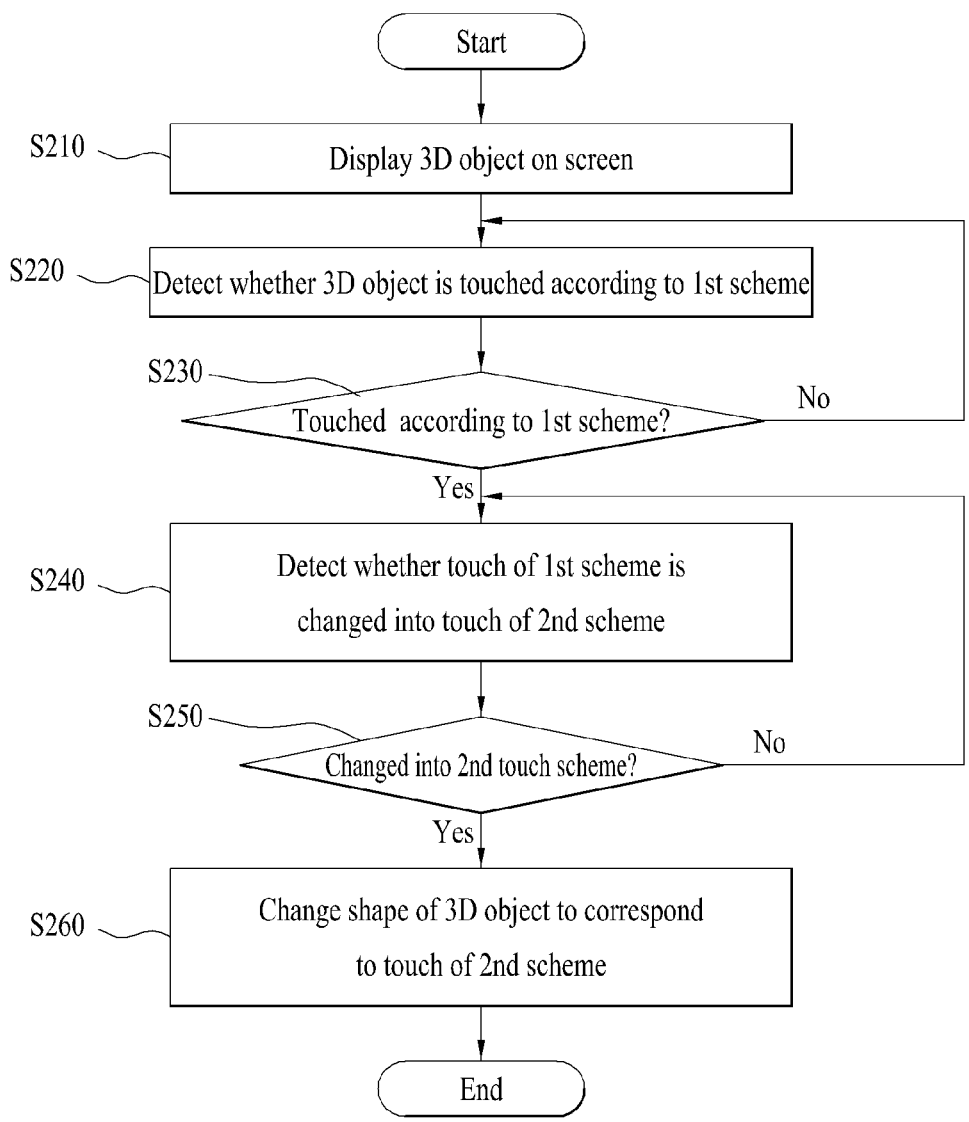
FIG. 21 is a flowchart of a method for changing a shape of a three-dimensional (3D) object using a three-point multi-touch according to embodiments of the present invention.
Figure 22:
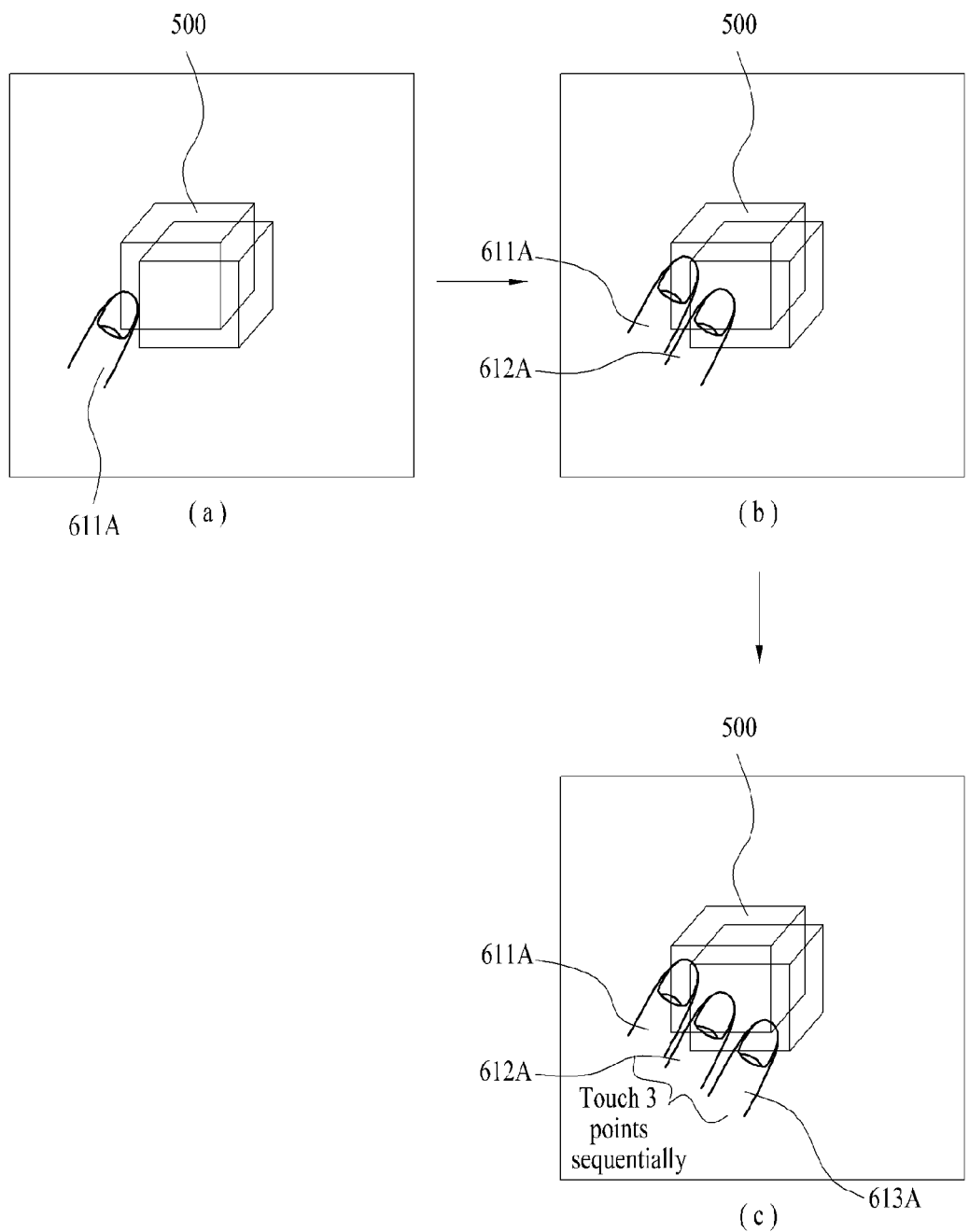

FIG. 21 is a flowchart of a method for changing a shape of a 3D object using a triple multi-touch according to an embodiment of the present invention. Referring to FIG. 21, if a 3D object is selected by a user via the touchscreen 151 (refer to FIG. 2A) or the user input unit 130 (refer to FIG. 1), the controller 180 controls the selected 3D object to be displayed on the touchscreen 151 [S210]. Once the 3D object 500 is displayed, the controller 180 detects whether the user performs a first touch on the 3D object according to a first touch scheme [S220].

In the following description, the first touch scheme of another embodiment of the present invention is explained in detail with reference to FIGS. 22 to 25. FIGS. 22 to 25 illustrate screen configurations of a first touch scheme for changing a shape of a 3D object.

Referring to FIGS. 22 to 25, the first touch scheme relates to a triple multi-touch performed wherein a user touches three points of the 3D object 500.

In FIGS. 22(a) to FIG. 22(c) in turn, a user touches the 3D object 500 with three fingers 611A, 612A and 613A in sequence. In particular, if the three points of the 3D object 500 are sequentially touched, the controller 180 switches a current operating mode to an operating mode for changing a shape of the 3D object 500. Afterwards, if a touch of a second touch scheme for changing the shape of the 3D object 500 is input, the controller 180 controls a shape of the 3D object 500 according to the second touch scheme.

Referring to FIG. 23, the triple multi-touch may be performed such that after a user has initially touched a first point of the 3D object 500 with a first finger 611A [FIG. 23(a)], the user simultaneously touches second and third points of the 3D object 500 with second and third fingers 612A and 613A, respectively [FIG. 23(b)].

Referring to FIG. 24, the triple multi-touch may be performed by a user simultaneously touching first and second points of the 3D object 500 with first and second fingers 611A and 612A, respectively [FIG. 24(a)], and then touching a third point of the 3D object 500 with a third finger 613A [FIG. 24(b)].

Figure 25:
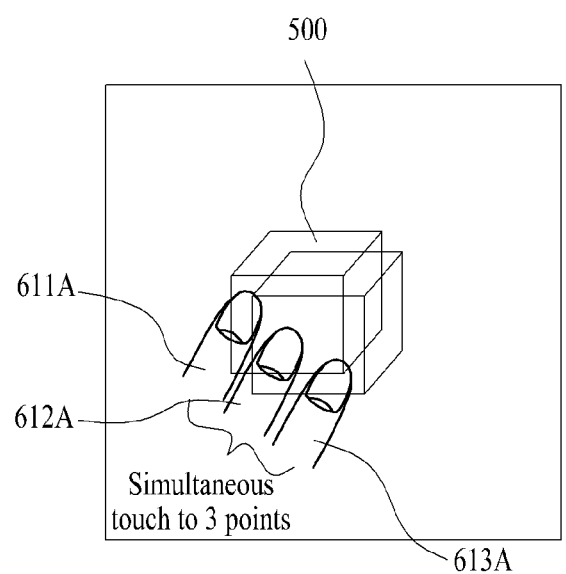
Figure 28:
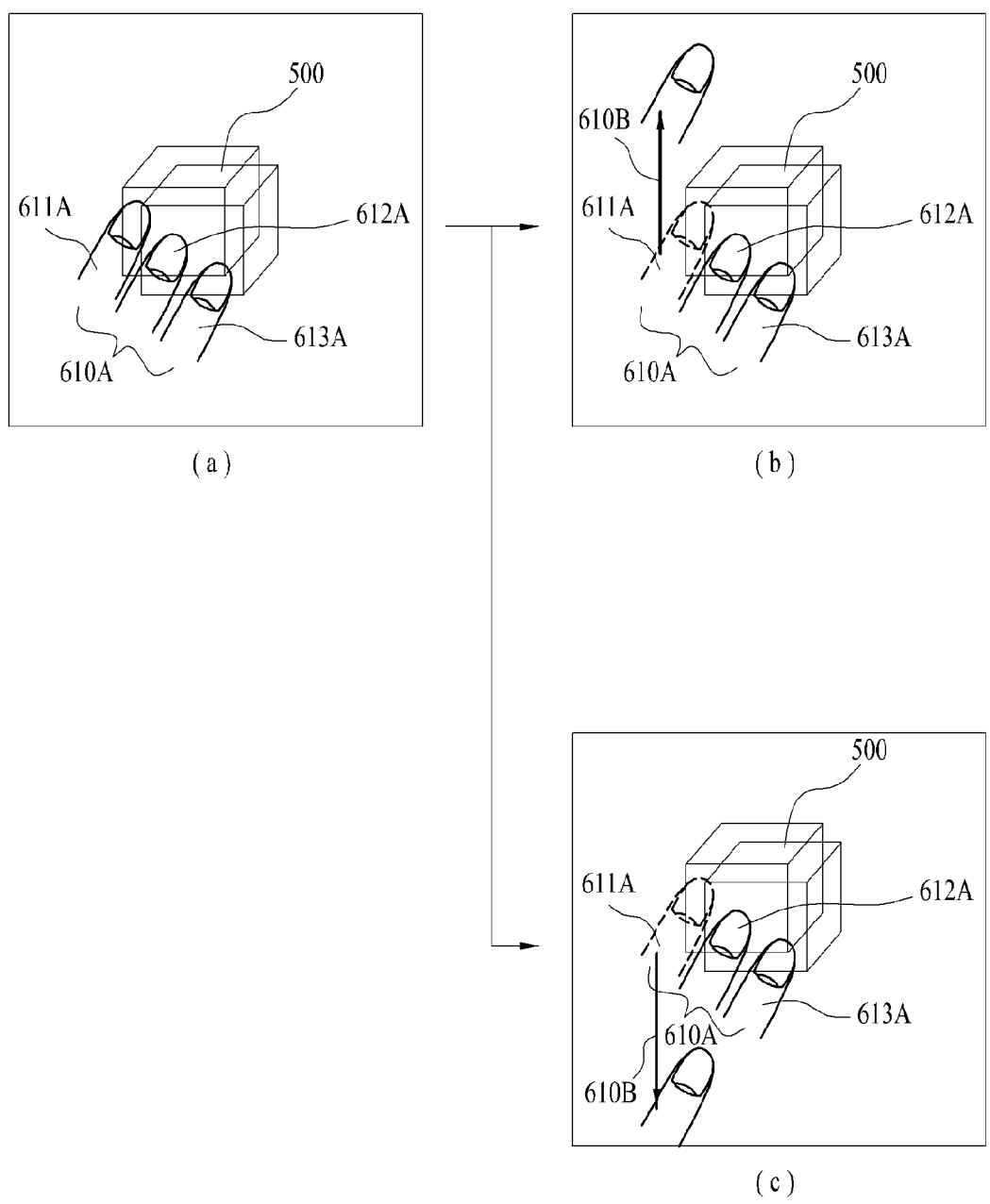
Figure 29:
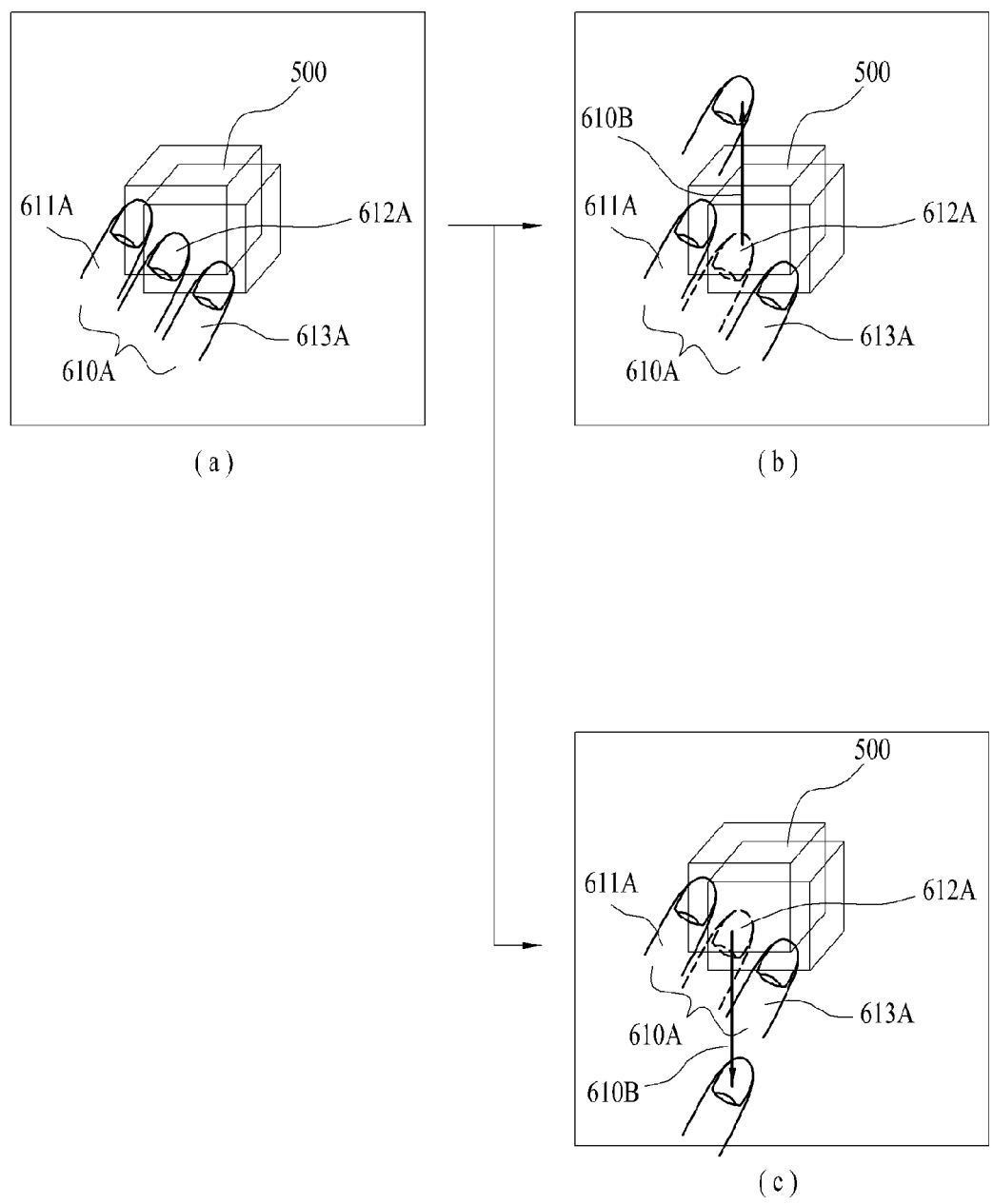
Figure 30:
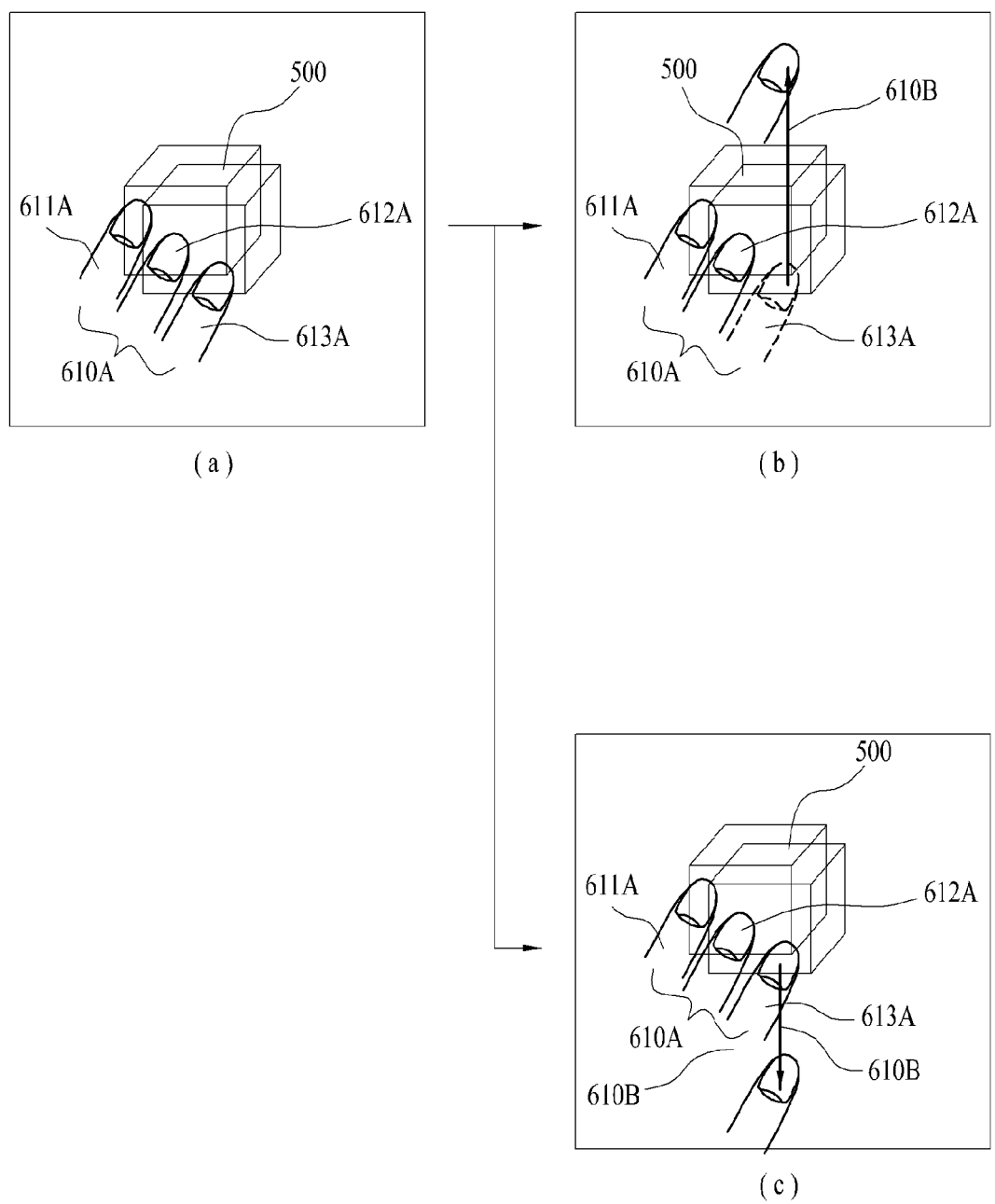
Figure 31:
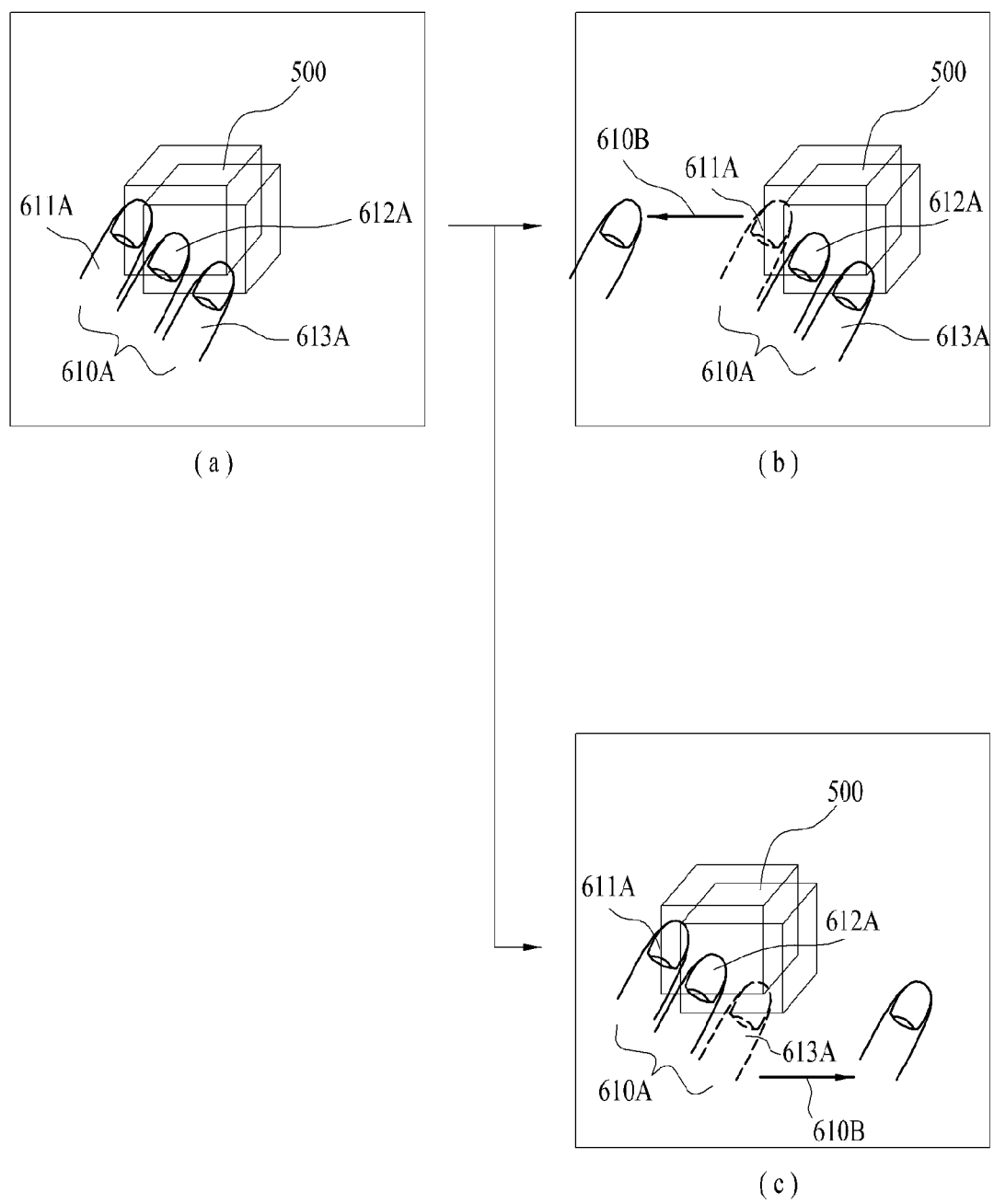

Referring to FIG. 25, the triple multi-touch may be performed by a user simultaneously touching the 3D object 500 with three fingers 611A, 612A and 613A.

According to one embodiment, while a 2D object is initially displayed on the touchscreen 151 instead of a 3D object 500, if a touch according to the first scheme described with reference to FIGS. 22 to 25 is input to the 2D object by a user, the controller 180 switches the 2D object to a 3D object 500, and displays the 3D object 500. Moreover, the controller 180 may switch a current operating mode to an operating mode for changing a shape of the 3D object 500 [not shown in FIGS. 22 to 25].

Referring to FIG. 21, as a result of the detection in step S220, if the user touches the 3D object 500 according to the first touch scheme [S230], the controller 180 controls whether a touch of a second touch scheme for changing a shape of the 3D object 500 is inputted via the touchscreen 151 [S240]. Here, the second touch scheme does not refer to a touch additionally inputted after a touch of the first scheme is inputted to the 3D object 500. Rather, a touch according to the second touch scheme refers to a touch performed by moving the touch of the first touch scheme in a certain direction or changing a gesture of the touch of the first touch scheme while maintaining the touch of the first touch scheme on the 3D object 500.

In the following description, the second touch scheme is explained in detail with reference to FIGS. 26 to 34. FIGS. 26 to 34 illustrate screen configurations for a second touch scheme for changing a shape of a 3D object according to embodiments of the present invention.

Referring to FIGS. 26 to 34, the second touch scheme relates to a change in the touch of the first scheme corresponding to the triple multi-touch. In particular, the second touch scheme may include a scheme wherein at least one of three points is dragged in a specific direction while maintaining the touch according to the first touch scheme on the three points of the 3D object 500. Alternatively, the second touch scheme may include a scheme wherein a touch distance between two of the touched three points is varied. In another alternative, the second touch scheme may include a mix of a drag scheme and a distance variation scheme. In particular, the second touch scheme may include a scheme of performing a drag in a specific direction while a touch distance between two of the touched three points is varied, or a scheme of dragging two of the touched three points in a specific direction and then varying the distance between the dragged two points.

FIGS. 26 and 27 illustrate a second touch scheme 610B including a scheme of dragging a touch of the first touch scheme 610A in a specific direction. Referring to FIGS. 26(a) and 26(b), the second touch scheme 610B includes the scheme of dragging the touch of the first touch scheme 610A in an upward direction. Referring to FIGS. 26(a) and 26(c), the second touch scheme 610B includes the scheme of dragging the touch of the first touch scheme 610A in a downward direction.

Referring to FIGS. 27(a) and 27(b), the second touch scheme 610B includes the scheme of dragging the touch of the first touch scheme 610A in a left direction. Referring to FIGS. 27(a) and 27(c), the second touch scheme 610B includes the scheme of dragging the touch of the first scheme 610A in a right direction. According to embodiments of the invention, the second touch scheme 610B includes the scheme of dragging the touch of the first touch scheme 610A in one of an upward, a downward, a left, a right or a diagonal direction.

Referring to FIGS. 28 to 31, the second touch scheme 610B according to other embodiments of the present invention will be described. According to one embodiment, while the touch of the first scheme 610A is inputted (touching three points on the 3D object 500), a distance between at least one of the touched three points and the rest of the touched three points varies. Alternatively, one of the touched three points may be dragged in a specific direction, while the rest of the two points remain in a fixed position.

In particular, the second touch scheme 610B is performed in the following manner. Referring to FIGS. 28(a) and 28(b), while three points are touched on the 3D object 500, positions of the touched second and third points remain fixed while the first point is dragged in an upward direction. Referring to FIGS. 28(a) and 28(c), the second touch scheme 610B provides that positions of the touched second and third points remain fixed while the first point is dragged in a downward direction.

Referring to FIGS. 29(a) and 29(b), the second touch scheme 610B provides that while three points are touched on the 3D object 500, positions of the touched first and third points remain fixed while the second point is dragged in an upward direction. Referring to FIGS. 29(a) and 29(c), the second touch scheme 610B provides that positions of the touched first and third points remain fixed while the second point is dragged in a downward direction.

Referring to FIGS. 30(a) and 30(b), the second touch scheme 610B provides that while three points are touched on the 3D object 500, positions of the touched first and second points remain fixed while the third point is dragged in an upward direction. Referring to FIGS. 30(a) and 30(c), the second touch scheme 610B provides that positions of the touched first and second points remain fixed while the third point is dragged in a downward direction.

Referring to FIGS. 31(a) and 31(b), the second touch scheme 610B provides that while three points are touched on the 3D object 500, positions of the touched second and third points remain fixed while the first point is dragged in a left direction. Referring to FIGS. 31(a) and 31(c), the second touch scheme 610B provides that positions of the touched first and second points remain fixed while the third point is dragged in a right direction.

Referring to FIGS. 32(a) and 32(b), the second touch scheme 610B provides that while three points are touched on the 3D object 500, a position of the touched third point remains fixed while the touched first and second points are dragged in an upward direction. Referring to FIGS. 32(a) and 32(c), the second touch scheme 610B provides that a position of the touched third point remains fixed while the touched first and second points are dragged in a downward direction.

Referring to FIGS. 33(a) and 33(b), the second touch scheme 610B provides that while three points are touched on the 3D object 500, a position of the touched first point remains fixed while the touched second and third points are dragged in an upward direction. Referring to FIGS. 33(a) and 33(c), the second touch scheme 610B provides that a position of the touched first point remains fixed while the touched second and third points are dragged in a downward direction.

Referring to FIGS. 34(a) and 34(b), the second touch scheme 610B provides that while three points are touched on the 3D object 500, a position of the touched third point remains fixed while the touched first and second points are dragged in a left direction. Referring to FIGS. 34(a) and 34(c), the second touch scheme 610B provides that a position of the touched third point remains fixed while the touched second and third points are dragged in a right direction.

Referring to FIGS. 21 to 34, as a result of the detection in step S240, if the first touch scheme 610A is changed into the second touch scheme 610B by the user [S250], the controller 180 changes the shape of the 3D object 500 to correspond to the touch of the second scheme 610B [S260].

FIGS. 35 to 39 illustrate screen configurations of a method for changing a shape of a 3D object to correspond to a touch variation of a second touch scheme according to embodiments of the present invention.

Figure 35:
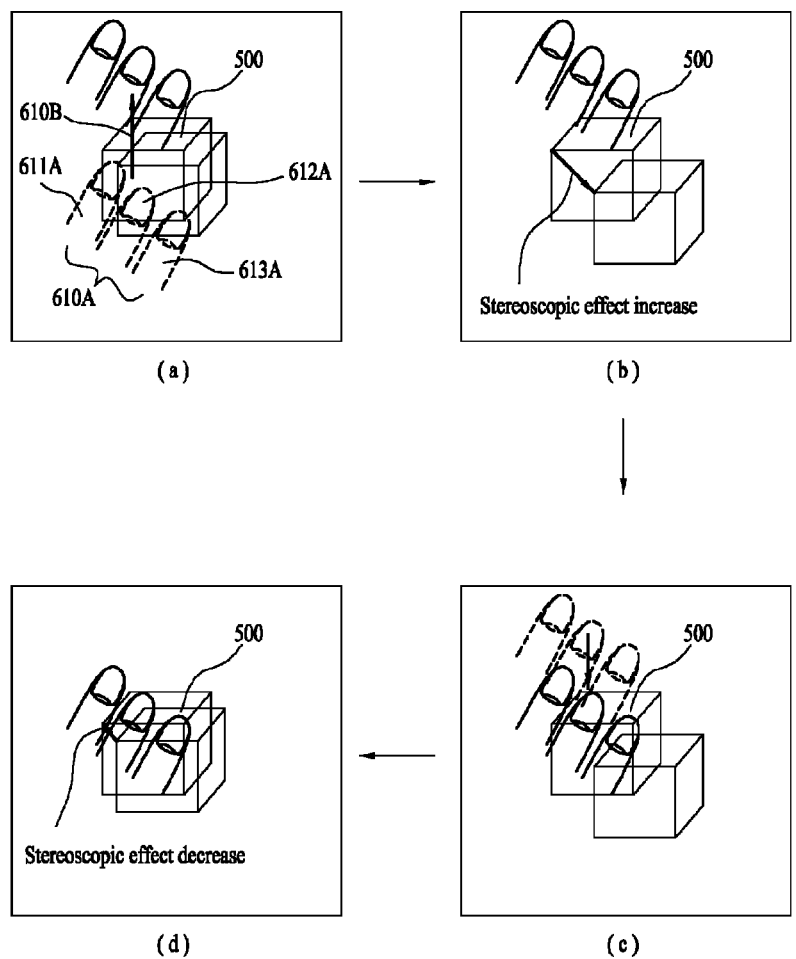
FIGS. 35 to 39 illustrate screen configurations of a method for changing a shape of a 3D object to correspond to a variation of a touch method according to an embodiment of the present invention.

Referring to FIG. 35, a stereoscopic effect level of the 3D object 500 is changed to correspond to the touch of the second touch scheme 610B. Here, the stereoscopic effect relates to a 3D effect attributed to a user's binocular disparity.

If the first touch scheme 610A for the 3D object 500 is changed to the second touch scheme 610B, the controller 180 calculates a variation from the first touch scheme 610A to the second touch scheme 610B and varies the 3D stereoscopic effect level of the 3D object 500 to correspond to the calculated variation.

In particular, referring to FIG. 35(*a*), if the touched three points of the 3D object 500 are dragged in an upward direction (first touch scheme 610A→second touch scheme 610B), the controller 180 raises the stereoscopic effect level of the 3D object 500 to correspond to the upward-directional drag distance variation, as shown in FIG. 35(*b*).

Referring to FIG. 35(*c*), while the stereoscopic effect level of the 3D object 500 is raised, if the user's fingers are dragged in a downward direction, the controller 180 lowers the stereoscopic effect level of the 3D object 500 to correspond to the downward-directional drag distance variation, as shown in FIG. 35(*d*).

Figure 36:
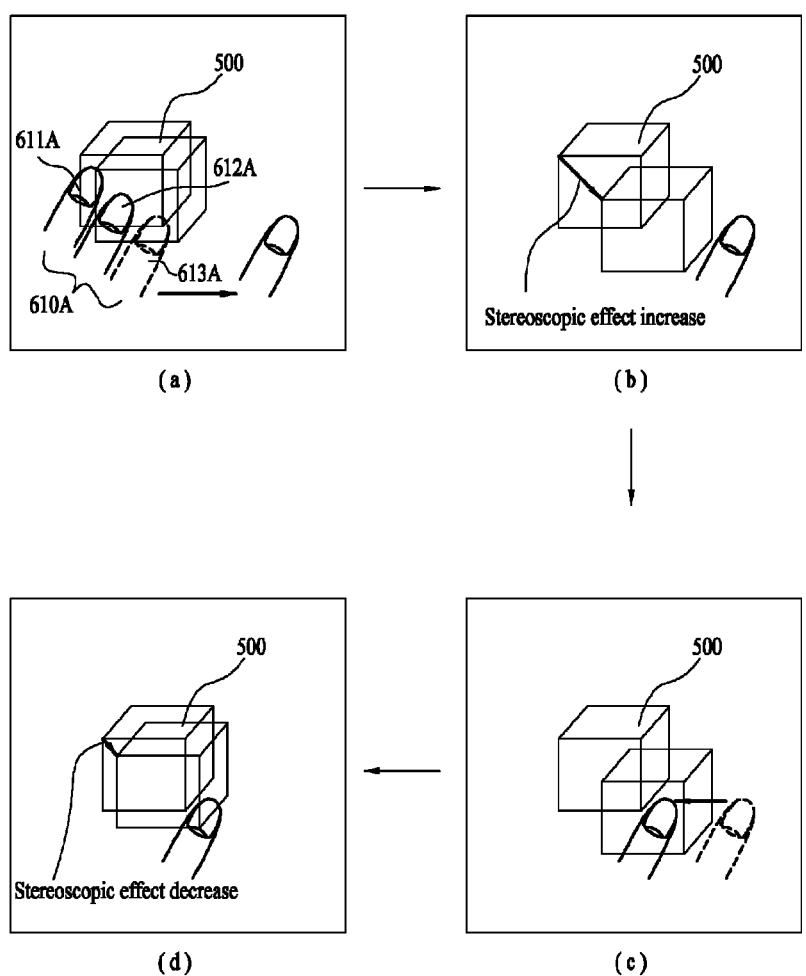

Alternatively, referring to FIG. 36(*a*), if positions of two of the touched three points of the 3D object 500 are fixed and the non-fixed touched point is dragged in a right direction (first touch scheme 610A→second touch scheme 610B), the controller 180 raises the stereoscopic effect level of the 3D object 500 to correspond to the right-directional drag distance variation, as shown in FIG. 36(*b*).

Referring to FIG. 36(*c*), while the stereoscopic effect level of the 3D object 500 is raised, if the user's finger dragged in the right direction is dragged in a left direction, the controller 180 lowers the stereoscopic effect level of the 3D object 500 to correspond to the left-directional drag distance variation, as shown in FIG. 36(*d*).

Figure 37:
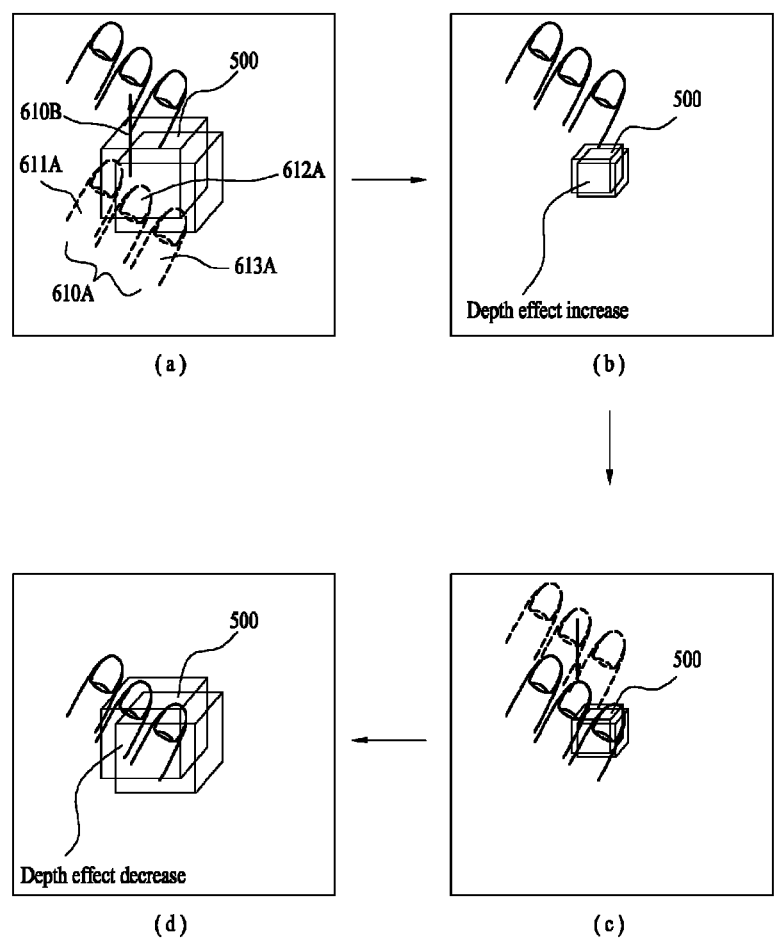

FIG. 37 illustrates that a depth effect level of the 3D object 500 is changed to correspond to the touch of the second touch scheme 610B.

According to one embodiment, an object appearing closer on a screen to a user has a low 3D depth effect level, while an object appearing farther on a screen to the user has a high 3D depth effect level. In particular, if the first touch scheme 610A for the 3D object 500 is changed into the second touch scheme 610B, the controller 180 calculates a variation from the first touch scheme 610A to the second touch scheme 610B and varies the 3D depth effect level of the 3D object 500 to correspond to the calculated variation.

Referring to FIG. 37(*a*), if the touched three points of the 3D object 500 are dragged in an upward direction (first touch scheme 610A→second touch scheme 610B), the controller 180 raises the depth effect level of the 3D object 500 to correspond to the upward-directional drag distance variation, as shown in FIG. 37(*b*).

Referring to FIG. 37(*c*), while the depth effect level of the 3D object 500 is raised, if the user's fingers are dragged in a downward direction, the controller 180 lowers the depth effect level of the 3D object 500 to correspond to the downward-directional drag distance variation, as shown in FIG. 37(*d*).

Figure 38:
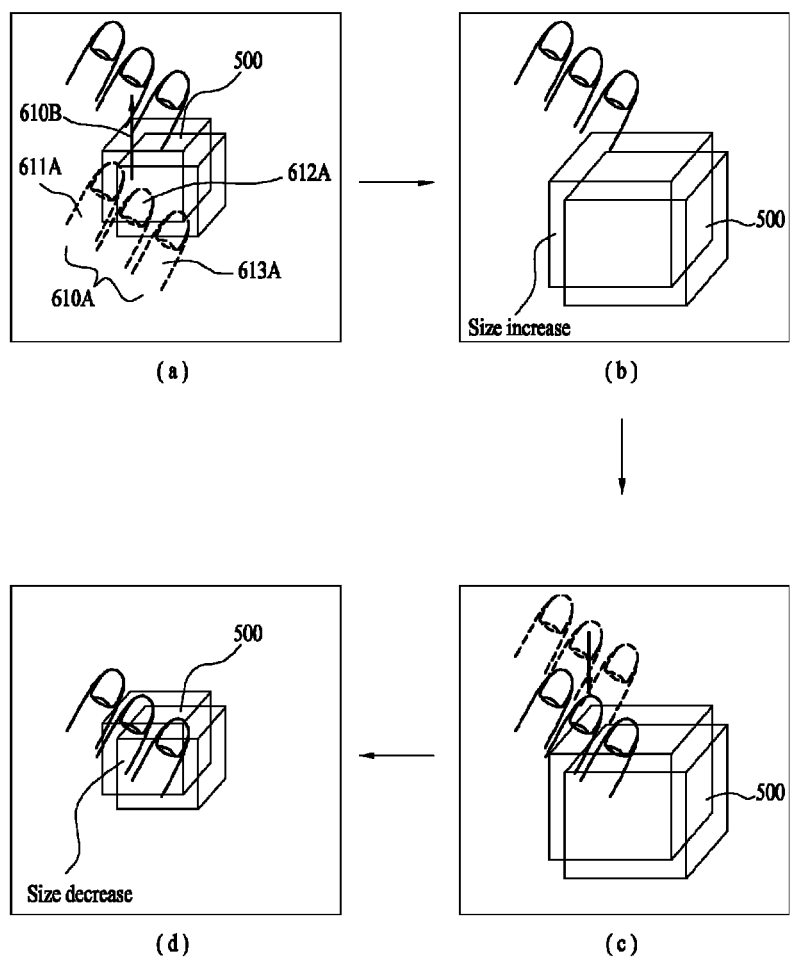

FIG. 38 illustrates that a size of the 3D object 500 is changed to correspond to the touch of the second scheme 610B.

According to one embodiment, if the first touch scheme 610A for the 3D object 500 is changed to the second touch scheme 610B, the controller 180 calculates a variation from the first touch scheme 610A to the second touch scheme 610B and varies the size of the 3D object 500 to correspond to the calculated variation.

Referring to FIG. 38(*a*), if the touched three points of the 3D object 500 are dragged in an upward direction (first touch scheme 610A→second touch scheme 610B), the controller 180 increases the size of the 3D object 500 to correspond to the upward-directional drag distance variation, as shown in FIG. 38(*b*).

Referring to FIG. 38(*c*), while the size of the 3D object 500 is increased, if the user's fingers are dragged in a downward direction, the controller 180 decreases the size of the 3D object 500 to correspond to the downward-directional drag distance variation, as shown in FIG. 38(*d*).

Figure 39:
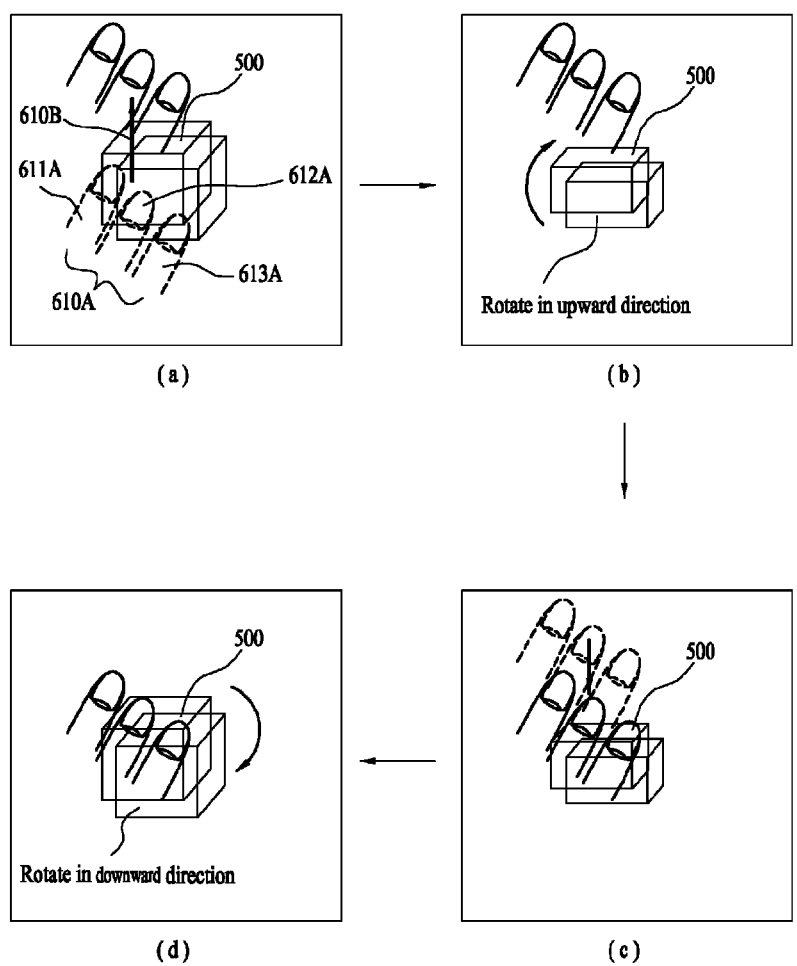

FIG. 39 illustrates that the 3D object 500 is rotated to correspond to the touch of the second scheme 610B.

According to one embodiment, if the first touch scheme 610A for the 3D object 500 is changed to the second touch scheme 610B, the controller 180 calculates a variation from the first touch scheme 610A to the second touch scheme 610B and rotates the 3D object 500 to correspond to the calculated variation.

Referring to FIG. 39(*a*), if the touched three points of the 3D object 500 are dragged in an upward direction (first touch scheme 610A→second touch scheme 610B), the controller 180 rotates the 3D object 500 to correspond to the upward-directional drag distance variation, as shown in FIG. 39(*b*).

Referring to FIG. 39(*c*), while the 3D object 500 is rotated in the upward direction, if the user's fingers are dragged in a downward direction, the controller 180 rotates the 3D object 500 to correspond to the downward-directional drag distance variation, as shown in FIG. 39(*d*).

Another embodiment of the present invention relates to a method for changing a shape of a 3D object using a triple multi-touch including a touch according to a first touch scheme for selecting the 3D object and a touch according to a second scheme for changing the shape of the 3D object, as will be described in detail with reference to FIGS. 40 to 47.

Figure 40:
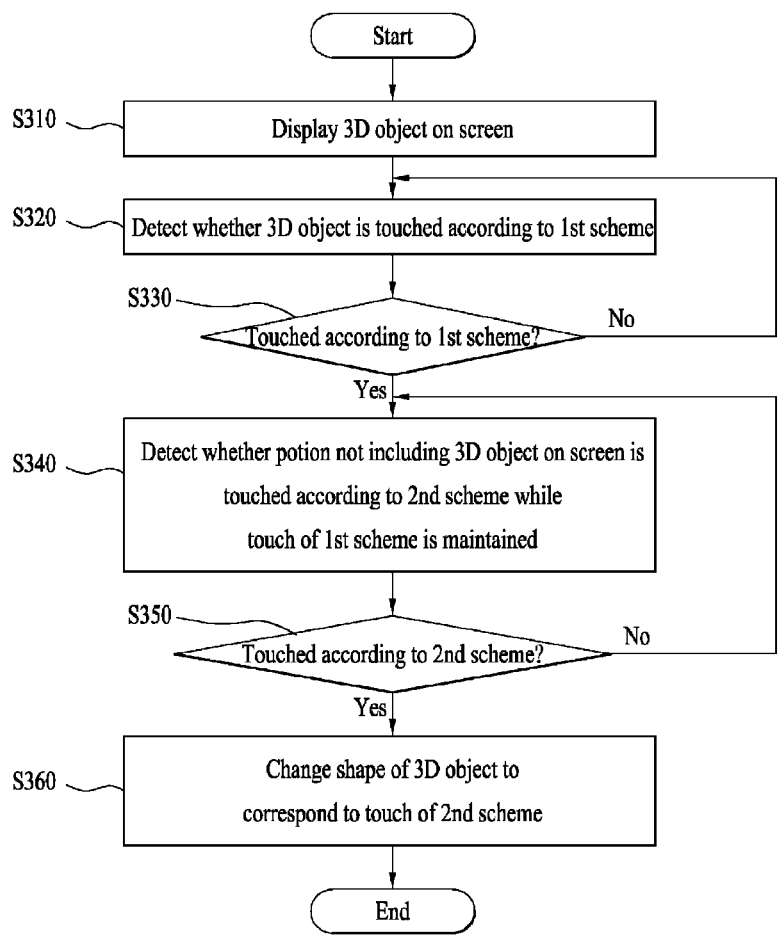
FIG. 40 is a flowchart of a method for changing a shape of a 3D object using a three-point multi-touch according to an embodiment of the present invention.

FIG. 40 is a flowchart of a method for changing a shape of a 3D object using a triple multi-touch according to embodiments of the present invention.

Referring to FIG. 40, if a user selects a 3D object 500 via the touchscreen 151 (FIG. 2A) or the user input unit 130 (FIG. 1), the controller 180 controls the selected 3D object 500 to be displayed on the touchscreen 151 [S310]. If the 3D object 500 is displayed, the controller 180 detects whether the user touches the 3D object 500 according to a first touch scheme via the touchscreen 151 [S320].

Here, the first touch scheme may include a scheme of touching one or two points of the 3D object 500 and maintaining the corresponding touch(es). In particular, if one or two points of the 3D object 500 are touched, the controller 180 switches a current operating mode to an operating mode for changing a shape of the 3D object 500. Afterwards, if a touch of a second scheme for changing the shape of the 3D object 500 is inputted to a portion of the screen not including the 3D object 500, the controller changes the shape of the 3D object 500 to correspond to the touch of the second scheme.

Referring to FIG. 40, if the touch of the first scheme is inputted to the 3D object 500 [S330], the controller 180 detects whether the portion of the screen not including the 3D object 500 is touched according to the second touch scheme while the touch of the first touch scheme is maintained [S340]. Here, the second touch scheme may include a scheme of touching one or two points of the portion of the screen not including the 3D object, and moving the touch in a certain direction or changing a distance between the touched two points.

Figure 41:
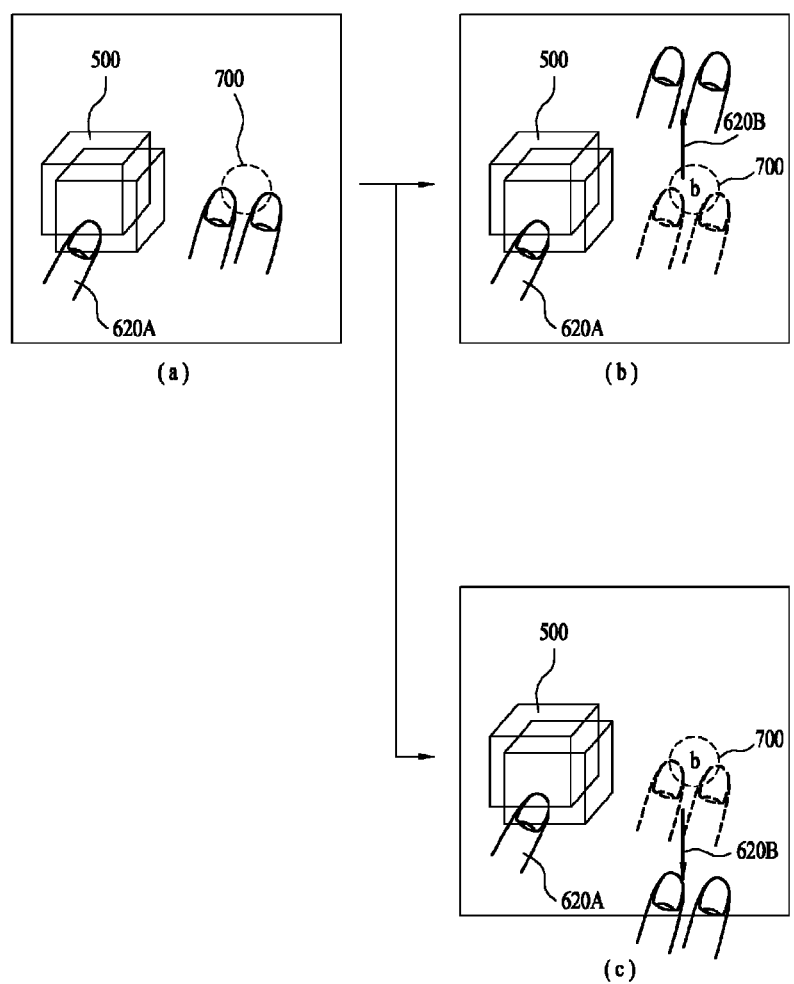
FIGS. 41 to 43 illustrate screen configurations of touch methods for changing a shape of a 3D object according to an embodiment of the present invention.
Figure 42:
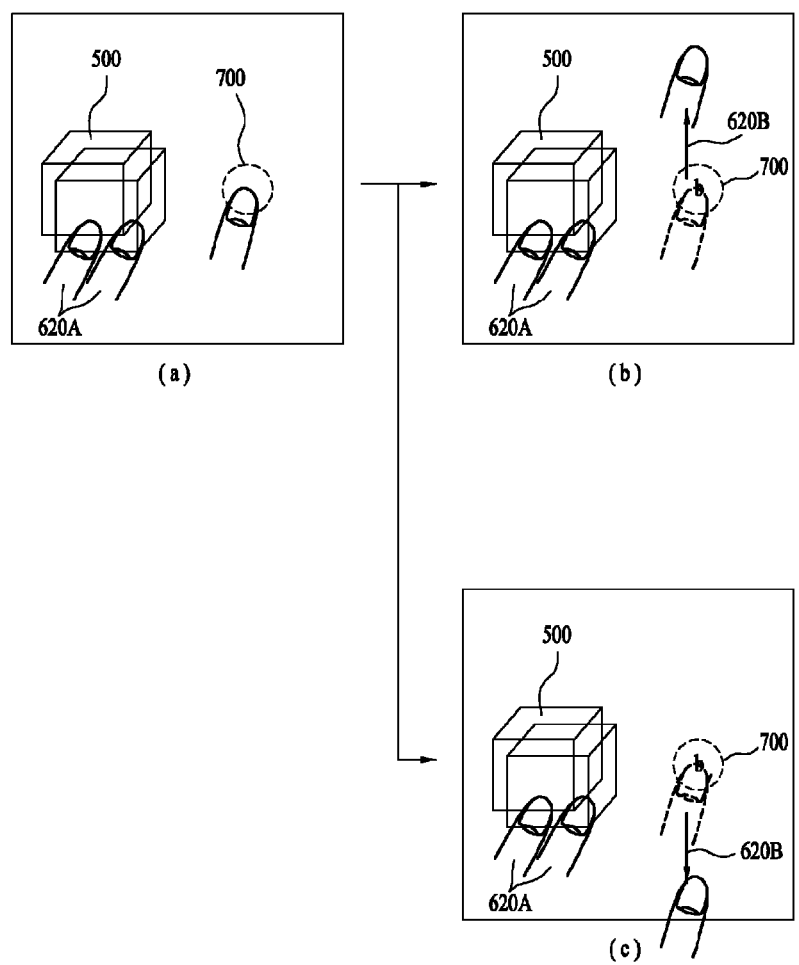
Figure 43:
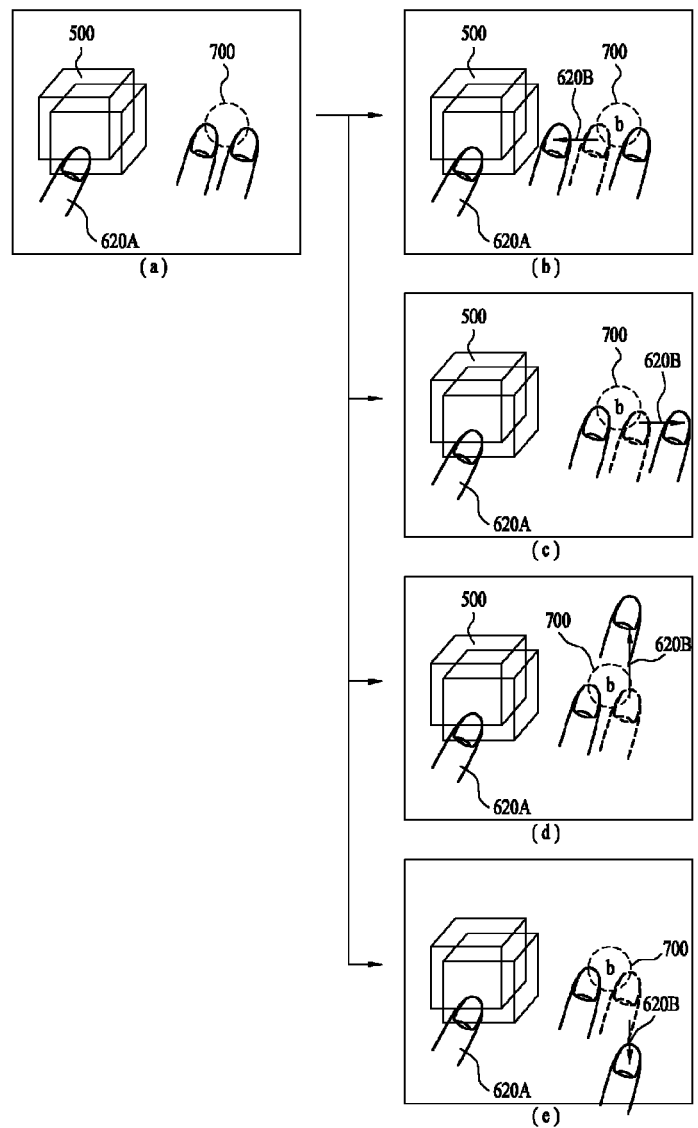

FIGS. 41 to 43 illustrate screen configurations for first and second touch schemes for changing a shape of a 3D object according to embodiments of the present invention.

Referring to FIGS. 41 to 43, a triple multi-touch of an embodiment of the present invention includes a touch of a first scheme 620A, wherein one or two points on the 3D object 500 is touched, and a touch of a second scheme 620B, wherein one or two points of a portion 700 on the screen not including the 3D object 500 is touched. A total number of touches on the screen according to the first and second touch schemes 620A and 620B is three.

Referring to FIG. 41(a), a touch of the first scheme 620A includes touching one point on the 3D object 500 and maintaining a position of the touched point on the 3D object 500.

Referring to FIGS. 41(a) to FIG. 41(c), a touch of the second scheme 620B includes touching two points on the portion 700 and moving the touched two points together in a specific direction. For example, FIGS. 41(a) and 41(b) show that the touch of the second scheme 620B includes dragging the touched two points in an upward direction. In another example, FIGS. 41(a) and FIG. 41(c) show that the touch of the second scheme 620B includes dragging the touched two points in a downward direction. Alternatively, the touch of the second touch scheme 620B may include dragging the touched two points in one of left, right or diagonal directions.

Referring to FIG. 42(a), a touch of the first scheme 620A includes touching two points on the 3D object 500 and maintaining positions of the touched two points on the 3D object 500.

Referring to FIGS. 42(a) to FIG. 42(c), a touch of the second scheme 620B includes touching one point on the portion 700 and moving the touched one point in a specific direction. For example, FIGS. 42(a) and 42(b) show that the touch of the second scheme 620B includes dragging the touched one point in an upward direction. In another example, FIGS. 42(a) and 42(c) show that the touch of the second scheme 620B includes dragging the touched one point in a downward direction. Alternatively, the touch of the second touch scheme 620B may include dragging the touched one point in one of left, right or diagonal directions.

Referring to FIG. 43(a), a touch of the first scheme 620A includes touching one point on the 3D object 500 and maintaining a position of the touched one point on the 3D object 500.

Referring to FIGS. 43(a) to FIG. 43(e), a touch of the second scheme 620B includes touching two points on the portion 700, fixing a position of one of the touched two points, and moving the other of the touched two points in a specific direction. For example, FIGS. 43(a) and 43(b) show that the touch of the second scheme 620B includes fixing a position of one of the touched two points and dragging the other of the touched two points in a left direction. In another example, FIGS. 43(a) and 43(c) show that the touch of the second scheme 620B includes fixing a position of one of the touched two points and dragging the other of the touched two points in a right direction.

In a further example, FIGS. 43(a) and 43(d) show that the touch of the second scheme 620B includes fixing a position of one of the touched two points and dragging the other of the touched two points in an upward direction. Moreover, FIGS. 43(a) and 43(e) show that the touch of the second scheme 620B includes fixing a position of one of the touched two points and dragging the other of the touched two points in a downward direction.

Referring to FIG. 40, as a result of the detection in step S340, if the user inputs a touch according to the second touch scheme 620B [S350], the controller changes the shape of the 3D object 500 to correspond to the inputted touch according to the second touch scheme 620B [S360].

FIGS. 44 to 47 illustrate screen configurations of a method for changing a shape of a 3D object to correspond to a second touch scheme according to embodiments of the present invention.

Figure 44:
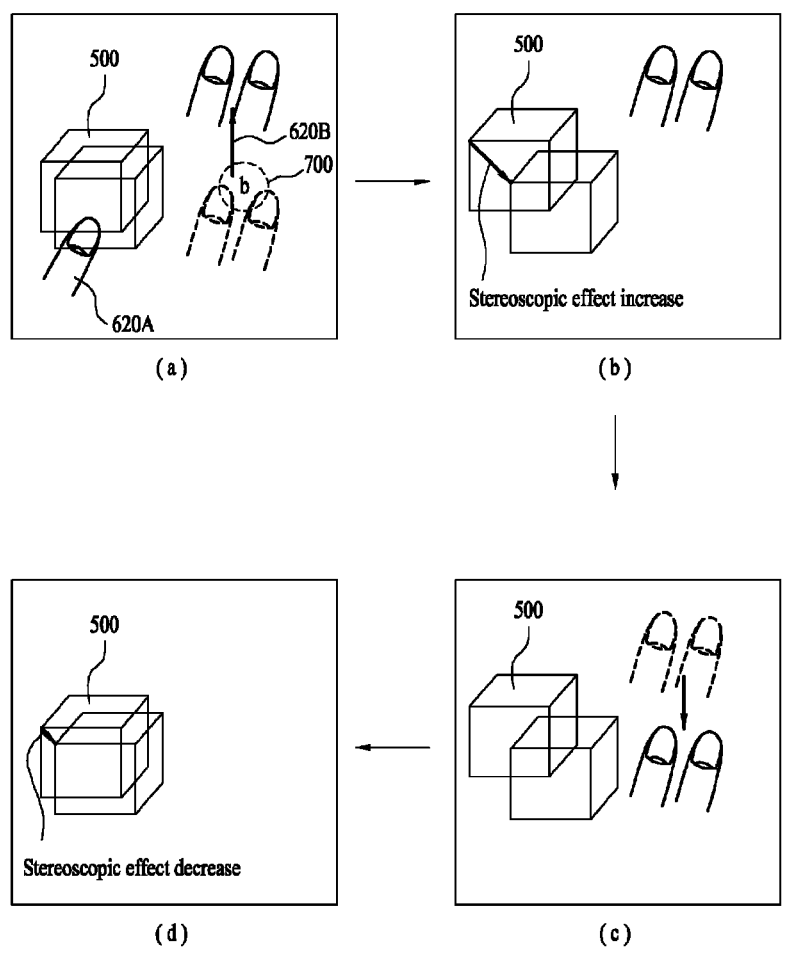
FIGS. 44 to 47 illustrate screen configurations of a method for changing a shape of a 3D object to correspond to touch method according to an embodiment of the present invention.
Figure 45:
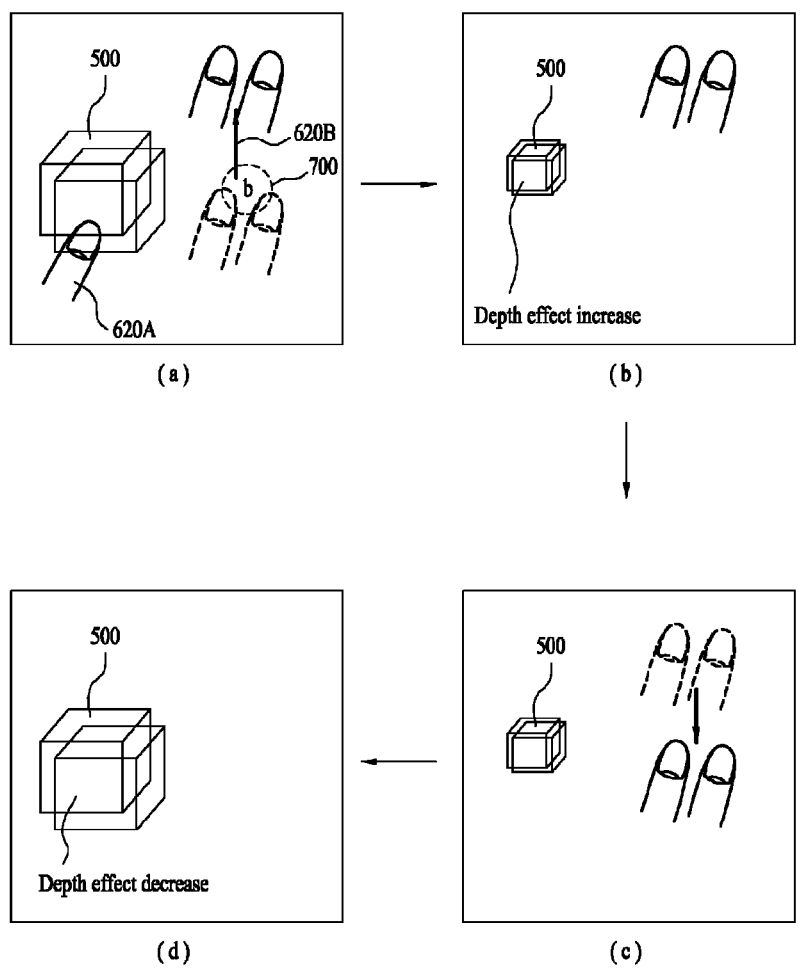
Figure 46:
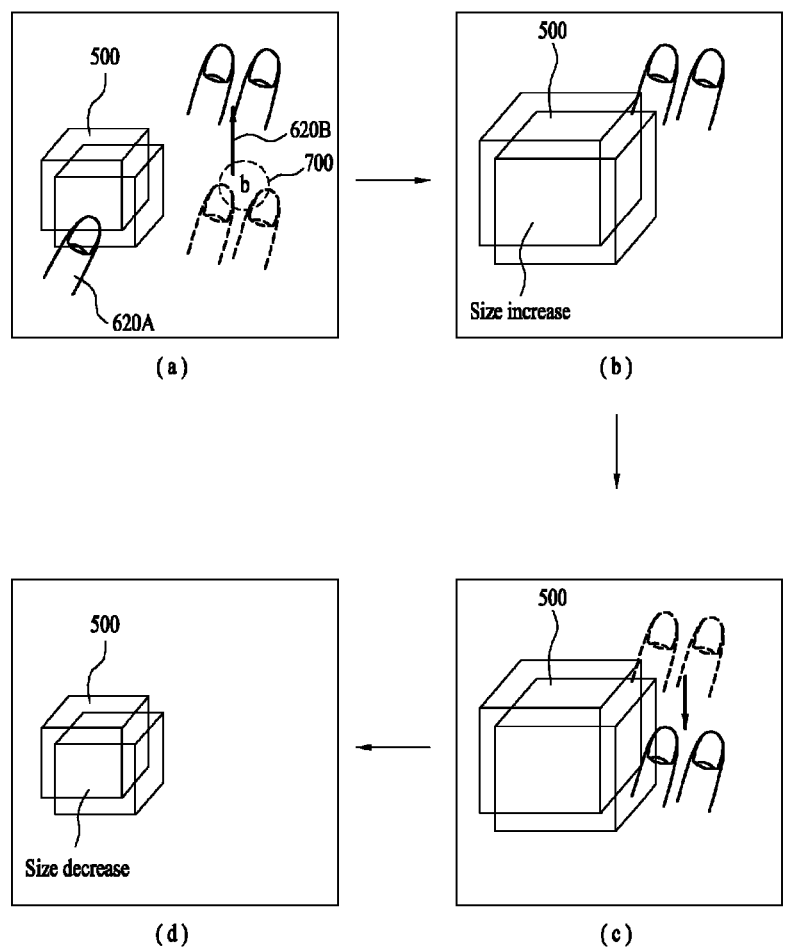
Figure 47:
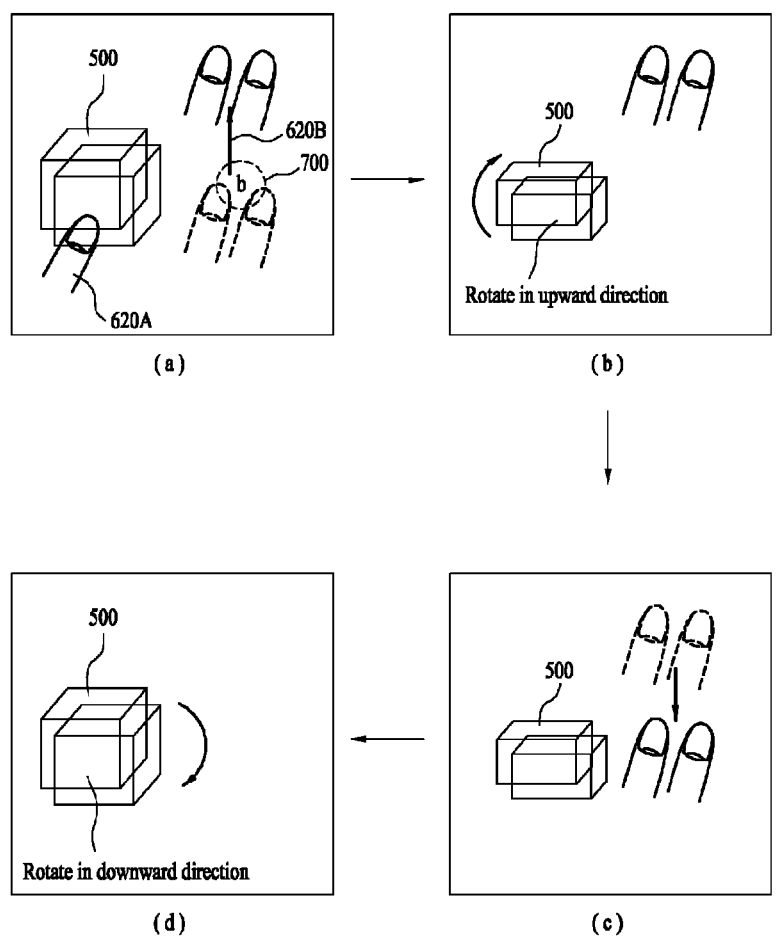

FIG. 44 shows that a stereoscopic effect level of the 3D object 500 is changed to correspond to a moved touch of the second scheme 620B. In FIG. 44, while the 3D object 500 is touched according to the first scheme 620A, if a touch according to the second scheme 620B is inputted, the controller 180 changes a 3D stereoscopic effect level of the 3D object 500 to correspond to the inputted second touch scheme 620B.

In particular, referring to FIG. 44(a), while the 3D object 500 is touched according to the first scheme 620A, if an upward-directional drag touch of the second scheme 620B is inputted, the controller 180 raises the stereoscopic effect level of the 3D object 500 to correspond to the upward-directional drag distance variation, as shown in FIG. 44(b).

Referring to FIG. 44(c), while the stereoscopic effect level of the 3D object 500 is raised, if a downward-directional drag touch of the second scheme 620B is inputted, the controller 180 lowers the stereoscopic effect level of the 3D object 500 to correspond to the downward-directional drag distance variation, as shown in FIG. 44(d).

In another embodiment, referring to FIG. 45(a), while the 3D object 500 is touched according to the first scheme 620A, if an upward-directional drag touch of the second scheme 620B is inputted, the controller 180 raises a depth effect level of the 3D object 500 to correspond to the upward-directional drag distance variation, as shown in FIG. 45(b).

Referring to FIG. 45(c), while the depth effect level of the 3D object 500 is raised, if a downward-directional drag touch of the second scheme 620B is inputted, the controller 180 lowers the depth effect level of the 3D object 500 to correspond to the downward-directional drag distance variation, as shown in FIG. 45(d).

In a further embodiment, referring to FIG. 46(a), while the 3D object 500 is touched according to the first scheme 620A, if an upward-directional drag touch of the second scheme 620B is inputted, the controller 180 increases a size of the 3D object 500 to correspond to the upward-directional drag distance variation, as shown in FIG. 46(b).

Referring to FIG. 46(c), while the size of the 3D object 500 is increased, if a downward-directional drag touch of the second scheme 620B is inputted, the controller 180 reduces the size of the 3D object 500 to correspond to the downward-directional drag distance variation, as shown in FIG. 46(d).

In another embodiment, referring to FIG. 47(a), while the 3D object 500 is touched according to the first scheme 620A, if an upward-directional drag touch of the second scheme 620B is inputted, the controller 180 rotates the 3D object 500 in an upward direction to correspond to the upward-directional drag distance variation, as shown in FIG. 47(b).

Referring to FIG. 47(c), while the 3D object 500 is rotated in the upward direction, if a downward-directional drag touch of the second scheme 620B is inputted, the controller 180 rotates the 3D object 500 in a downward direction to correspond to the downward-directional drag distance variation, as shown in FIG. 47(d).

Accordingly, in view of the above description, the present invention provides a user with the advantage of manipulating an operation of screen content using at least two multi-touches.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

For instance, the above-described methods can be implemented in a program recorded medium as computer-readable codes. The computer-readable media include all types of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

What is claimed is:

1. A mobile terminal, comprising:
a touchscreen configured to:
  display content comprising at least one first part and at least one second part; and
  receive at least a first touch input and a second touch input, the first touch input comprising a stationary touch on the at least one first part of the content and the second touch input comprising a moving touch in a certain direction on the at least one second part of the content that is performed while maintaining the first touch input; and
a controller configured to:
  control operations related to the content; and
  alter the at least one second part of the content based on a movement of the second touch input while not altering the at least one first part of the content.

2. The mobile terminal of claim 1, wherein:
the content comprises a three-dimensional (3D) object; and
the controller is further configured to control the touchscreen to change a shape of the 3D object based on the movement of the second touch input.

3. The mobile terminal of claim 2, wherein the controller is further configured to control the touchscreen to:
fix a position of the at least one first part of the 3D object; and
change the shape of the 3D object by altering the at least one second part of the 3D object with respect to the fixed at least one first part of the 3D object based on the movement of the second touch input.

4. The mobile terminal of claim 2, wherein the controller is further configured to control the touchscreen to change the shape of the 3D object by changing at least a stereoscopic effect, a depth effect or a size of the 3D object based on the movement of the second touch input.

5. The mobile terminal of claim 2, wherein the controller is further configured to control the touchscreen to rotate the 3D object based on the movement of the second touch input such that the at least one second part of the 3D object pivots with respect to the at least one first part of the 3D object.

6. The mobile terminal of claim 1, wherein:
the touchscreen is further configured to receive a third touch input while the first touch input and the second touch input are applied, the third touch input received on a portion of the screen not including the content; and
the controller is further configured to control the operations based on a movement of the third touch input.

7. The mobile terminal of claim 1, wherein the controller is further configured to:
detect a change in at least the first or second touch input while the at least one first part of the content and the at least one second part of the content remain touched; and
control the operations based on the detected change.

8. The mobile terminal of claim 1, wherein:
the content comprises a map including at least two regions and information on objects included in each of the at least two regions; and
the controller is further configured to control a display operation of the map based on the movement of the second touch input.

9. The mobile terminal of claim 8, wherein:
the at least one first part of the content comprises a first target object in a first region of the map;
the at least one second part of the content comprises a second region of the map; and
the controller is further configured to:
  search the second region for information related to target objects associated with the first target object; and
  control the touchscreen to display the searched information.

10. The mobile terminal of claim 8, wherein:
the at least one first part of the content corresponds to a first region of the map;
the at least one second part of the content corresponds to a second region of the map; and
the controller is further configured to control the touchscreen to:
  fix a display position of the first region; and
  zoom-in or zoom-out on the second region on the second region based on the movement of the second touch input.

11. The mobile terminal of claim 10, wherein the controller is further configured to control the touchscreen to display the first region overlaid on the zoomed-in or zoomed-out second region.

12. The mobile terminal of claim 8, wherein:
the at least one first part of the content corresponds to a first region of the map;
the at least one second part of the content corresponds to a second region of the map; and
the controller is further configured to control the touchscreen to:
  fix a display position of the first region; and
  shift a display position of the second region based on the movement of the second touch input.

13. The mobile terminal of claim 12, wherein the controller is further configured to control the touchscreen to display the second region in an initial state when the second touch input is released while the second region is displayed at the shifted display position, the initial state corresponding to a displayed state of the second region prior to receiving the second touch input.

14. The mobile terminal of claim 12, wherein the controller is further configured to control the touchscreen to shift the display position of the second region such that the second region pivots with respect to the fixed display position of the first region.

15. The mobile terminal of claim 12, wherein the shift of the display position of the second region corresponds to the certain direction.

16. The mobile terminal of claim 1, wherein;
the content comprises a three-dimensional (3D) image including 3D objects having differing 3D depth levels; and
the controller is further configured to control a display operation of the 3D image based on the movement of the second touch input.

17. The mobile terminal of claim 16, wherein:
the at least one first part of the content corresponds to a first 3D object the 3D image;

the at least one second part of the content corresponds to a second 3D object of the 3D image; and the controller is further configured to control the touchscreen to:
fix a display position of the first 3D object; and
change a depth level of the second 3D object to a same depth level as the first 3D object.

18. A method of controlling a mobile terminal, the method comprising:
displaying content on a touchscreen of the mobile terminal, the content comprising at least one first part and at least one second part;
receiving at least a first touch input and a second touch input on the touchscreen, the first touch input comprising a stationary touch on the at least one first part of the content and the second touch input comprising a moving touch in a certain direction on the at least one second part of the content that is performed while maintaining the first touch input; and
altering the at least one second part of the content based on a movement of the second touch input while not altering the at least one first part of the content.

\* \* \* \* \*